US008515976B2

(12) United States Patent
Shinjo et al.

(10) Patent No.: US 8,515,976 B2
(45) Date of Patent: Aug. 20, 2013

(54) BIT STRING DATA SORTING APPARATUS, SORTING METHOD, AND PROGRAM

(75) Inventors: Toshio Shinjo, Chiba (JP); Koutaro Shinjo, legal representative, Chiba (JP); Mitsuhiro Kokubun, Chiba (JP)

(73) Assignee: Kousokuya, Inc., Kanagawa (JP)

( * ) Notice: Subject to any disclaimer, the term of this patent is extended or adjusted under 35 U.S.C. 154(b) by 238 days.

(21) Appl. No.: 13/067,722

(22) Filed: Jun. 22, 2011

(65) Prior Publication Data

US 2011/0258205 A1 Oct. 20, 2011

Related U.S. Application Data

(63) Continuation of application No. PCT/JP2010/004599, filed on Jul. 15, 2010, and a continuation of application No. PCT/JP2010/004595, filed on Jul. 15, 2010, and a continuation of application No. PCT/JP2009/006001, filed on Nov. 11, 2009.

(30) Foreign Application Priority Data

Dec. 22, 2008 (JP) ................................. 2008-325692
Aug. 18, 2009 (JP) ................................. 2009-189602
Aug. 30, 2009 (JP) ................................. 2009-199115

(51) Int. Cl.
*G06F 17/00* (2006.01)
(52) U.S. Cl.
USPC .......................................... 707/753; 707/706
(58) Field of Classification Search
USPC ........................................................ 707/753
See application file for complete search history.

(56) References Cited

U.S. PATENT DOCUMENTS

| 4,595,995 A | 6/1986 | Alles |
| 5,396,622 A * | 3/1995 | Lee et al. ............................. 1/1 |
| 5,440,734 A | 8/1995 | Wagar |

FOREIGN PATENT DOCUMENTS

| JP | 04-032924 A | 2/1992 |
| JP | 04-127321 A | 4/1992 |
| JP | 07-302187 A | 11/1995 |
| JP | 2010-092088 A | 4/2010 |
| WO | WO-2009/072233 A1 | 6/2009 |
| WO | WO-2010/073471 A1 | 7/2010 |

OTHER PUBLICATIONS

International Search Report mailed on Jan. 19, 2010.
International Search Report mailed on Oct. 5, 2010 (PCT/JP2010/004595).
International Search Report mailed on Oct. 5, 2010 (PCT/JP2010/004599).

* cited by examiner

*Primary Examiner* — Belix M Ortiz Ditren
(74) *Attorney, Agent, or Firm* — Rader, Fishman & Grauer PLLC

(57) ABSTRACT

The sort processing of keys to be sorted, which keys are expressed as bit strings involves a classification processing. In the classification processing, a bit string comparison between a reference key and a key which is an object of the classification is performed, and a difference bit position is obtained that is the bit position of the first bit that differs in the bit string comparison and the keys to be sorted are classified by the difference bit position into key groups with the same difference bit position.

34 Claims, 44 Drawing Sheets

US 8,515,976 B2

BIT STRING DATA SORTING APPARATUS, SORTING METHOD, AND PROGRAM

CROSS-REFERENCE TO RELATED APPLICATIONS

This application is a continuation of PCT/JP2009/006001 filed on Nov. 11, 2009, PCT/JP2010/004595 filed on Jul. 15, 2010, and PCT/JP2010/004599 filed on Jul. 15, 2010.

PCT/JP2009/006001, PCT/JP2010/004595, and PCT/JP2010/004599 are based on and claim the benefit of priority of the prior Japanese Patent Application 2008-325692 filed on Dec. 22, 2008, the prior Japanese Patent Application 2009-189602 filed on Aug. 18, 2009, and the prior Japanese Patent Application 2009-199115 filed Aug. 30, 2009 respectively, the entire contents of which are incorporated by reference. The contents of PCT/JP2009/006001, PCT/JP2010/004595, and PCT/JP2010/004599 are incorporated by reference.

BACKGROUND OF THE INVENTION

1. Field of the Invention

This invention is related to a bit string data sorting apparatus, sorting method and program.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database can be reduced to searching for bit string data in the database.

Also, one of the processings applied to a database is the sort processing using index keys for the records in the database. This sort processing can also be reduced to the sort processing of keys composed of bit string data. Hereinbelow, the bit string data may also be referred to simply as a key.

Various sort methods have been developed; patent reference 1 below introduces quick sort, radix sort, and so forth. Also patent reference 2 teaches a radix sort.

FIG. 1 is a drawing describing the concepts of previous radix sorts. In accordance with a radix sort, a key, for example, the 4-bit bit string that is the object of the sort shown in the example in FIG. 1, is sorted by repeating the classification of the bit value in each bit position from the 0th bit to the 3rd bit. Hereinbelow, the concepts of a radix sort are described using the example shown in FIG. 1.

FIG. 1 shows key string 100 composing the keys that are the object of the sort. In the example shown in FIG. 1, key "0001" is in the storage area wherein key position 101, which is the position of keys included in key string 100, is 100a (hereinafter this may be called key position 100a). Also, "1111", "0011", "1010", and "1110" are in key positions 100b, 100c, 100d, and 100e respectively.

As shown in FIG. 1, first, the bit strings are classified at the 0th bit of the keys included in key string 100 using classification for each bit position (0th bit) 110a. As a result, group 120a for keys with the value 0 at the 0th bit, consisting of key "0001" and key "0011", and group 121a for keys with the value 1 at the 0th bit, consisting of key "1111", key "1010", and key "1110", are obtained. Next the bit strings are classified at the 1st bit using classification for each bit position (1st bit) 110b for the value 0 group 120a and using classification for each bit position (1st bit) 110e for the value 1 group 121a respectively.

On one hand, in the classification for each bit position (1st bit) 110b, because the 1st bit of key "0001" and key "0011" are both 0, only the value-0-at-bit-1 group 120b is obtained from the classification, and the same keys as in value-0-at-bit-0 group 120a are subject to a classification at the 2nd bit, and the bit strings are classified at the 2nd bit using classification for each bit position (2nd bit) 110c. Because classification for each bit position (2nd bit) 110c obtains the single key "0001" as the value-0-at-bit-2 group 120d, it is stored in the storage area wherein key position 131, which is the position of keys stored in sorted key string 130, is 130a (hereinafter this may be called key position 130a) in which the key with the smallest value is stored. In the same way, because a single key "0011" is obtained as the value-1-at-bit-2 group 121d, it is stored in key position 130b as the key with the next to smallest value in sorted key string 130. Also, the keys in the sorted key string are stored in the sequence of the key position labels from the smallest key.

On the other hand, because a single key "1010" is obtained as the value-0-at-bit-1 group 120e in the classification for each bit position (1st bit) 110e, it is stored in key position 130c, which is the next storage position in sorted key string 130. Also, a group of key "1111" and key "1110" is obtained as the value-1-at-bit-1 group 121e, and a classification based on the value at the 2nd bit is done in the classification for each bit position (2nd bit) 110f.

Because 2nd bits of both key "1111" and key "1110" are both 1 in the classification for each bit position (2nd bit) 110f, only the value-1-at-bit-2 group 121f is obtained and the same keys as in value-1-at-bit-1 group 121e are subject to a classification at the 3rd bit, and the bit strings are classified at the 3rd bit using classification for each bit position (3rd bit) 110g. Because a single key "1110" is obtained as the value-0-at-bit-3 group 120g in the classification for each bit position (3rd bit) 110g, it is stored in key position 130d, which is the next storage position in sorted key string 130. In the same way, because a single key 1111 is obtained as the value-1-at-bit-3 group 121g, it is stored in key position 130e, which is the next storage position in sorted key string 130.

By means of the above processing the keys in key string 100 are sorted and stored in the key positions 130a to 130e in sorted key string 130. However, if the sort is executed by the above noted radix sort method ineffective processing that does not result in a classification occurs as can be seen in the classification for each bit position (1st bit) 110b and classification for each bit position (2nd bit) 110f shown in FIG. 1.

Patent document 1: JP 2002-116907 A

Patent document 2: JP 2005-316663 A

SUMMARY OF THE INVENTION

Whereat, the problem this invention intends to solve is to provide an effective sorting means that does not occasion ineffective processing in bit string sort processing.

In accordance with the sort processing of a first embodiment of this invention, a bit string comparison of keys consisting of a reference key and a bit string that is the object of the sort is performed, and a difference bit position is obtained that is the bit position that has the first differing bit, and a classification of the keys to be sorted is done using the difference bit position, and sorted key string is acquired by repeating further classification by the difference bit position between the reference key and a plurality of keys classified into the same difference bit position.

In accordance with the sort processing of a second embodiment of this invention, a bit string comparison of keys consisting of a reference key, which is bit string data used as a reference, and a sort key, which is a bit string that is the object of the sort, is performed, and a difference bit position is obtained that is the bit position that has the first differing bit, and a classification of the keys to be sorted is done using the difference bit position, and by sorting those classified keys by means of "the n bits at a lower level than the difference bit position in the sort key", a sorted string of keys is obtained. Here, "the n bits at a lower level than the difference bit position in the sort key" expresses the values of the bits to be found at the positions from "b+1" to the end of the string where the difference bit position in the sort key is taken to be "b".

In accordance with the sort processing of a third embodiment of this invention, by a magnitude comparison between a reference key, which is an arbitrary key among all the keys to be sorted, and the keys other than the reference key among all the keys to be sorted, the keys among all the keys to be sorted are divided into a group of keys smaller than the reference key and a group of keys larger than the reference key, and, for each of the groups smaller and larger than the reference key, a difference bit position between a key among keys subject to the classification in classification processing that constitutes the sort processing and a reference key taken from among keys subject to the classification is obtained, and a classification of the keys subject to the classification is done using the difference bit position, and sorted key string is acquired by repeating further classification by the difference bit position between the reference key taken from among keys subject to the classification and a plurality of keys classified into the same difference bit position.

In accordance with the first and the third embodiment of this invention, since sorting is done by means of the difference bit position, there is no ineffective processing that results in no classifying. Thus efficient sort processing can be realized.

In accordance with the second embodiment of this invention, since sorting is first done by means of the difference bit position, there is no ineffective processing that results in no classifying.

DETAILED DESCRIPTION OF THE INVENTION

Hereinbelow, the first embodiment of this invention is described with an example using the same keys included in key string 100 shown in FIG. 1 as the keys to be sorted.

Figure 1:
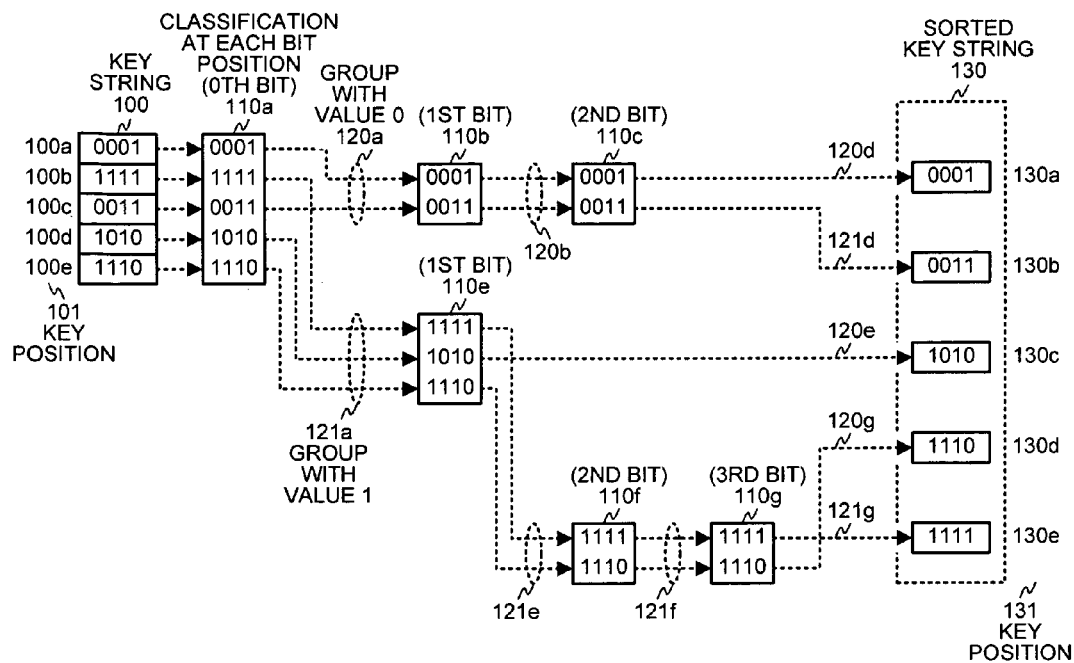
FIG. 1 is a drawing describing the concepts of previous radix sorts.
Figure 2A:
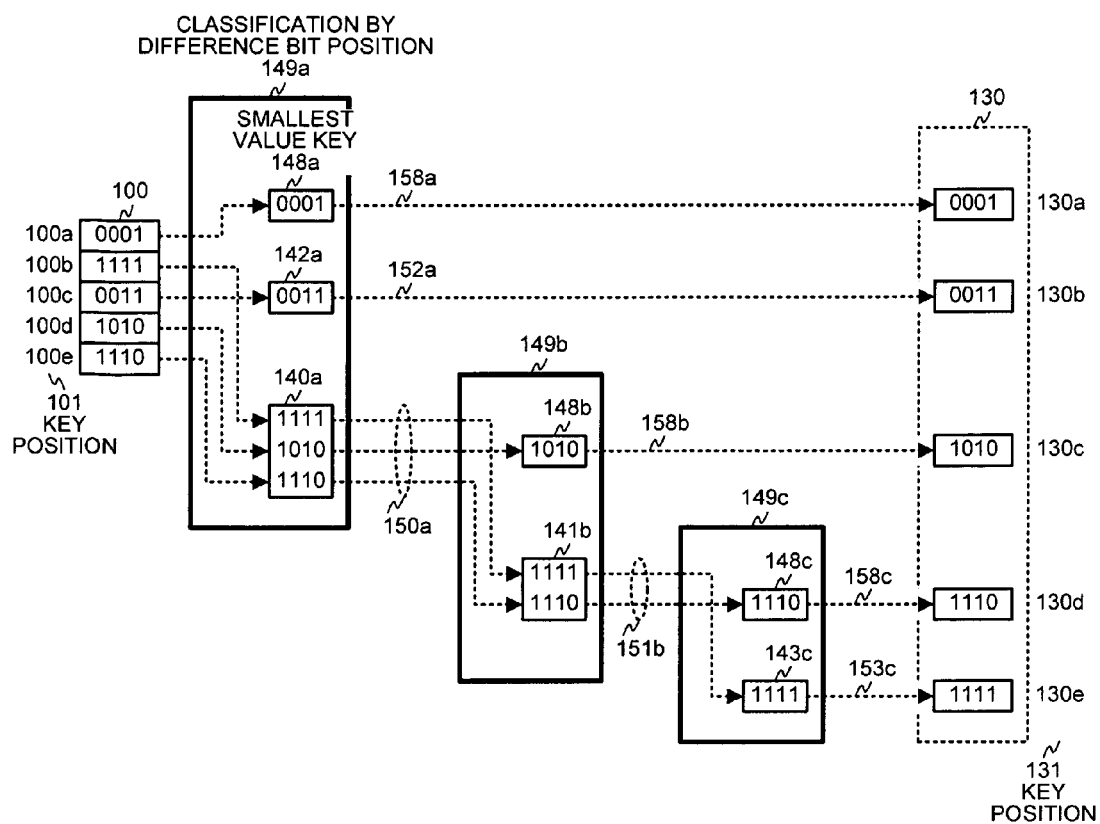
FIG. 2A is a drawing describing the concepts of sort processing using a difference bit position in a first embodiment of this invention.

FIG. 2A is a drawing describing the concepts of sort processing using a difference bit position in the first embodiment of this invention. The keys being included in the key string 100 that are the object of the sort and the sorted key string 130 are the same as those shown in FIG. 1.

Each key configuring key string 100 is classified, through the classification-by-difference-bit-position 149a, into the smallest value key 148a, the key group 142a, whose difference position with the smallest value key is 2, and the key group 140a, whose difference position with the smallest value key 148a is 0. In the example in FIG. 2A, the smallest value key 142a is "0001". Only key "0011" is included in key group 142a, and keys "1010", "1111", and "1110" are included in key group 140a. The smallest value key 148a can be obtained, for example, when reading from the key string 100 into the input buffer for sort processing by means of the difference bit position.

The smallest value key 148a is stored in key position 130a in sorted key string 130, as shown by the dotted-line arrow 158a in FIG. 2A. Also, because there is only 1 key in key group 142a it is stored in key position 130b in sorted key string 130, as shown by the dotted-line arrow 152a in the drawing.

Because a plurality of keys are included in key group 140a, whose difference bit position with respect to smallest value key 148a is 0, key group 140a is classified, through the classification-by-difference-bit-position 149b, into smallest value key 148b and key group 141b, whose difference bit position with respect to smallest value key 148b is "1" as shown by the group 150a of dotted-line arrows in FIG. 2A. In the example in FIG. 2A, the smallest value key 148b is "1010". Keys "1111" and "1110" are included in key group 141b.

The smallest value key 148b is stored in key position 130c in sorted key string 130, as shown by the dotted-line arrow 158b in the drawing.

Also, because a plurality of keys are included in key group 141b, whose difference bit position with respect to smallest value key 148b is "1", key group 141b is classified, through the classification-by-difference-bit-position 149c, into smallest value key 148c and key group 143c, whose difference bit position with respect to smallest value key 148c is "3" as shown by the group 151b of dotted-line arrows in the drawing. In the example in FIG. 2A, the smallest value key 148c is "1110". Only key "1111" is included in key group 143c.

The smallest value key 148c is stored in key position 130d in sorted key string 130, as shown by the dotted-line arrow 158c in the drawing. Also, because there is only 1 key in key group 143c, it is stored in key position 130e in sorted key string 130, as shown by the dotted-line arrow 153c in the drawing.

By means of the above processing, the keys in key string 100 are stored in ascending order in the key positions 130a to 130e in sorted key string 130, and sorting is completed. And because classification is repeated based on a difference bit position in sort processing in accordance with this first embodiment keys are always classified in each classification processing. Also, although the smallest value key is taken as the reference key for computing the difference bit position in the above noted example, the largest value key can also be taken as the reference key for computing the difference bit position. In this case, in the example of the keys to be sorted in FIG. 2A, because the largest key is key "1111", the groups of the largest key, the key "1110", whose difference bit position is "3", the key "1010", whose difference bit position is 1, and key group of keys "0011" and "0001", whose difference bit positions are 0, are obtained through the first classification processing by difference bit position.

Next, a description is provided for an example of a function block configuration for implementing sort processing using difference bit positions in the first embodiment of this invention, whose concepts were described referencing FIG. 2A. It is clear that sort processing using difference bit positions in the first embodiment of this invention can be enabled if function blocks are prepared for executing the processing of classifications by difference bit position 149a, 149b, 149c and so forth shown in the example in FIG. 2A with respect to every grouping of keys to be sorted. But that is a waste of resources and not a realistic implementation method. For that reason, a preferred embodiment of this invention has made the innovations described hereinbelow.

Figure 2B:
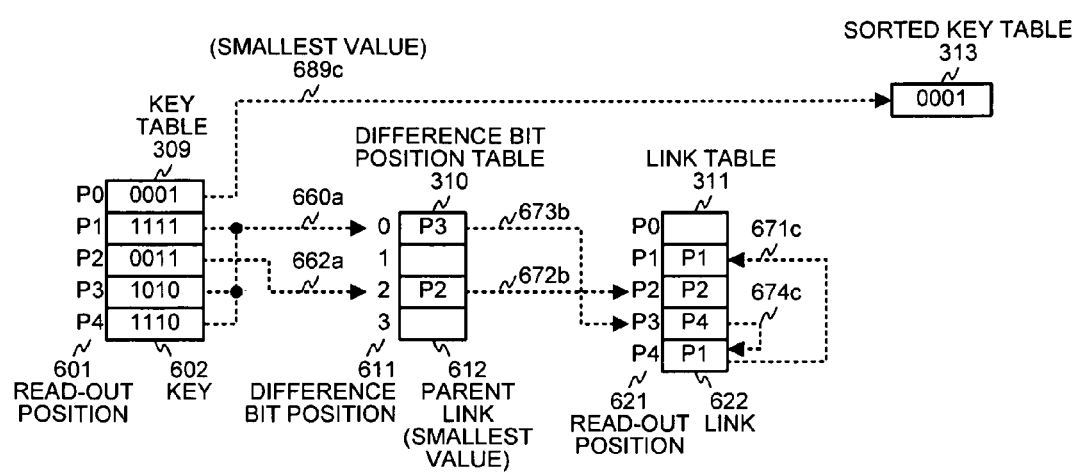
FIG. 2B is a drawing describing an example of a data configuration used in sort processing using a difference bit position in the first embodiment of this invention.

FIG. 2B describes an example of a data configuration used in sort processing using a difference bit position in the first embodiment of this invention. As shown in FIG. 2B, key table 309, difference bit position table 310, link table 311, and sorted key table 313 are used.

Key table 309 is a table wherein the keys to be sorted 602 are read-in and set when there is a sort request. In the example shown in FIG. 2B, the 5 keys included in key string 100 shown in FIG. 1 and FIG. 2A are read into key table 309 as the keys to be sorted 602. The top read-out position 601 in key table 309 is P0, and P1, P2, P3, P4 follow below it. Although the smallest value key "0001" is set in read-out position P0, it can also be kept in a separate area. The smallest value key is stored in a predetermined position in sorted key table 313, as shown by the dotted-line arrow 689c.

The difference bit position table 310 is a table that holds, as parent link 612, the read-out position 601 of the smallest key of the keys with the same difference bit position with respect to the smallest value key for every difference bit position 611. As shown by the dotted-line arrow 660a in the example shown in FIG. 2B, read-out position P3 for the smallest key "1010" of the keys "1111", "1010", "1110" with the same difference bit position of "0" with respect to the smallest value key "0001" is stored in the position in difference bit position table 310 whose difference bit position 611 is "0". Also, because key "0011" is the only key whose difference bit position with respect to the smallest value key "0001" is 2, the read-out position P2 for key "0011" is stored in the position in difference bit position table 310 whose difference bit position 611 is "2", as shown by the dotted-line arrow 662a.

Link table 311 is a table for accessing keys with the same difference bit position with respect to the smallest value. As shown in the drawing, a link 622 is stored showing the read-out position of keys with the same difference bit position for the read-out position 621 of the keys.

As shown by the dotted-line arrow 673b from difference bit position table 310 to link table 311, for the read-out position P3 in key table 309 for the smallest value key of the keys with the same difference bit position "0", that read-out position P3 is taken to be the read-out position 621 in link table 311 (hereinbelow, this is called read-out position P3 in link table 311), and in that read-out position is stored the read-out position P4 in key table 309 for the key "1110" with the same difference bit position "0" as the smallest value key "1010" of the keys with difference bit position "0" with respect to the smallest value key "0001".

Then, as shown by the dotted-line arrow 674c in the drawing, key table 309 read-out position P1 for the key "1111" with the same difference bit position "0" is stored in link table 311 read-out position P4. Also, as shown by the dotted-line arrow 671c in the drawing, key table 309 read-out position P1 is stored in the same-valued read-out position P1 in link table 311. Storing the same value at the same position indicates that there are no more keys with the same difference bit position "0".

Also, for the read-out position P2 in key table 309 for the smallest value key of the keys with the same difference bit position "2", key table 309 read-out position P2 is stored in the same-valued read-out position P2 in link table 311, as shown by the dotted-line arrow 672b from difference bit position table 310 to link table 311. This indicates that the key "0011" in key table 309 read-out position P2 is the smallest key of the keys with difference bit position "2" with respect to the smallest value key "0001" and that it is also the last of those keys.

The status of difference bit position table 310 and link table 311 which is shown in the above noted FIG. 2B is that obtained through executing the classification-by-difference-bit-position 149a shown in FIG. 2A.

As is clear from the above description, the above noted key table 309 is one implementation example of a keys-to-be-sorted storage means in this invention, related to claim 1. Also, one implementation example of a key-to-be-classified difference bit position storage means is configured by a difference bit position table 310 and a link table 311, and the read-out position 601 in the key table 309 corresponds to identification information for the key.

Figure 2C:
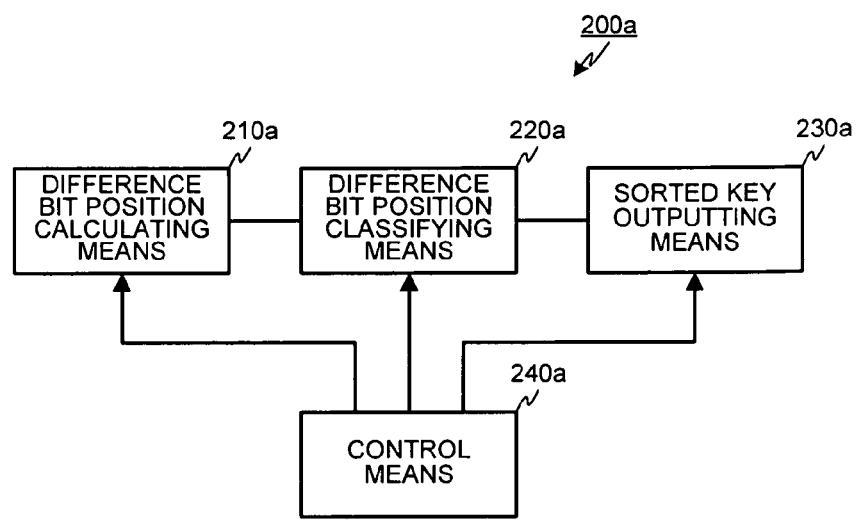
FIG. 2C is a drawing describing an example of function blocks configuring a bit string data sort apparatus in the first embodiment of this invention.

FIG. 2C is a drawing describing an example of function blocks configuring a bit string data sort apparatus in the first embodiment of this invention.

As shown in the drawing, bit string data sort apparatus 200a includes a difference bit position calculating means 210a, a difference bit position classifying means 220a, a sorted key outputting means 230a, and a control means 240a. Hereinbelow an overview of the operation of each means is described referencing the example shown in FIG. 2B.

The difference bit position calculating means 210a computes the difference bit position from among the keys 602 stored in key table 309 for the keys that are subject to classification-by-difference-bit-position. The control means 240a takes all the keys stored in key table 309 as subject to the first classification processing. In this case, the reference key for computing a difference bit position is the smallest value key "0001", stored in read-out position P0. The sorted key outputting means 230a outputs the smallest value key "0001" to sorted key table 313.

The difference bit position classifying means 220a generates the difference bit position table 310 and the link table 311 based on the computation results of the difference bit position calculating means 210a. As a result, the identification information for the keys is classified into group (P3, P4, P1) with the difference bit position "0" and group (P2) with the difference bit position "2" as read-out positions 601 in key table 309.

The control means 240a controls the processing for groups that, after classification, include a plurality of keys such that difference bit position computation by difference bit position calculating means 210a and classification processing by difference bit position classifying means 220a is further repeated.

Figure 3:
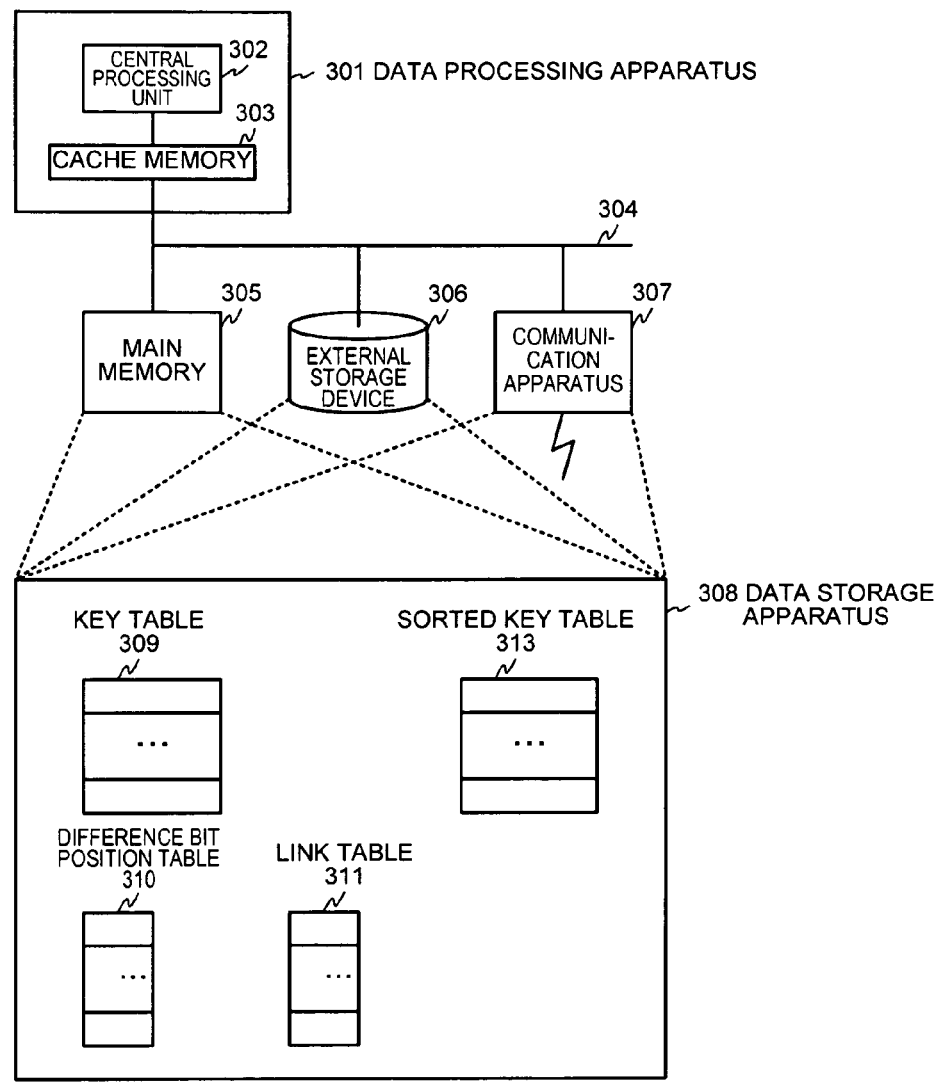
FIG. 3 is a drawing describing an exemplary hardware configuration in this invention.

FIG. 3 is a drawing describing an exemplary hardware configuration in this invention.

Sort processing according to this invention is implemented by a data processing apparatus 301 having at least a central processing unit 302 and a cache memory 303, and a data storage apparatus 308. Data storage apparatus 308 holding the key table 309, the difference bit position table 310, the link table 311, and the sorted key table 313 can be implemented by a main storage device 305 or an external storage device 306, or alternatively, by using a remotely disposed apparatus connected via a communication apparatus 307.

In the third embodiment of this invention, the difference bit position table 310 is composed of two tables, the difference bit position table 310a and the difference bit position table 310b.

In the example shown in FIG. 3, although the main storage device 305, the external storage device 306, and the communication apparatus 307 are connected to the data processing apparatus 301 by a single bus 304, there is no restriction to this connection method. Also it will be understood that it is alternatively possible to select appropriate hardware elements in accordance with the usable hardware environment and the size of the set of keys to be sorted, for example that the main storage apparatus 305 can be disposed within the data processing apparatus 301, that the key table 309 can be held in external storage apparatus 306, and that the other tables held in the main storage apparatus 305 and so forth.

Also, although it is not particularly illustrated, a temporary storage area in main storage apparatus 305 can of course be used to enable various values obtained during processing to be used in subsequent processing. Thus, in the descriptions hereinbelow, values that stored or set in a temporary storage area may be called by the name of the temporary storage area.

Figure 4A:
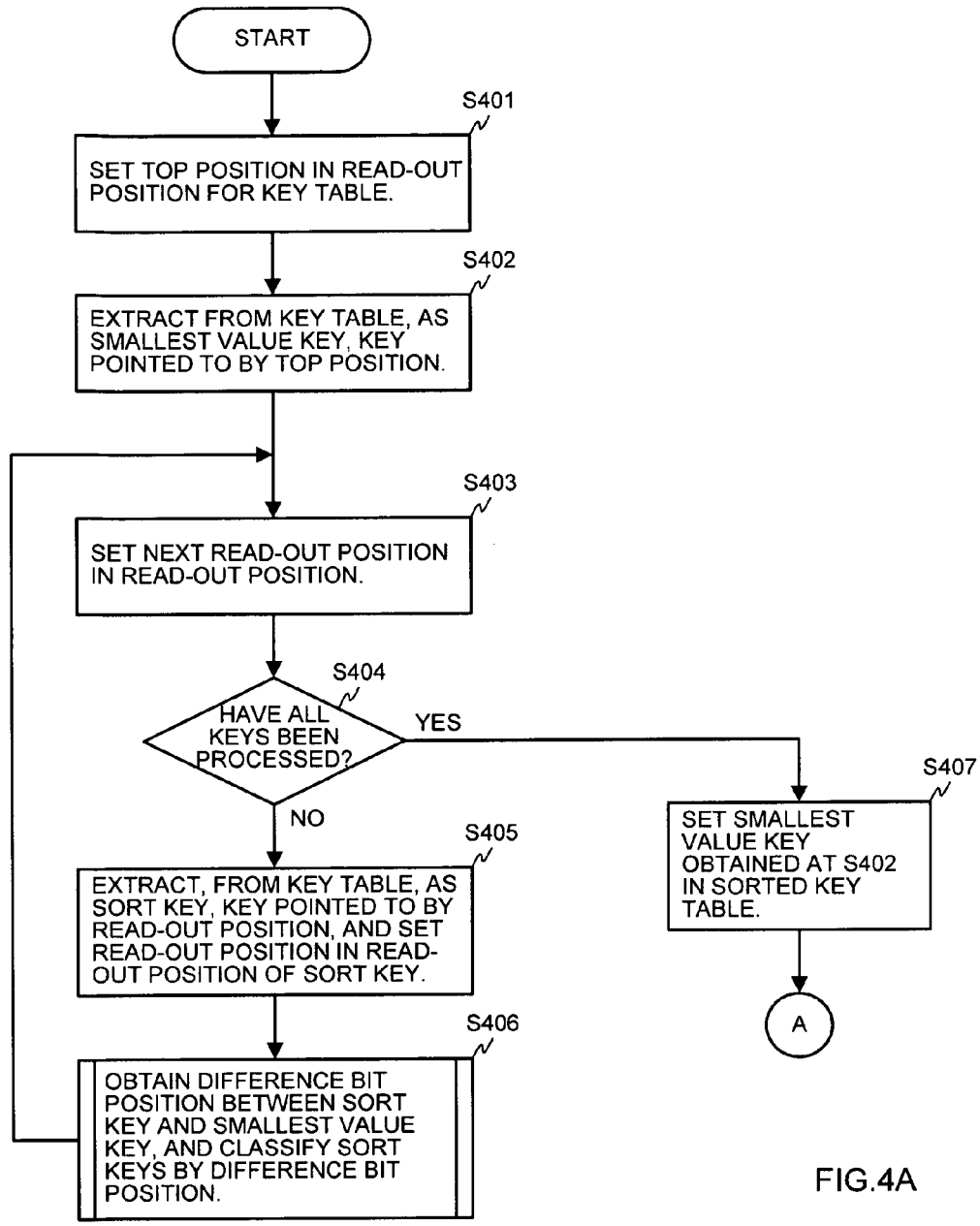
FIG. 4A is a drawing describing an example of the processing flow for the first stage of sort processing for classifying keys and outputting the smallest value key as a sorted key in the first embodiment of this invention.
Figure 4B:
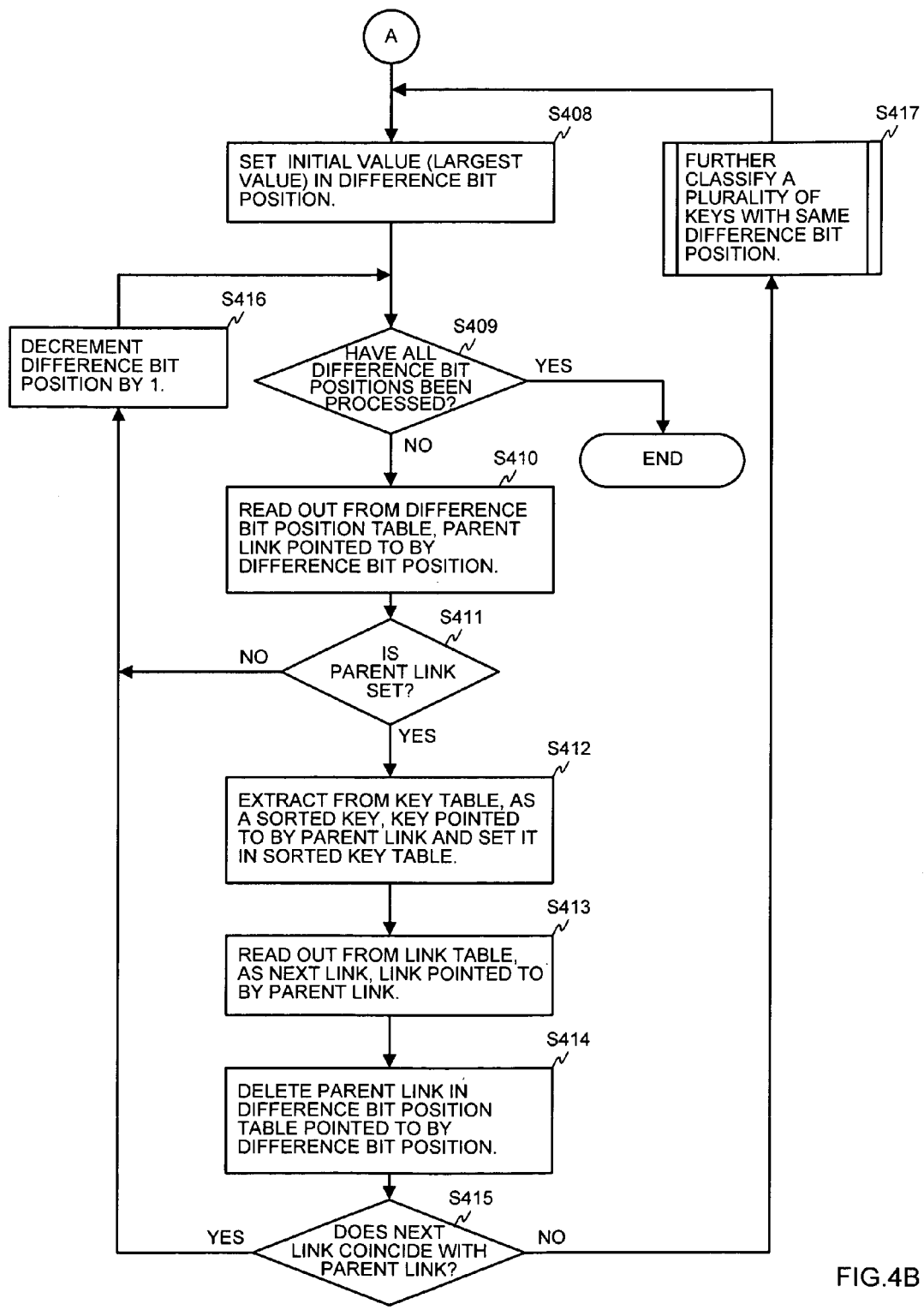
FIG. 4B is a drawing describing an example of the processing flow for the sort processing stages after the first stage that classify keys and output sorted keys in the first embodiment of this invention.

Next, details of the first embodiment of sort processing in this invention are described referencing FIG. 4A and FIG. 4B. Also, the examples shown in FIG. 2A or FIG. 2B are used as appropriate in the description.

FIG. 4A is a drawing describing an example of the processing flow for the first stage of sort processing for classifying keys and outputting the smallest value key as a sorted key in the first embodiment of this invention. The keys to be sorted are stored in the key table, and it is presumed that the smallest value key is stored in the top read-out position in the key table. In other words, the keys included in key string 100 shown in FIG. 2A are taken to be those stored in key table 309 shown in FIG. 2B.

First, in step S401, the top position for the key table is set in the key table read-out position (hereinbelow this may be simply called the read-out position). What is called the "key table read-out position" is one of "the temporary storage areas applied to various processings for holding the various values obtained in the midst of processing to be used in later processing" as noted above. In the description hereinbelow, the description may omit the expression that the "key table read-out position" is an unillustrated temporary storage area as in the wording "set the top position for the key table in the key table read-out position".

The setting operation noted above sets P0 in the key table read-out position in the example shown in FIG. 2B.

Next, in step S402, the key pointed to by the top position is extracted from the key table as the smallest value key. Here, the expression "extract as the smallest value key" means to set it in the smallest value key, which is an unillustrated temporary storage area. Hereinbelow, there are cases wherein the same kind of expression is used.

Proceeding to step S403, the next read-out position is set in the read-out position. Next, in step S404, a determination is made whether all the keys have been processed, in other words, whether the initial stage of classification processing for all the keys is finished.

If all the keys have not been processed, processing proceeds to step S405, wherein the key pointed to by the read-out position is extracted from the key table as the sort key and its read-out position is set in the sort key read-out position. Then in step S406, the difference bit position between the sort key and the smallest value key is obtained, and the sort keys are classified by means of the difference bit position and a return is made to step S403.

The processing of step S406 sets information in the difference bit position table and the link table as part of the initial stage of classification processing. Details of that processing are described later referencing FIG. 5A and FIG. 5B.

Conversely, when, at step S404, the determination is that all the keys have been processed, a branch is made to step S407, and the smallest value key obtained at step S402 is set in the sorted key table, and processing proceeds to step S408 and thereafter shown in FIG. 4B. The above processing sets each of the values for the related entries in the difference bit position table 310 and the link table 311 as shown in the example in FIG. 2B. Also, the smallest value key "0001" is stored in sorted key table 313.

FIG. 4B is a drawing describing an example of the processing flow for the sort processing stages after the first stage that classifies keys and outputs sorted keys in the first embodiment of this invention.

In step S408, the difference bit position for the difference bit position table is initialized, in other words, the largest value for the difference bit positions that could possibly be held by the keys to be sorted is set in the difference bit position, which is an unillustrated temporary storage area. In the example shown in FIG. 2B, 3 is set as the largest value for the difference bit positions.

In step S409, a determination is made whether all the difference bit position entries in the difference bit position table have been processed, and if all have been processed, processing is terminated, and if they have not all been processed, processing proceeds to step S410.

At step S410, the parent link is read out from the entry in the difference bit position table pointed to by the difference bit position. If a parent link is stored in the entry pointed to by the difference bit position, the read-out parent link is stored in the parent link, which is a temporary storage area. In other words, in descriptions of preferred embodiments of this invention, expressions such as "read out the parent link" means to read out the parent link and set it in the parent link, which is an unillustrated temporary storage area. The same applies to things other than the parent link.

At step S411, a determination is made whether the parent link is set. If the parent link is not set, at step S416, the value of the difference bit position is decremented by 1, and a return is made to step S409, while, conversely, if the parent link is set, processing proceeds to step S412.

At step S412, the key pointed by the parent link (key table read-out position) set at step S410 is extracted from the key table as the sorted key, and that read-out sorted key is set in the sorted key table. As was described above, because the key stored in that read-out position in the difference bit position table is the key with the smallest value among the keys classified at the same difference bit position, it is set in the sorted key table at step S412.

Next, at step S413, the link pointed to by the parent link set at step S410 is read out from the link table, and at step S414, the parent link in the difference bit position table entry pointed to by the difference bit position is deleted and processing proceeds to step S415. The parent link in the difference bit position table entry pointed to by the difference bit position is deleted because the classification processing for the smallest value key, whose read-out position at the key table is the parent link, is completed at step S412, and thus this parent link in the difference bit position table is no longer necessary and the deletion avoids the effect on later processing of this parent link remaining in difference bit position table.

At step S415, a determination is made whether the next link read out at step S413 coincides with the parent link set at step S410.

When the determination at step S415 is that the next link coincides with the parent link, a return is made to step S409 via step S416 described above.

The processing loop of steps S409 to S416 noted above extracts the sorted keys in descending order of their difference bit position and stores them in the sorted key table. Because the value of keys with larger difference bit positions are closer to the value of the smallest value key, extracting sorted keys in descending order of their difference bit position enables the sorted keys to be stored in the sorted key table in ascending order.

At step S415, the determination that the next link coincides with the parent link means that the key with the difference bit position stored in the parent link is the only key with a parent link for that key table read-out position. In the example shown in FIG. 2B, that is the case wherein read-out position 621 in link table 311 is P2 and link 622 is P2. Also, in the example shown in FIG. 2A, key group 142a is configured only with key "0011", and corresponds to the case wherein classification processing is not performed for key group 142a. Then, because this case indicates the termination of classification processing for the difference bit position in the difference bit position table wherein the parent link is stored, the difference bit position is decremented by 1, and processing proceeds to the processing of steps S409 to S415 on the next difference bit position. In the example shown in FIG. 2A, the processing is done on key group 140*a* at difference bit position "0".

Conversely, when the determination at step S415 is the next link and parent link do not coincide, processing proceeds to step S417 and a plurality of keys with same difference bit position (set at step S408 or step S416) are further classified by a lower level difference bit position. Details of the processing in step S417 is described later referencing FIG. 5C.

A case wherein the determination is that the next link does not coincide with the parent link is the case in the example shown in FIG. 2B wherein the read-out position 621 in the link table 311 is P3 and link 622 is P4. In the example shown in FIG. 2A, classification 149*b* and 149*c* are executed on the plurality of keys in key group 140*a* using their difference bit positions.

The processing of step S417 sets the difference bit position table and link table again, and a return is made to step S408. Then processing is repeated on the difference bit positions in the newly set difference bit position table wherein parent links are specified.

The above processing is repeated until the determination in step S409 is that processing has been finished for all the entries at all the difference bit positions in the difference bit position table, and when that determination is made processing is terminated because the sort of the keys to be sorted is completed.

The processing shown in the example in FIG. 4B takes the reference key that is used to compute the difference bit position as the smallest key and executes processing in the descending order of difference bit positions and extracts the sorted keys in ascending order. As was noted above, however, if the reference key that is used to compute the difference bit position is taken as the largest key, it will be clear to one skilled in the art that processing can be done, by taking, as the parent link, the read-out position of the largest value key among the keys with the same difference bit position with respect to the reference key, in the descending order of the difference bit positions and the sorted key can be extracted in descending order, based on the detailed specifications and drawings described in this invention.

Figure 5A:
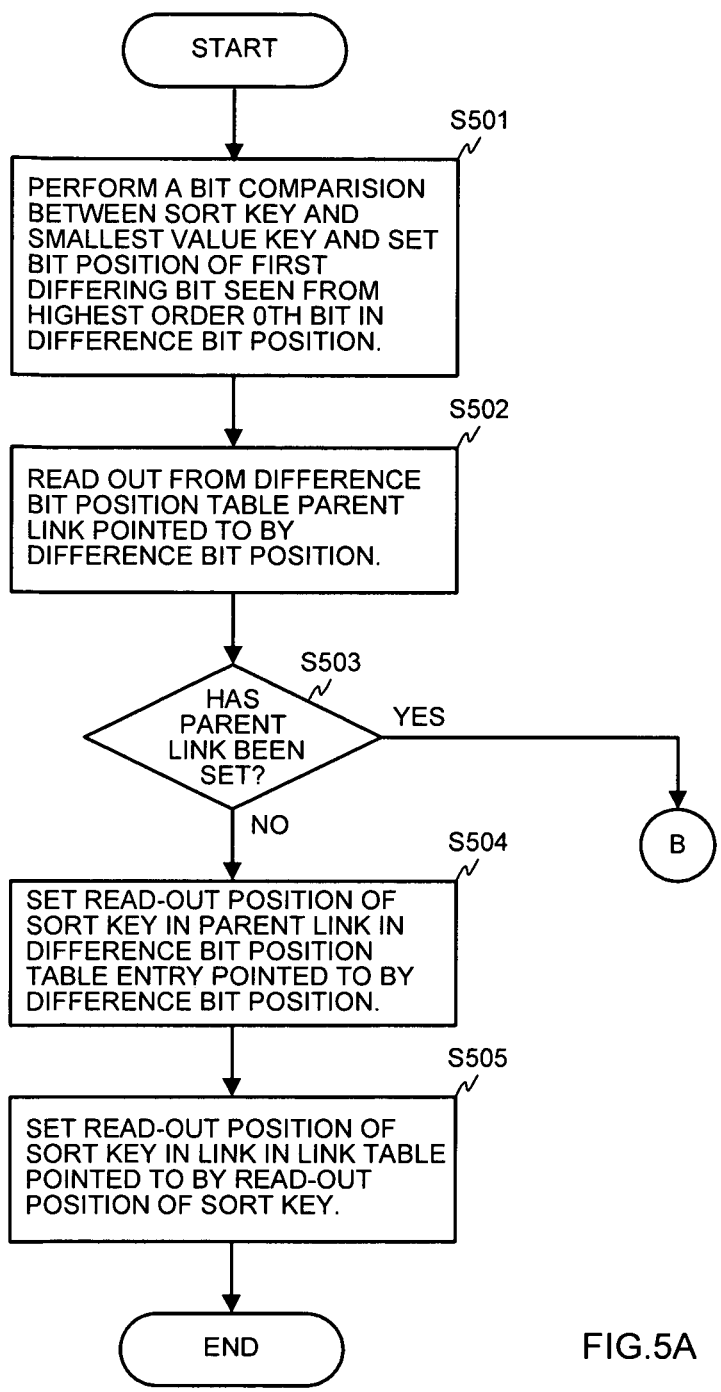
FIG. 5A is a drawing describing an example of the processing flow in the prior stage of classifying keys in the first embodiment of this invention.
Figure 5B:
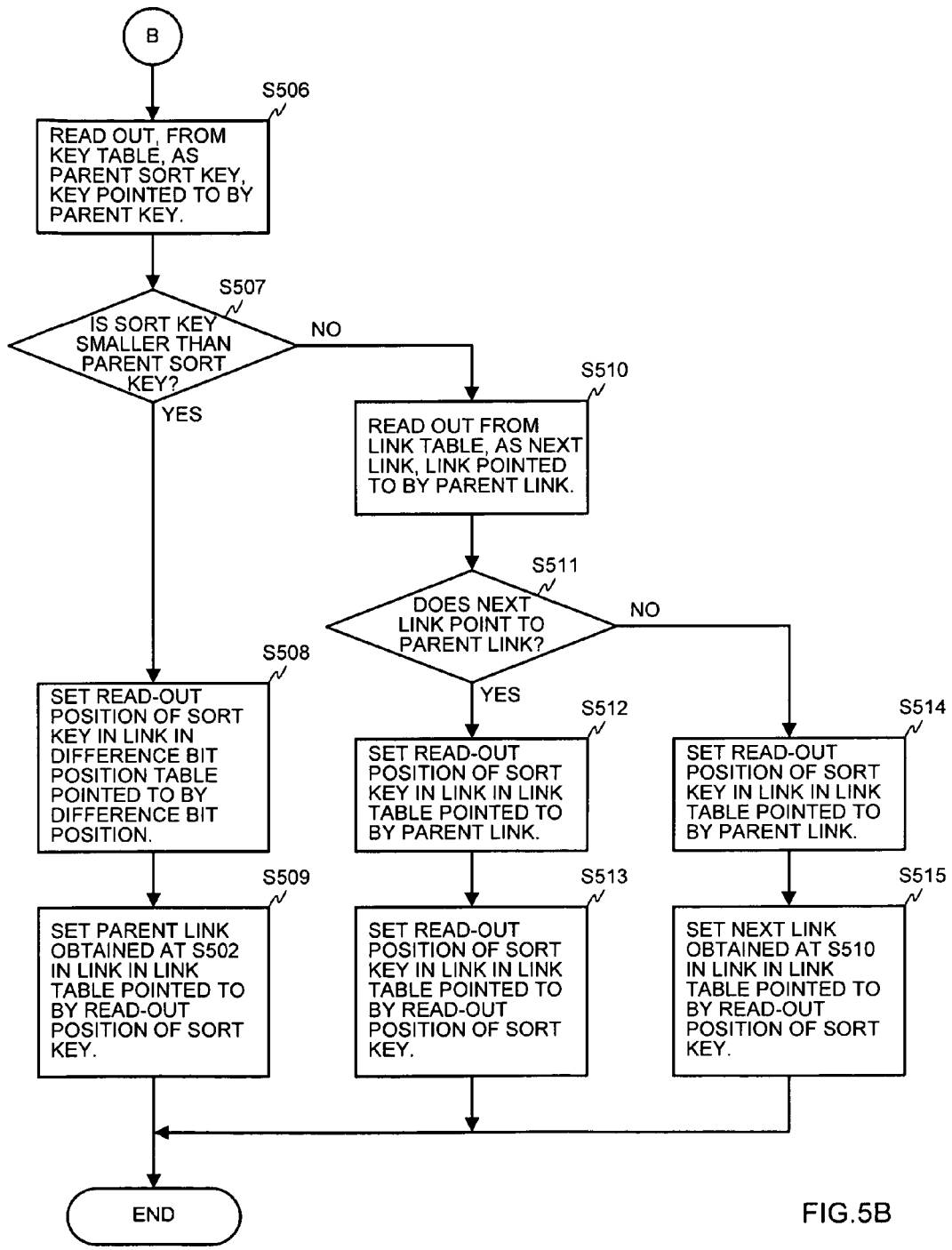
FIG. 5B is a drawing describing an example of the processing flow in the latter stage of classifying keys in the first embodiment of this invention.

Next, key classification processing in the first embodiment of this invention is described referencing FIG. 5A and FIG. 5B. FIG. 5A and FIG. 5B depict an example of the detailed processing flow in the processing of step S406 shown in FIG. 4A and step S524 of FIG. 5C, described later.

FIG. 5A is a drawing describing an example of the processing flow in the prior stage of classifying keys in the first embodiment of this invention.

As shown in FIG. 5A, at step S501, a bit string comparison is done between the key set in the sort key and the key set in the smallest value key, and the bit position of the first non-matching bit seen from the highest level 0th bit is set in the difference bit position. The sort key is set at step S405 shown in FIG. 4A or at step S522 shown in FIG. 5C described below, and it is the key subject to the classification processing shown in FIG. 5A and FIG. 5B.

Next, at step S502, the parent link pointed to by the difference bit position set at step S501 is read out from the difference bit position table, and at step S503 a determination is made whether the parent link has been set. If the parent link has not been set, processing proceeds to step S504, wherein the sort key read-out position is set in the parent link in the difference bit position table entry pointed to by the difference bit position, and in step S505 the sort key read-out position is set in the link in the link table entry pointed to by the sort key read-out position and processing is terminated.

Although, as noted above, the read-out position of the smallest key among the keys with the same difference bit position is stored in the difference bit position table as the parent link, the processing of the above noted step S504 takes the first sort key as a provisional smallest value key and sets its sort key read-out position in the parent link pointed to by the difference bit position in the difference bit position table. Once the parent link has been set, in other words, when the determination at step S503 is that the parent link has been set, processing proceeds to the latter stage processing shown in FIG. 5B, and the smallest value key is updated by a magnitude comparison between the sort key and the smallest value key, and finally, the read-out position of the smallest key among the keys with the same difference bit position is set in the difference bit position table as the parent link.

Also, in the processing in step S504, the sort key read-out position is the position set in step S405 shown in FIG. 4A or the position set in step S523 shown in FIG. 5C described later.

FIG. 5B is a drawing describing an example of the processing flow in the latter stage of classifying keys in the first embodiment of this invention.

As shown in FIG. 5B, at step S506, the key pointed to by the parent link is read out from the key table as the parent sort key, and at step S507, a determination is made whether the sort key is smaller than the parent sort key.

When the determination at step S507 is that the sort key is smaller than the parent sort key, processing proceeds to step S508, wherein the sort key read-out position is set in the parent link pointed to by the difference bit position in the difference bit position table, and at step S509, the parent link obtained at step S502 is set in the link in the link table pointed to by the sort key read-out position, and processing is terminated.

The processing in the above noted step S508 is the processing to update a parent link with the read-out position of a smaller key in order to set the read-out position of the smallest key among the keys in the parent link pointed to by the difference bit position in the difference bit position table. Then the processing in step S509 is the processing to maintain information for traversing the read-out positions in the link table of keys with the same difference bit position, by setting the parent link set in the difference bit position table into the link in the link table entry pointed to by the new sort key read-out position set in the difference bit position table.

Conversely, when the determination at step S507 is that the sort key is not smaller than the parent sort key, processing proceeds to step S510, wherein the next link pointed to by the parent link is read out from the link table as the next link, and at step S511, a determination is made whether the next link coincides with the parent link.

When the determination at step S511 is that the next link coincides with the parent link, in step S512, the sort key read-out position is set in the link in the link table entry pointed to by the parent link. Then, in step S513, the sort key read-out position is set in the link in the link table entry pointed to by the sort key read-out position, and processing is terminated.

Conversely, when the determination at step S511 is that the next link does not coincide with the parent link, processing proceeds to step S514, wherein the sort key read-out position is set in the link in the link table entry pointed to by the parent link. Then in step S515, the next link obtained at step S510 is set in the link in the link table pointed to by the sort key read-out position, and processing is terminated.

The determination in step S511 noted above is the same as a determination whether there is only 1 key classified into a group of keys with the same difference bit position. If there is only 1 key classified into that group, its read-out position is stored in the link in the link table entry pointed to by the read-out position of that key. Hence, it is updated by the sort key read-out position and the sort key read-out position is set in the link in the link table entry pointed to by the sort key read-out position, and the sort key indicates that that key is the last key to be classified at that point in time. When there are 2 or more keys classified into a group, the sort key read-out position is inserted into the link relationship expressed by the link table, between the parent link and the next link, by the processing of steps S514 and S515 processing.

Figure 5C:
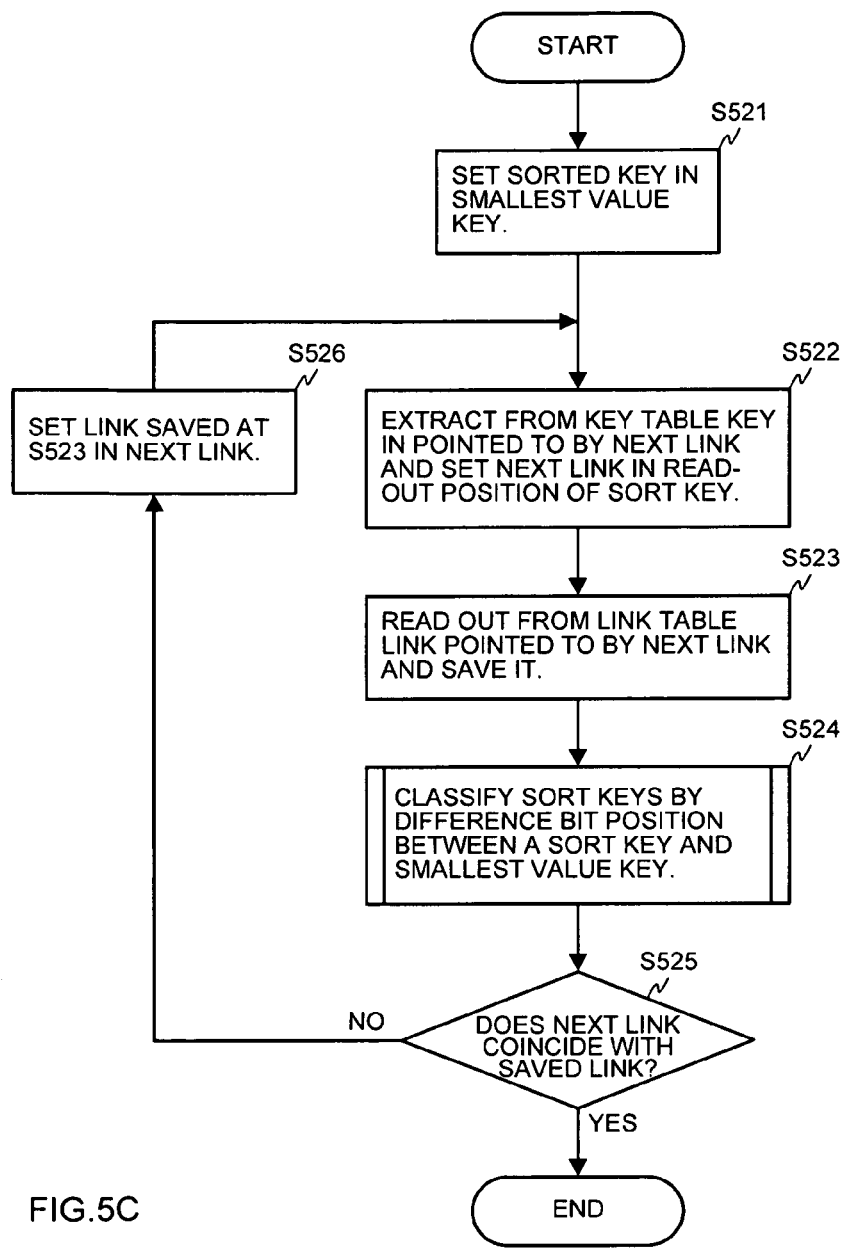
FIG. 5C is a drawing describing an example of the processing flow for further classifying keys when a plurality of keys have the same difference bit position in the first embodiment of this invention.

Next details of the processing flow for further classifying, in the first embodiment of this invention, a plurality of keys with the same difference bit position, which is the processing of step S417 shown in FIG. 4B, is described referencing FIG. 5C.

FIG. 5C is a drawing describing an example of the processing flow for further classifying keys when a plurality of keys have the same difference bit position in the first embodiment of this invention.

As shown in FIG. 5C, in step S521, the sorted key is set in the smallest value key. The sorted key is the one obtained at step S412 shown in FIG. 4B, and is the reference key for computing, in step S524 described below, the difference bit position of the sort keys.

Proceeding to step S522, the key pointed to by the next link is extracted from the key table as the sort key and the next link is set in the read-out position for the sort key. Then, in step S523, the link pointed to by the next link is read out from the link table and is saved in a save area. The next link in step S522 is the link pointed to by the parent link read out from the link table in step S413 shown in FIG. 4B. If the classification processing is that of the keys with difference bit position "0" in the example in FIG. 2B, the parent link is P3, the next link is P4, and the link that is pointed to by the next link and saved in the save area is P1.

The link pointed to by the next link is saved in step S523 in order to ensure sound processing in step S524 and thereafter for processing using the link pointed to by the next link, by saving it in advance, because in the next step, step S524, classification processing is done based on the difference bit position between the sort key set at step S522 and the smallest value key set at step S521, and as a result of that processing the value of the link in the link table pointed to by the next link is rewritten.

At step S524, the difference bit position is obtained between the sort key and the smallest value key and the sort keys are classified by that difference bit position, which was described in detail referencing FIG. 5A and FIG. 5B.

Then in step S525, a determination is made whether the next link coincides with the saved link. If the saved link coincides with the next link, processing is terminated because there are no more keys to be classified at the same difference bit position.

Conversely, when the determination in step S525 is that the saved link does not coincide with the saved link, the saved link is set in the next link in step S526, and a return is made to step S522, and classification processing continues with the key subject to classification whose key table read-out position is the newly set next link.

The above noted processing loop of steps S522 to S526 is repeated until the saved link coincides with the next link, in other words, until all keys subject to classification have been processed and when all keys subject to classification have been processed processing is terminated.

The above described details of the first embodiment of this invention. Hereinbelow the processing shown in the examples in FIG. 2A and FIG. 2B is described referencing FIG. 6A to FIG. 9D in order to facilitate understanding of this invention.

Figure 6A:
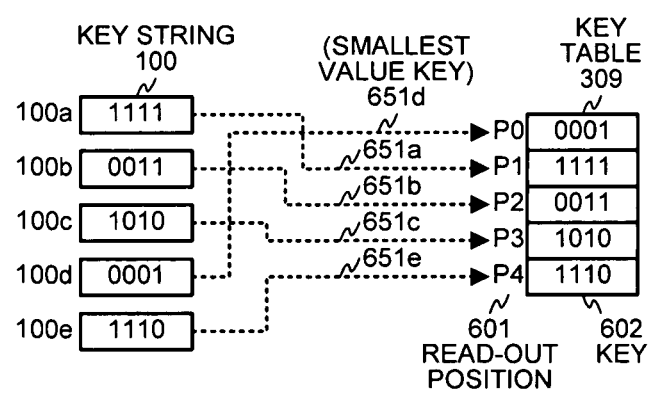
FIG. 6A-FIG. 6C are drawings describing the data flow in the first stage of extracting keys in ascending order in the first embodiment of this invention.
Figure 6B:
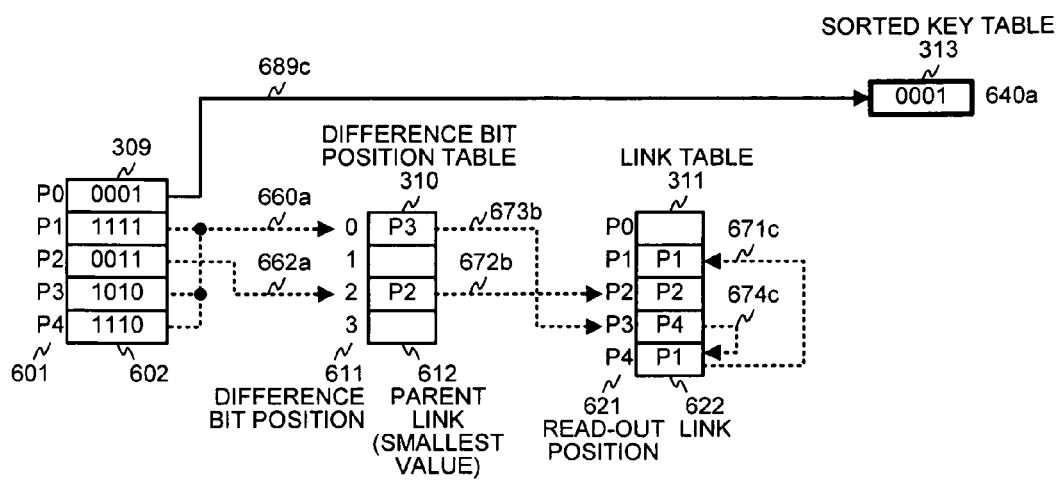
Figure 6C:
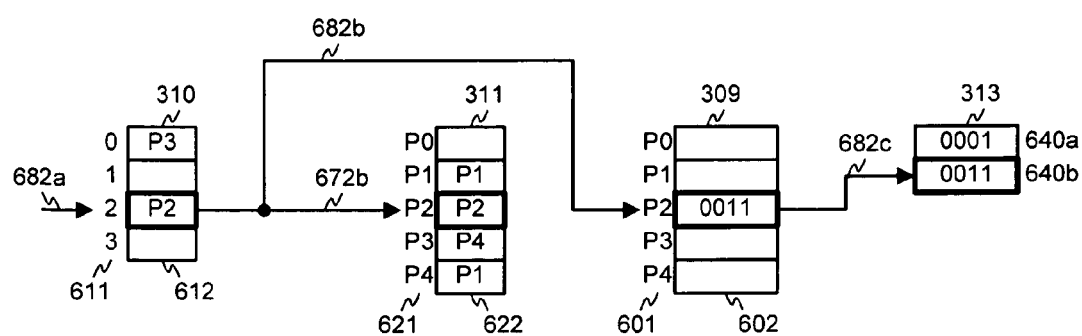

FIG. 6A-FIG. 6C are drawings describing the data flow in the first stage of extracting keys in ascending order in the first embodiment of this invention.

FIG. 6A shows the data flow for setting keys included in key string 100 into key table 309.

As shown by the dotted-line arrow 651a, key "1111" at key position 100a is set in read-out position P1 in key table 309. In the same way, key "0011" at key position 100b is set in read-out position P2 in key table 309, as shown by the dotted-line arrow 651b; key "1010" at key position 100c is set in read-out position P3 in key table 309, as shown by the dotted-line arrow 651c; and key "1110" at key position 100e is set in read-out position P4 in key table 309, as shown by the dotted-line arrow 651e. Key "0001" at key position 100d is set in read-out position P0 in key table 309 as the smallest value key, as shown by the dotted-line arrow 651d FIG. 6B shows the status after the smallest value key has been extracted as a sorted key in the first stage of classification processing, and the keys to be sorted have been classified by the difference bit position when the smallest value key is taken as the reference key. This status is similar to the status shown in FIG. 2B described hereinabove. The smallest value key "0001" set in the top read-out position P0 in key table 309 is set at the top of sorted key table 313 in write position 640a, as shown by arrow 689c.

Also, as shown by the dotted-line arrow 660a in the drawing, the smallest key of the 3 keys whose difference bit position is "0" is the key "1010" and its read-out position P3 is stored in difference bit position "0" in difference bit position table 310 as the parent link, and the smallest key of the single key whose difference bit position is "2" is the key "0011" and its read-out position P2 is stored in difference bit position "2" in difference bit position table 310 as the parent link.

The read-out position of keys with the same difference bit position are stored in link table 311, in the read-out position 621 of the parent link set in difference bit position table 310. In other words, P4 is stored as link 622 in the read-out position 621 pointed to by parent link P3, and P2 is stored as link 622 in the read-out position 621 pointed to by parent link P2.

As shown by the dotted-line arrow 674c, P1 is stored as link 622 in the read-out position 621 pointed to by link P4, and the same P1 is stored as link 622 in the read-out position 621 pointed to by link P1 as shown by the dotted-line arrow 671c. This indicates that there are no more keys with the same difference bit position "0". In other words, this indicates that this key, key "1111" with read-out position P1 in key table 309, is the last of the keys at the same difference bit position in link table 311.

The fact that P2 is stored in link 622 whose read-out position 621 is P2 corresponds to the fact that the key "0011" at read-out position P2 in key table 309 is the only key at the same difference bit position in link table 311. Details of the setting of the difference bit position table 310 and link table 311 shown in FIG. 6B is described hereinbelow referencing FIG. 9A-FIG. 9D.

FIG. 6C is a drawing describing the flow for storing, in sorted key table 313 as a sorted key, from the key groups classified in the first stage of classification processing, the smallest value key "0011" in the key group that includes key "0011" (actually only 1 key is included) and whose read-out position is taken to be the parent link P2 whose difference bit position 611 is "2".

Parent link 612 is extracted in descending order of the difference bit positions 611 in difference bit position table 310. In the case of the example in the drawing, the parent link P2 of the entry whose difference bit position 611 shown by arrow 682b is 2 is extracted, and, as shown by arrow 682b in the drawing, key "0011" is read out from read-out position 601 in key table 309 pointed to by parent link P2, and is written into write position 640b in sorted key table 313 as shown by arrow 682c.

Also, because link 622 stored in read-out position 621 of link table 311 and associated with the parent link P2 shown by the arrow 672b is the same P2 as the parent link 612, no more classification is done for difference bit position "2". At this point, parent link P2, which is stored in difference bit position "2" in the difference bit position table 310, is deleted to prevent it from obstructing later processing.

Figure 7A:
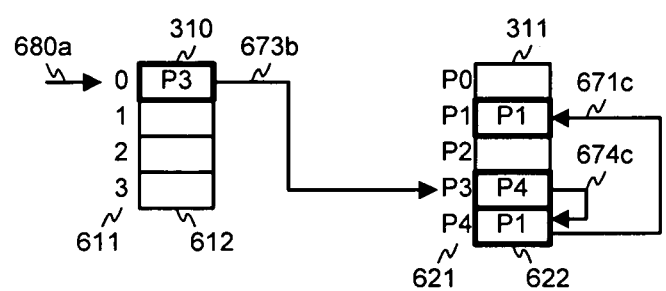
FIG. 7A-FIG. 7C are drawings describing the data flow in the middle stage of extracting keys in ascending order in the first embodiment of this invention.
Figure 7B:
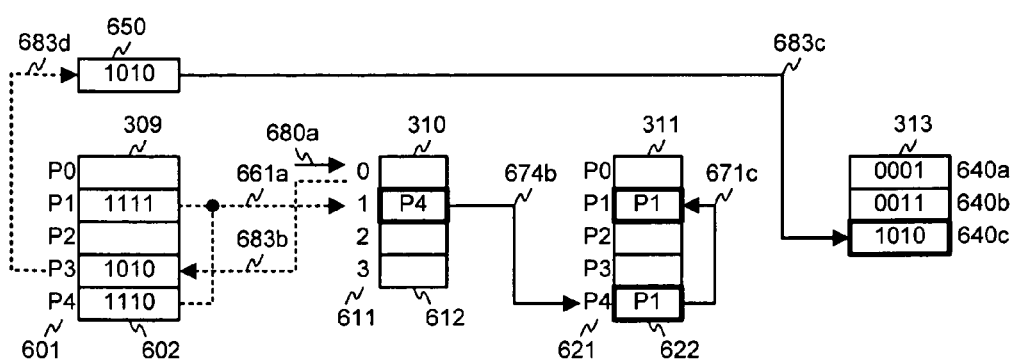
Figure 7C:
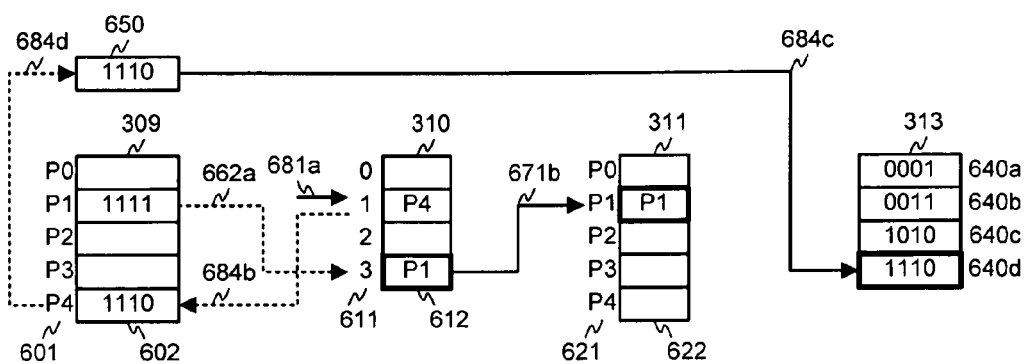

FIG. 7A-FIG. 7C are drawings describing the data flow in the middle stage of extracting keys in ascending order in the first embodiment of this invention.

FIG. 7A shows the status of the difference bit position table 310 and the link table 311 when, following the processing of difference bit position "2" shown in FIG. 6C, classification processing starts at difference bit position "0", as shown by arrow 680a in the drawing. This status is the same as that shown in FIG. 6B except that parent link P2 has been deleted from the difference bit position "2" entry in the difference bit position table. In this regard, because the value in the entry for read-out position P2 in link table 311 is unnecessary, it is omitted.

FIG. 7B shows the flow for classifying keys whose difference bit position is "0" when the smallest value key "0001" shown in FIG. 6B is taken as the reference key. In the example shown in FIG. 2A, this corresponds to the classification 149b using that difference bit position.

The parent link P3 at difference bit position "0" in the difference bit position table 310, shown by arrow 680a, is extracted, and using P3 shown by dotted-line arrow 683b as the read-out position for key table 309, as shown by the dotted-line arrow 683d, the key "1010" stored at read-out position P3 in key table 309, in other words, the key pointed to by parent link P3, is extracted as a sorted key, at step S412 shown in FIG. 4B, and is set in sorted key 650, which is one of the temporary storage areas, and furthermore is written to write position 640c in sorted key table 313.

The difference bit position "1" between key "1010", which is set in sorted key 650 and is smallest among the keys with the same difference bit position "0" with respect to the key "0001" which is the smallest value key among the keys subject to the previous classification, and keys "1111" and "1110" with the same difference bit position "0" with respect to the key "0001" is calculated, and, as shown by the dotted-line arrow 661a in the drawing, P4, which is the read-out position in the smaller direction, is stored in the entry whose difference bit position 621 in difference bit position table 310 is "1" as parent link 612.

Furthermore, as shown by arrow 674b, read-out position P1 is stored in link 622 in link table 311, pointed to by parent link P4, and the same P1 is stored in the link in link table 311 pointed to by that read-out position P1, as shown by arrow 671c.

FIG. 7C shows the flow for classifying keys whose difference bit position is "3" when the smallest value key "1010" shown in FIG. 7B is taken as the reference key. In the example shown in FIG. 2A, this corresponds to the classification 149c using that difference bit position.

The parent link P4, shown by the arrow 681a, at difference bit position "1" in difference bit position table 310, is extracted, and the P4 shown by dotted-line arrow 684b is taken to be a read-out position and the key "1110" stored in the read-out position P4 in key table 309, in other words, the key pointed to by parent link P4, is extracted as a sorted key, set in sorted key 650, which is a temporary storage area, as shown by dotted-line arrow 684d from key table 309, and furthermore is written to write position 640d in sorted key table 313 at step S412 shown in FIG. 4B.

The difference bit position "3" between key "1110", which is set in sorted key 650 and is smallest among the keys with the same difference bit position "1" with respect to the key "1010" which is the smallest value key among the keys subject to the previous classification, and key "1111" with the same difference bit position "1" with respect to the key "1010" is calculated, and, as shown by the dotted-line arrow 662a in the drawing, P1, which is the read-out position of only one key and is the read-out position in the smaller direction, is stored in the entry whose difference bit position 621 in difference bit position table 310 is "3" as parent link 612.

Furthermore as shown by arrow 671b, the value P1, which is the same value as the parent link, is stored in link 622 in link table 311 pointed to by the parent link P1.

Figure 8:
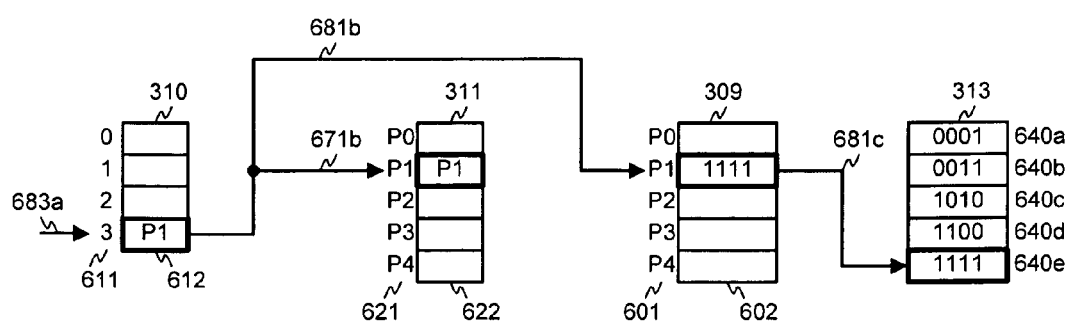
FIG. 8 is a drawing describing the data flow in the final stage of extracting keys in ascending order in the first embodiment of this invention.

FIG. 8 is a drawing describing the data flow in the final stage of extracting keys in ascending order in the first embodiment of this invention. Due to the processing shown in FIG. 7C, only the parent link P1 in the entry at difference bit position "3" is stored in difference bit position table 310.

Because parent link 612 is extracted in descending order of the difference bit positions 611 in difference bit position table 310, in the case exemplified in the drawing, the parent link P1 for the entry whose difference bit position 611 is "3", shown by arrow 683a, is extracted, and as shown by arrow 681b in the drawing, the key "1111" is read out from read-out position 601 pointed to by parent link P1 in the key table 309 and, as shown by arrow 681c, it is written in write position 640e in sorted key table 313.

Also, because link 622 stored in read-out position 621 of link table 311 and associated with the parent link P1 shown by the arrow 671b is the same P1 as the parent link 612, no more classification is done for difference bit position "3". At this point, parent link P1, which is stored in difference bit position "3" in the difference bit position table 310, is deleted.

As a result, because all the parent links in difference bit position table 310 have been deleted, and because processing has been completed for all the difference bit positions, all processing is terminated.

FIG. 9A-FIG. 9D are drawings describing the data flow in the first stage of the classification process, in other words, the setting of the difference bit position table 310 and the link table 311 shown in FIG. 6B.

Figure 9A:
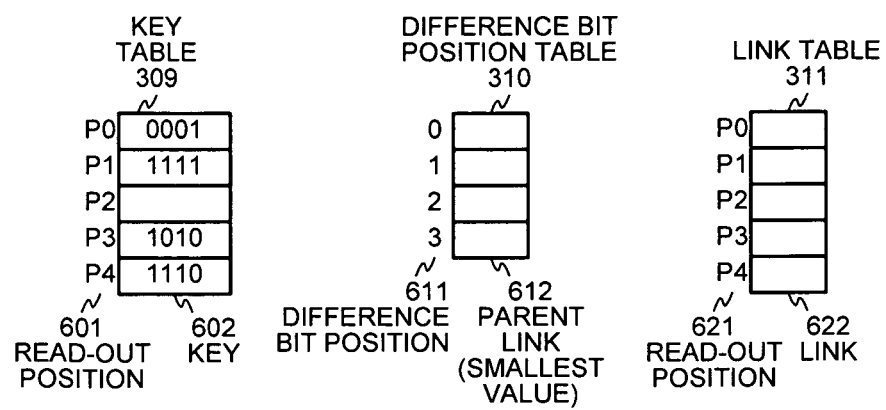
FIG. 9A-FIG. 9D are drawings describing the data flow in the first stage of the classification process.

FIG. 9A shows the initial status wherein keys 602 are set in key table 309, and nothing is set in the difference bit position table 310 and the link table 311.

Also, the key "0011" stored in read-out position P2 is omitted. Key "0011" is the only key whose difference bit position with respect to the smallest value key "0001" is "2". Thus, at steps S504 and S505 shown in FIG. 5A, because the setting of read-out position P2 in the difference bit position table and the link table 311 is completed in one pass, that description is omitted because it is easy to understand that setting.

Figure 9B:
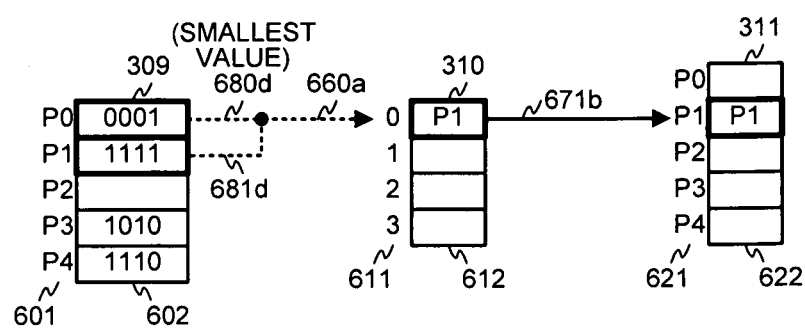

FIG. 9B shows the flow of data during the processing for key "1111" stored in read-out position P1 in key table 309. As shown by the dotted-line arrows 680d and 681d, the difference bit position "0" is calculated by a bit string comparison with smallest value key "0001" stored in read-out position P0, and, as shown by dotted-line arrow 660a, the read-out position P1 is set in the difference bit position "0" in difference bit position table 310. Also, as shown by the dotted-line arrow 671b, P1 is set in read-out position P1 in link table 311.

Figure 9C:
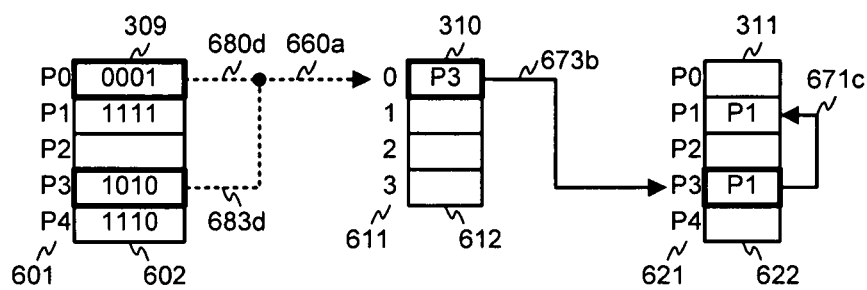

FIG. 9C shows the flow of data during the processing for key "1010" stored in read-out position P3 in key table 309. As shown by the dotted-line arrows 680d and 683d, the difference bit position "0" is calculated by a bit string comparison with smallest value key "0001" stored in read-out position P0. Then a magnitude comparison between the key "1010" at read-out position P3 and the key "1111" whose read-out position is the parent link P1 set in the difference bit position "0" in difference bit position table 310 is performed at step S507 shown in FIG. 5B. Because the key at read-out position P3 is smaller, as shown by dotted-line arrow 660a, the entry at difference bit position "0" in the difference bit position table 310 is updated to read-out position P3. Also, as shown by the dotted-line arrow 673b, P1 is set in read-out position P3 in link table 311. This setting, as shown by the arrow 671c, maintains the link relationship showing that the difference bit positions of the key at read-out position P3 and the key at read-out position P1 are the same.

Figure 9D:
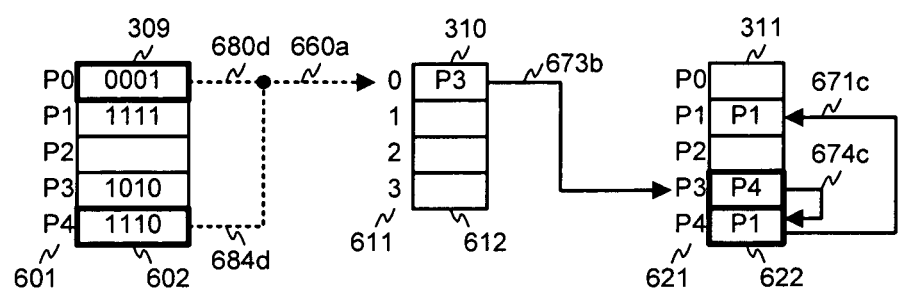

FIG. 9D shows the flow of data during the processing for the key "1110" stored in read-out position P4 in key table 309. As shown by the dotted-line arrows 680d and 684d, the difference bit position "0" is calculated by a bit string comparison with smallest value key "0001" stored in read-out position P0. Then a magnitude comparison between the key "1110" at read-out position P4 and the key "1010" whose read-out position is the parent link P3 set in the difference bit position "0" in difference bit position table 310 is performed at step S507 shown in FIG. 5B. Because the key at read-out position P4 is larger, as shown by dotted-line arrow 660a, the read-out position P3 in difference bit position "0" in difference bit position table 310 is not updated. Instead, as shown by the dotted-line arrow 673b, the entry at read-out position P3 in link table 311 is updated to P4. Then, as shown by the arrow 674c, P1 is set in read-out position P4 in link table 311. This setting, as shown by arrow 674c and arrow 671c, maintains the link relationship showing that the difference bit positions of the key at read-out position P3, the key at read-out position P4, and the key at read-out position P1 are the same.

The above data (omitting that for read-out position P2) sets the difference bit position table 310 and link table 311 in the first stage of classification processing.

Next, the second embodiment of this invention is described with an example using the same keys included in key string 100 shown in FIG. 1 and used as an example in the description for the first embodiment of this invention as the keys to be sorted.

Figure 10A:
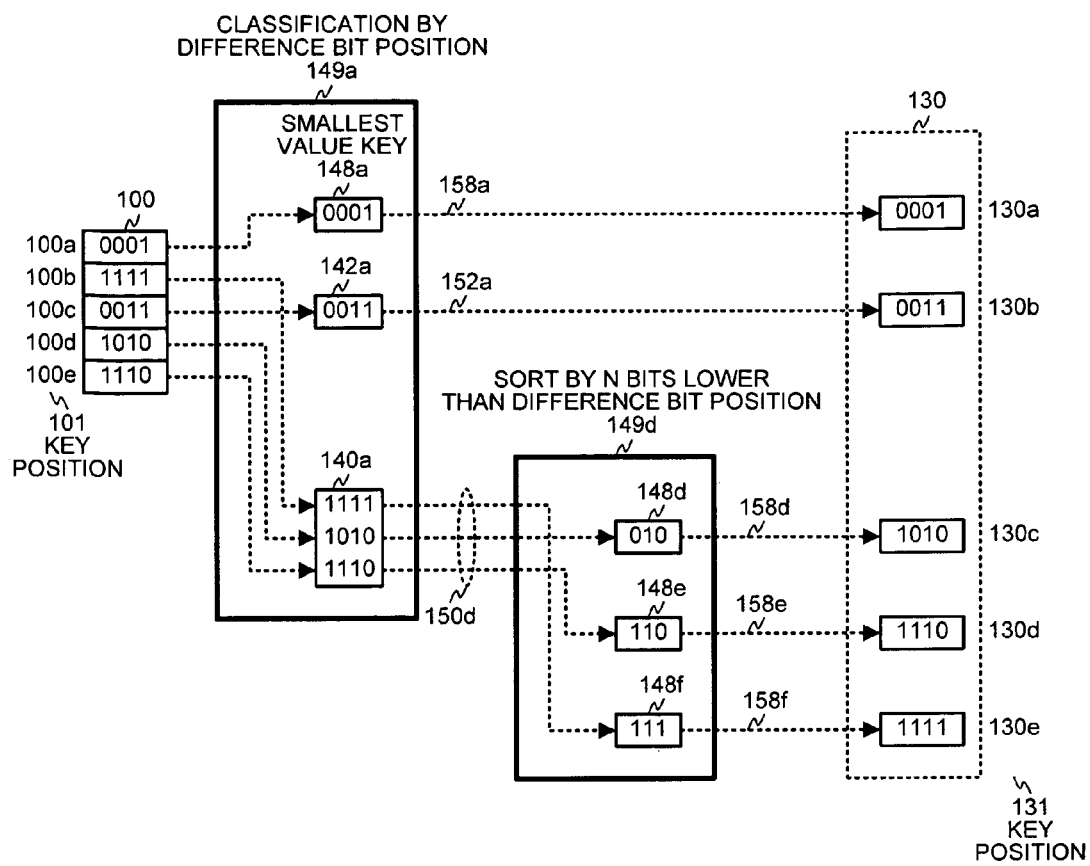
FIG. 10A is a drawing describing the concepts of sort processing using the difference bit position and the lower level bit values in a second embodiment of this invention.

FIG. 10A is a drawing describing the concepts of sort processing using the difference bit position and the lower level bit values in the second embodiment of this invention.

The keys being included in the key string 100 that are the object of the sort and the sorted key string 130 are the same as those example of the first embodiment shown in FIG. 2A. Also, the first time classification-by-difference-bit-position is the same as that in the first embodiment shown in FIG. 2A.

As is described for the first embodiment, each key configuring key string 100 is classified, through the classification-by-difference-bit-position 149a, into the smallest value key 148a, the key group 142a, whose difference position with the smallest value key is 2, and the key group 140a, whose difference position with the smallest value key 148a is 0. In the example in FIG. 10A, the smallest value key 142a is "0001". Only key "0011" is included in key group 142a, and keys "1010", "1111", and "1110" are included in key group 140a. The smallest value key 148a can be obtained, for example, when reading from the key string 100 into the input buffer for sort processing by means of the difference bit position.

The smallest value key 148a is stored in key position 130a in sorted key string 130, as shown by the dotted-line arrow 158a in FIG. 10A. Also, because there is only 1 key in key group 142a it is stored in key position 130b in sorted key string 130, as shown by the dotted-line arrow 152a in the drawing.

Because a plurality of keys are included in key group 140a, whose difference bit position with respect to smallest value key 148a is "0", they are the object of the sort-by-n-bits-lower-than-difference-bit-position 149d, as shown by the group 150d of dotted-line arrows in FIG. 10A.

The sort-by-n-bits-lower-than-difference-bit-position 149d extracts from the keys included in key group 140a respectively the bits lower than the difference bit position "0" that has been used in the classification process in the classification-by-difference-bit-position 149a, in the example in FIG. 10A, the three bits from bit 1 to bit 3, and sorts the keys by the 3 bits at those bit positions.

In the example in FIG. 10A, this classifies the keys into group 148d whose bit value is "010", into group 148e whose bit value is "110", and into group 148f whose bit value is "111". Then, as shown by the dotted-line arrows 158d, 158e, and 158f respectively, the restored keys "1010", "1110", and "1111", with their bit values up to the difference bit position prefixed, are stored in key positions 130c, 130d, and 130e, and the overall sort processing is completed.

Also, the sort method using the n bits at a lower level than the difference bit position is not limited to the sort method in sort 149d shown in the example in FIG. 10A and any arbitrary sort method can be used.

Also, although in the above noted example the smallest value key is taken to be the reference key for computing the difference bit position, the largest value key can be taken to be the reference key. In that case, in the example of keys to be sorted in FIG. 10A, because the largest key is the key "1111", the 3 groups, the key "1110" with the difference bit position "3", the key "1010" with the difference bit position "1", and the keys "0011" and "0001" with the difference bit position "0", are obtained as the result of a classification by difference bit position.

Figure 10B:
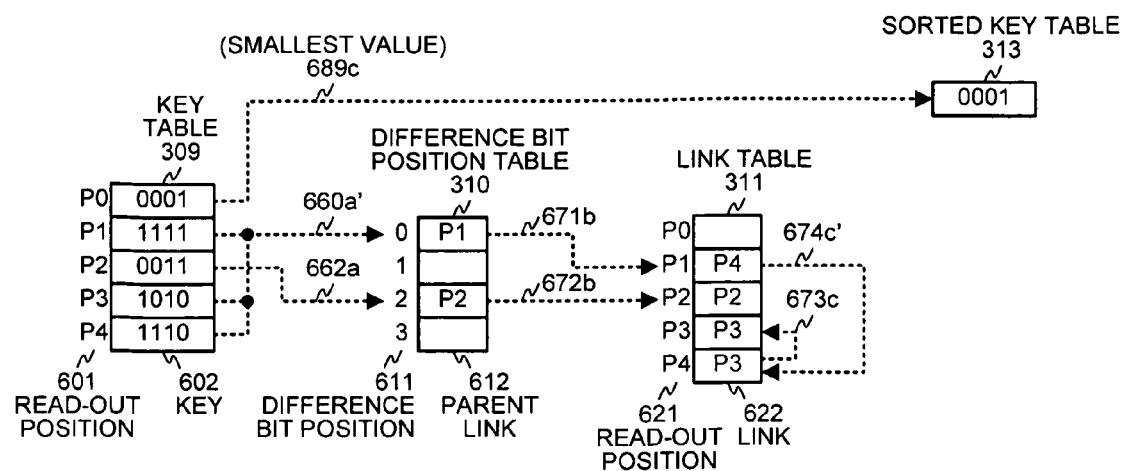
FIG. 10B is a drawing describing an example of a data configuration used in classifying keys in difference bit position sequence in the second embodiment of this invention.

FIG. 10B is a drawing describing a data configuration used in classifying keys in difference bit position sequence in the second embodiment of this invention. As shown in FIG. 10B, key table 309, difference bit position table 310, link table 311, and sorted key table 313 are used. The data configuration itself is the same as that in the first embodiment shown in FIG. 2B and key table 309 holds the same key at each of read-out positions, but the parent links stored in difference bit position table 310 and the links stored in link table 311 are different from those shown in FIG. 2B.

Key table 309 is a table wherein the keys to be sorted 602 are read-in and set when there is a sort request. In the example shown in FIG. 10B, the 5 keys included in key string 100 shown in FIG. 10 are read into key table 309 as the keys to be sorted 602. The top read-out position 601 in key table 309 is P0, and P1, P2, P3, P4 follow below it. Although the smallest value key "0001" is set in read-out position P0, it can also be kept in a separate area. The smallest value key is stored in a predetermined position in sorted key table 313, as shown by the dotted-line arrow 689c.

The difference bit position table 310 is a table that holds, as parent link 612, the read-out position 601 of the first key read-out from key table 309, of the keys with the same difference bit position with respect to the smallest value key, for every difference bit position 611. As shown by the dotted-line arrow 660*a*' in the example shown in FIG. 10B, read-out position P1 for the first key read-out "1111" of the keys "1111", "1010", "1110" with the same difference bit position of "0" with respect to the smallest value key "0001" is stored in the position in difference bit position table 310 whose difference bit position 611 is "0". Also, because key "0011" is the only key whose difference bit position with respect to the smallest value key "0001" is "2", the read-out position P2 for key "0011" is stored in the position in difference bit position table 310 whose difference bit position 611 is "2", as shown by the dotted-line arrow 662*a*. Also, the read-out position set in the parent link is not limited to being the read-out position of the first key read-out as was described above. It is sufficient that it can enable access to the keys with the same difference bit position with respect to the smallest value key by being combined with the link relationships stored in link table 311 described below.

Link table 311 is a table for accessing keys with the same difference bit position with respect to the smallest value key. As shown in the drawing, a link 622 is stored showing the read-out position of keys with the same difference bit position for the read-out position 621 of the keys.

As shown by the dotted-line arrow 671*b* from difference bit position table 310 to link table 311, for the read-out position P1, which is set as a parent link in link table 311, in key table 309 for the key of the keys with the same difference bit position "0", that read-out position P1 is taken to be the read-out position 621 in link table 311 (hereinbelow, this is called read-out position P1 in link table 311), and in that read-out position is stored the read-out position P4 in key table 309 for the key "1110" with the same difference bit position "0" as the key "1111", whose read-out position is set as the parent link in link table 311, with difference bit position "0" with respect to the smallest value key "0001".

Then, as shown by the dotted-line arrow 674*c*' in the drawing, key table 309 read-out position P3 for the key "1010" with the same difference bit position "0" is stored in link table 311 read-out position P4. Also, as shown by the dotted-line arrow 673*c* in the drawing, key table 309 read-out position P3 is stored in the same-valued read-out position P3 in link table 311. Storing the same value at the same position indicates that there are no more keys with the same difference bit position "0".

Also, for the read-out position P2 in key table 309 for the smallest value key of the keys with the same difference bit position "2", key table 309 read-out position P2 is stored in the same-valued read-out position P2 in link table 311, as shown by the dotted-line arrow 672*b* from difference bit position table 310 to link table 311. This indicates that the key "0011" in key table 309 read-out position P2 is the only key with difference bit position "2" with respect to the smallest value key "0001".

The status of the difference bit position table 310 and the link table 311 that is shown in the above referenced FIG. 10B is that obtained through executing the classification-by-difference-bit-position 149*a* shown FIG. 10A.

As is clear from the above description, the above noted key table 309 is one implementation example of a keys-to-be-sorted storage means in this invention, related to claim 13. Also, one implementation example of a key-to-be-classified difference bit position storage means is configured by a difference bit position table 310 and a link table 311 and the read-out position 601 in the key table 309 corresponds to identification information for the key.

Figure 10C:
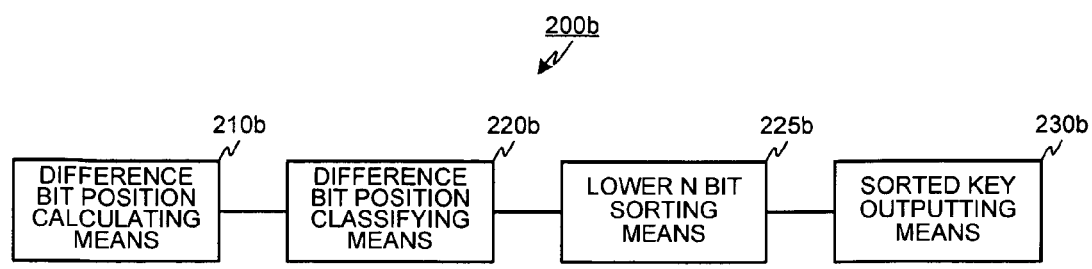
FIG. 10C is a drawing describing an example of function blocks configuring a bit string data sort apparatus in the second embodiment of this invention.

FIG. 10C is a drawing describing an example of function blocks configuring a bit string data sort apparatus in the second embodiment of this invention.

As shown in the drawing, bit string data sort apparatus 200*b* includes a difference bit position calculating means 210*b*, a difference bit position classifying means 220*b*, a lower n bit sorting means 225*b*, and a sorted key outputting means 230*b*. Hereinbelow an overview of the operation of each means is described referencing the example shown in FIG. 10B.

The difference bit position calculating means 210*b* computes, with respect to the reference key, the difference bit position from among all the keys 602 stored in key table 309 except the reference key. In this case, the reference key for computing a difference bit position is the smallest value key "0001", stored in read-out position P0. The sorted key outputting means 230*b* outputs the smallest value key "0001" to sorted key table 313.

The difference bit position classifying means 220*b* generates the difference bit position table 310 and the link table 311 based on the computation results of the difference bit position calculating means 210*b*. As a result, the identification information for the keys that is read-out positions 601 in key table 309 is classified into group (P3, P4, P1) with the difference bit position "0" and group (P2) with the difference bit position "2".

The lower n bit sorting means 225*b* sorts each difference-bit-position group classified by the difference bit position classifying means 220*b*, using the lower n bits for that difference bit position.

The sorted key outputting means 230*b* outputs the sorted keys to the sorted key table 313 based on the sort results of the lower n bit sorting means 225*b*.

Figure 11A:
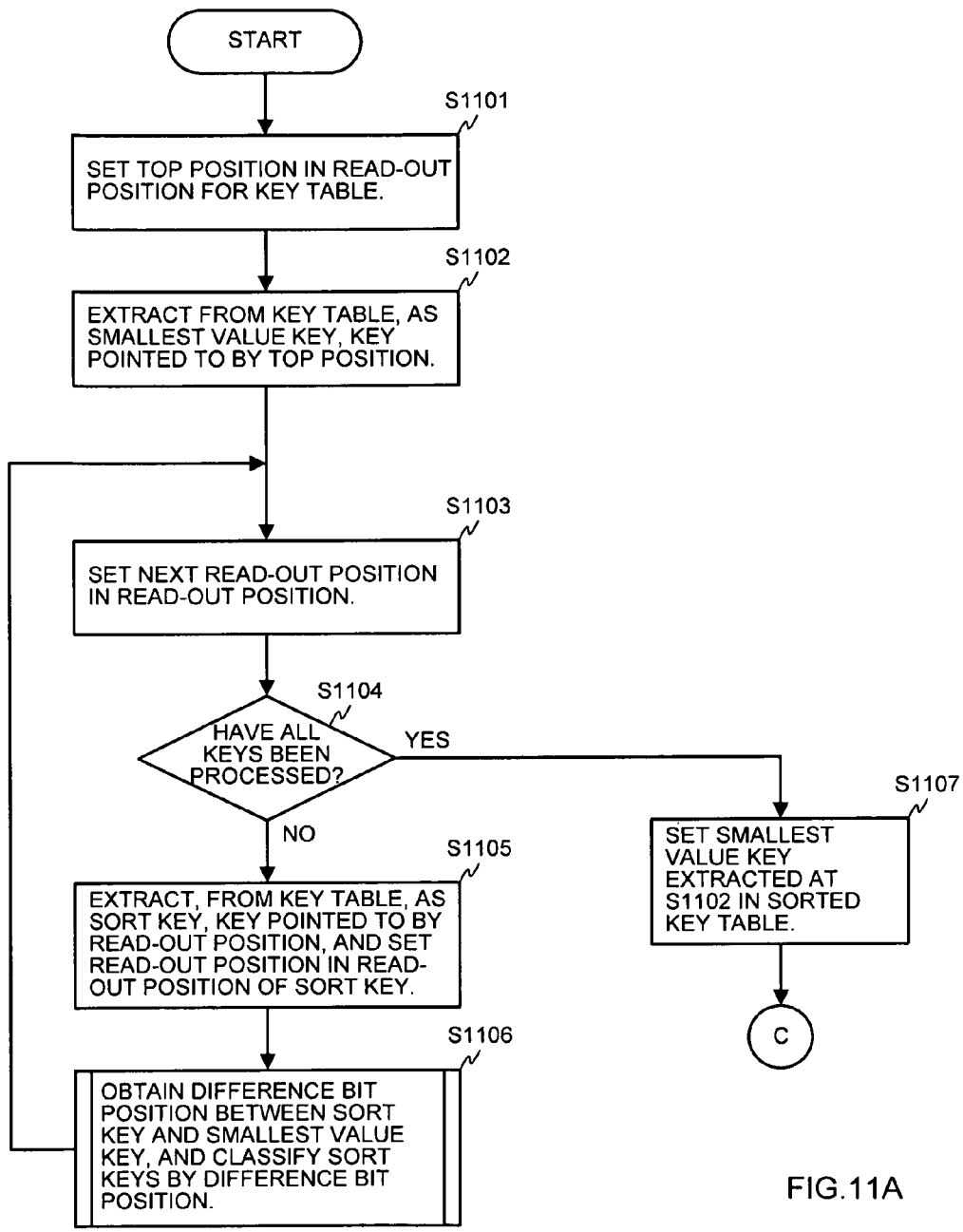
FIG. 11A is a drawing describing an example of the processing flow for the first stage of sort processing for classifying keys and outputting the smallest value key as a sorted key in the second embodiment of this invention.
Figure 11B:
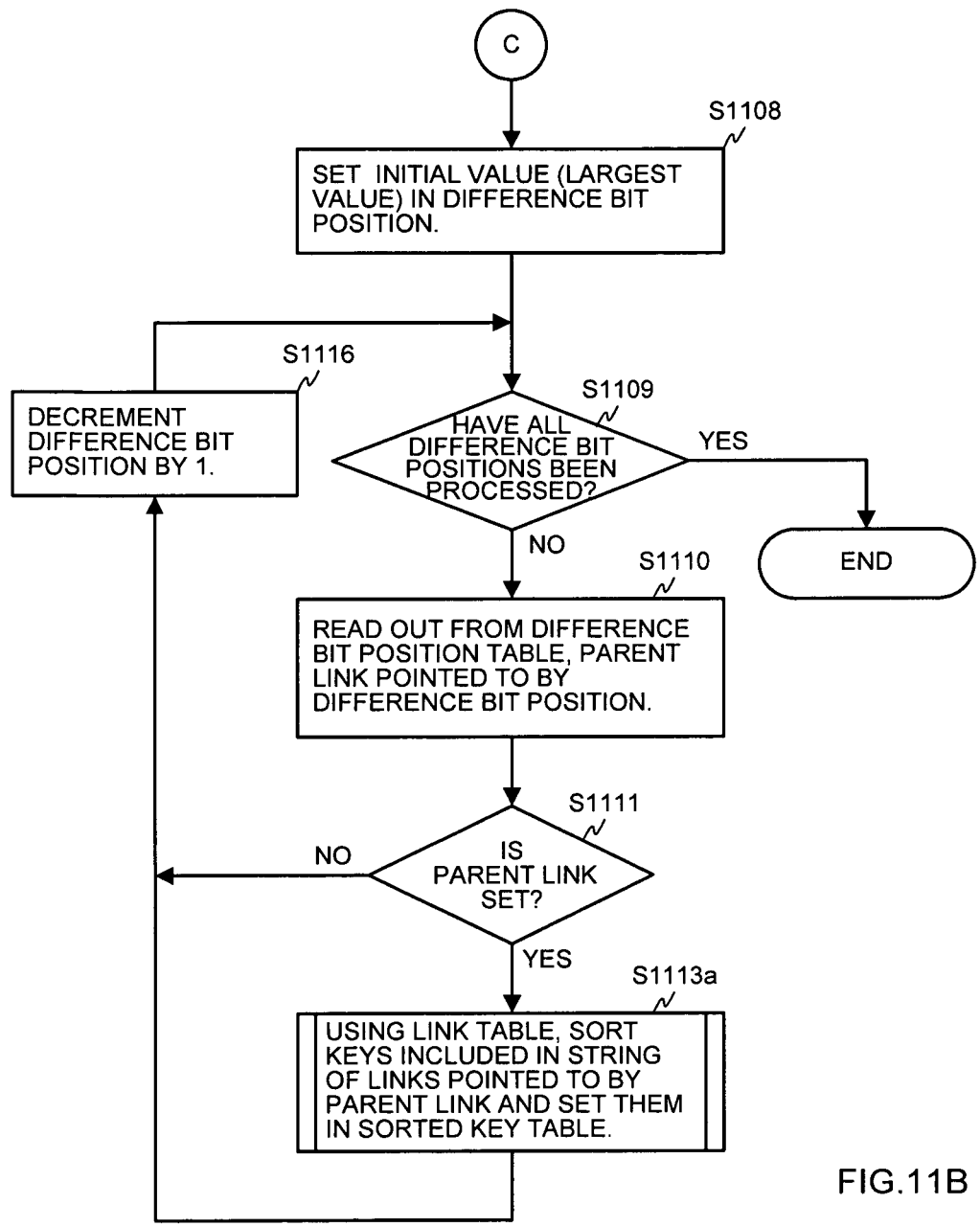
FIG. 11B is a drawing describing an example of the processing flow for the sort processing stages after the first stage that classify keys and output sorted keys in the second embodiment of this invention.

Next, details of the second embodiment of sort processing in this invention are described referencing FIG. 11A and FIG. 11B. Also, the examples shown in FIG. 10A or FIG. 10B are used as appropriate in the description. When comparing the description in FIG. 11A and FIG. 11B of the sort processing and the description in FIG. 4A and FIG. 4B of the sort processing, the example of the processing flow in the first stage shown in FIG. 11A and FIG. 4A is the same except the details of step S1106 and step S406.

Thus, the description of the processing flow in the first stage terminates with the above. However, details of processing at step S1106 are described later referencing FIG. 12A.

FIG. 11B is a drawing describing an example of the processing flow for the sort processing stages after the first stage that classifies keys and outputs sorted keys in the second embodiment of this invention. Each of those stages of processing successively sorts by the n bits lower than the difference bit position the keys classified into difference bit position groups and outputs the sorted keys to the sorted key table.

In step S1108, the difference bit position for the difference bit position table is initialized, in other words, the largest value for the difference bit positions that could possibly be held by the keys to be sorted is set in the difference bit position, which is an unillustrated temporary storage area. In the example shown in FIG. 10B, 3 is set as the largest value for the difference bit positions.

In step S1109, a determination is made whether all the difference bit position entries in the difference bit position table have been processed, and if all have been processed, processing is terminated, and if they have not all been processed, processing proceeds to step S1110.

At step S1110, the parent link is read out from the entry in the difference bit position table pointed to by the difference bit position. If a parent link is stored in the entry pointed to by the difference bit position, the read-out parent link is stored in the parent link, which is a temporary storage area. In other words, in descriptions of preferred embodiments of this invention, expressions such as "read out the parent link" means to read out the parent link and set it in the parent link, which is an unillustrated temporary storage area. The same applies to things other than the parent link.

At step S1111, a determination is made whether the parent link is set. If the parent link is not set, at step S1116, the value of the difference bit position is decremented by 1, and a return is made to step S1109, while, conversely, if the parent link is set, processing proceeds to step S1113a.

At step S1113a, the keys included in the key string pointed by the parent link (key table read-out position) read out at step S1110 are sorted and are set in the sorted key table and processing proceeds to step S1116. Details on the processing in step S1113a are described later referencing FIG. 12B.

The above processing is repeated until the determination in step S1109 is that processing have been finished for all the entries at all the difference bit positions in the difference bit position table, and when that determination is made processing is terminated because the sort of the keys to be sorted is completed.

The processing shown in the example in FIG. 11B takes the reference key that is used to compute the difference bit position as the smallest key and executes processing in the descending order of difference bit positions and extracts the sorted keys in ascending order. As was noted above, however, even if the reference key that is used to compute the difference bit position is taken as the largest key, it will be clear to one skilled in the art that processing can be done in the descending order of the difference bit positions and the sorted key can be extracted in descending order, because the larger the difference bit position of a key with related to the reference key the value of key is, the closer to the value of the reference key.

Figure 12A:
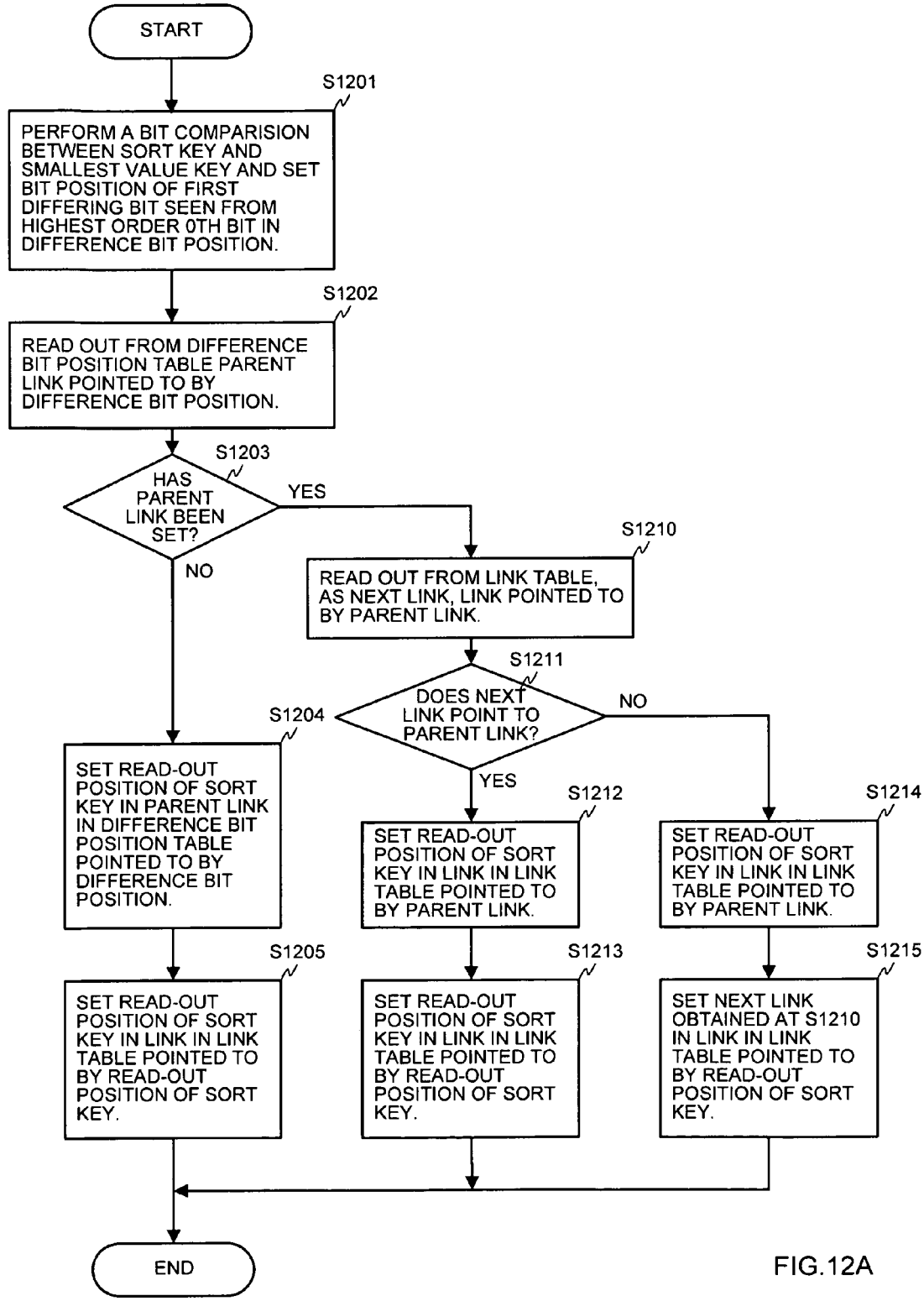
FIG. 12A is a drawing describing an example of the processing flow for classifying each key for each difference bit position in the second embodiment of this invention.

FIG. 12A is a drawing showing the details of the processing in step S1106 shown in FIG. 11A and it describes an example of the processing flow for classifying each key for each difference bit position in the second embodiment of this invention. In this second embodiment, each key that is the object of a classification is classified for each difference bit position by generating a difference bit position table and a link table.

As shown in FIG. 12A, at step S1201, a bit string comparison is done between the key set in the sort key and the key set in the smallest value key, and the bit position of the first non-matching bit seen from the highest level 0th bit is set in the difference bit position. The sort key is set at step S1105 shown in FIG. 11A, and it is the key subject to the classification processing shown in FIG. 12A.

Next, at step S1202, the parent link pointed to by the difference bit position set at step S1201 is read out from the difference bit position table, and at step S1203 a determination is made whether the parent link has been set.

If the parent link has not been set, processing proceeds to step S1204, wherein the sort key read-out position is set in the parent link in the difference bit position table entry pointed to by the difference bit position, and in step S1205 the sort key read-out position is set in the link in the link table entry pointed to by the sort key read-out position and processing is terminated.

Also, the sort key read-out position in the processing of step S1204 is that which has been set in step S1105 shown in FIG. 11A.

As noted above, the read-out position of the first read-out key among the keys with the same difference bit position is stored in the difference bit position table as the parent link, and the processing of the above noted step S1204 definitely takes the read-out position of the first sort key read out, and sets it in the parent link pointing to its difference bit position in the difference bit position table.

Once the parent link has been set, in other words, when the determination at step S1203 is that the parent link has been set, processing proceeds to step S1210, wherein the link pointed to by the parent link is read out from the link table as the next link, and at step S1211 a determination is made whether the next link coincides with the parent link.

When the determination at step S1211 is that the next link coincides with the parent link, in step S1212, the sort key read-out position is set in the link in the link table pointed to by the parent link. Then, in step S1213, the sort key read-out position is set in the link in the link table entry pointed to by the sort key read-out position, and processing is terminated.

Conversely, when the determination at step S1211 is that the next link does not coincide with the parent link, processing proceeds to step S1214, wherein the sort key read-out position is set in the link in the link table entry pointed to by the parent link. Then in step S1215, the next link obtained at step S1210 is set in the link in the link table pointed to by the sort key read-out position, and processing is terminated.

The determination in step S1211 noted above is the same as a determination whether there is only 1 key classified into a group of keys with the same difference bit position. If there is only 1 key classified into that group, its read-out position is stored in the link in the link table entry pointed to by the read-out position of that key. Hence, it is updated by the sort key read-out position and the sort key read-out position is set in the link in the link table entry pointed to by the sort key read-out position, and the sort key indicates that key is the last key to be classified at that point in time.

When there are 2 or more keys classified into a group, the sort key read-out position is inserted into the link relationship expressed by the link table, between the parent link and the next link, by the processing of steps S1214 and S1215 processing.

As is clear from the above description, by traversing the links from the parent link stored in the difference bit position table to the links with read-out positions in the link table, all the read-out positions of sort keys with the same difference bit position can be accessed. Thus, in the description hereinbelow, the string of read-out positions that can be traversed from that parent link, including that of the parent link, may at times be called the link string pointed by the parent link, and the keys stored in the key table with read-out positions included in the link string pointed by the parent link may at times be called the keys included in the link string pointed by the parent link.

Figure 12B:
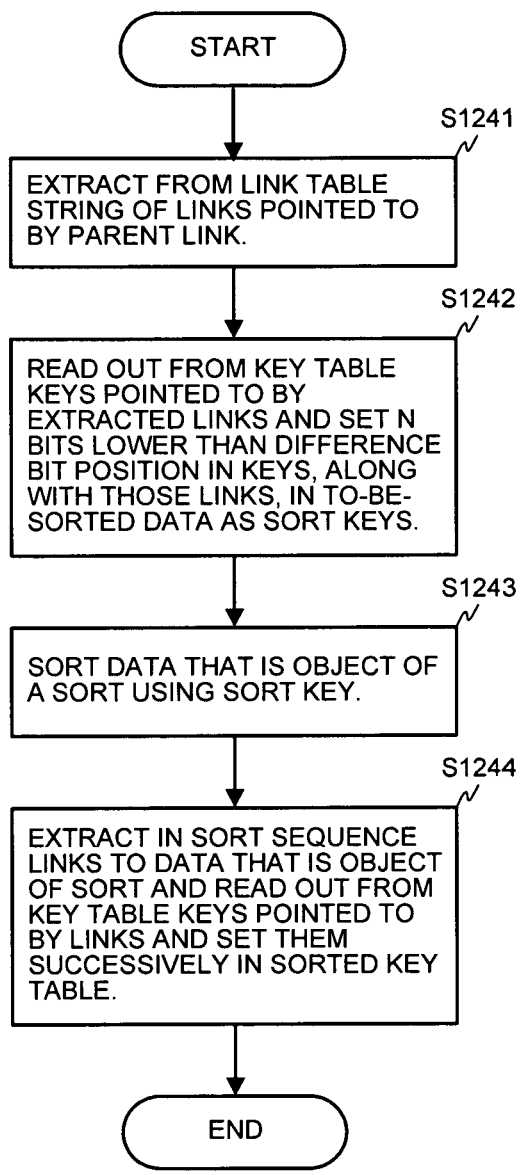
FIG. 12B is a drawing describing an example of the processing flow for sorting the keys classified for each difference bit position and outputting sorted keys in the second embodiment of this invention.

FIG. 12B is a drawing describing an example of the processing for sorting the keys classified for each difference bit position and outputting them as sorted keys in the second embodiment of this invention, which is the processing of step S1113a shown in FIG. 11B. In this embodiment, based on the link table, the keys included in the link string pointed to by the parent link are extracted, sorted and set in the sorted key table.

As shown in the drawing, in step S1241, the links in the link string pointed to by the parent link are extracted from the link table. The parent link is that which is read out at step S1110 shown in FIG. 11B.

Proceeding to step S1242, the key pointed to by the link extracted at step S1241 is read out from the key table, and both the link and the lower n bits for the difference bit position in the key are set in the data to be sorted whose sort key is the lower n bits.

In the example shown in FIG. 10B, for the case wherein the difference bit position is 0, because the parent link is P1 and the links in the link string pointed by the parent link are P1, P4, and P3, three sets of data are set in the data to be sorted (P1, "111"), (P4, "110") and (P3, "010"). The sort keys are the lower 3 bits for the difference bit position, "111", "110", and "010", respectively.

Next, in step S1243, the data to be sorted is sorted. When in the example noted above the sort is in ascending order, the data sequence in the sort results is (P3, "010"), (P4, "110"), and (P1, "111").

Finally, at step S1244, the links in the data to be sorted are extracted in sort sequence, and the keys pointed by the links are read out from the key table and are set successively in the sorted key table and processing is terminated.

In the example noted above, first, link P3 is extracted, and the key "1010" at read-out position P3 is read out from the key table and set in the sorted key table. Next, link P4 is extracted, and the key "1110" at read-out position P4 is read out from the key table and set in the sorted key table. Finally, link P1 is extracted, and the key "1111" at read-out position P1 is read out from the key table and set in the sorted key table.

Figure 13A:
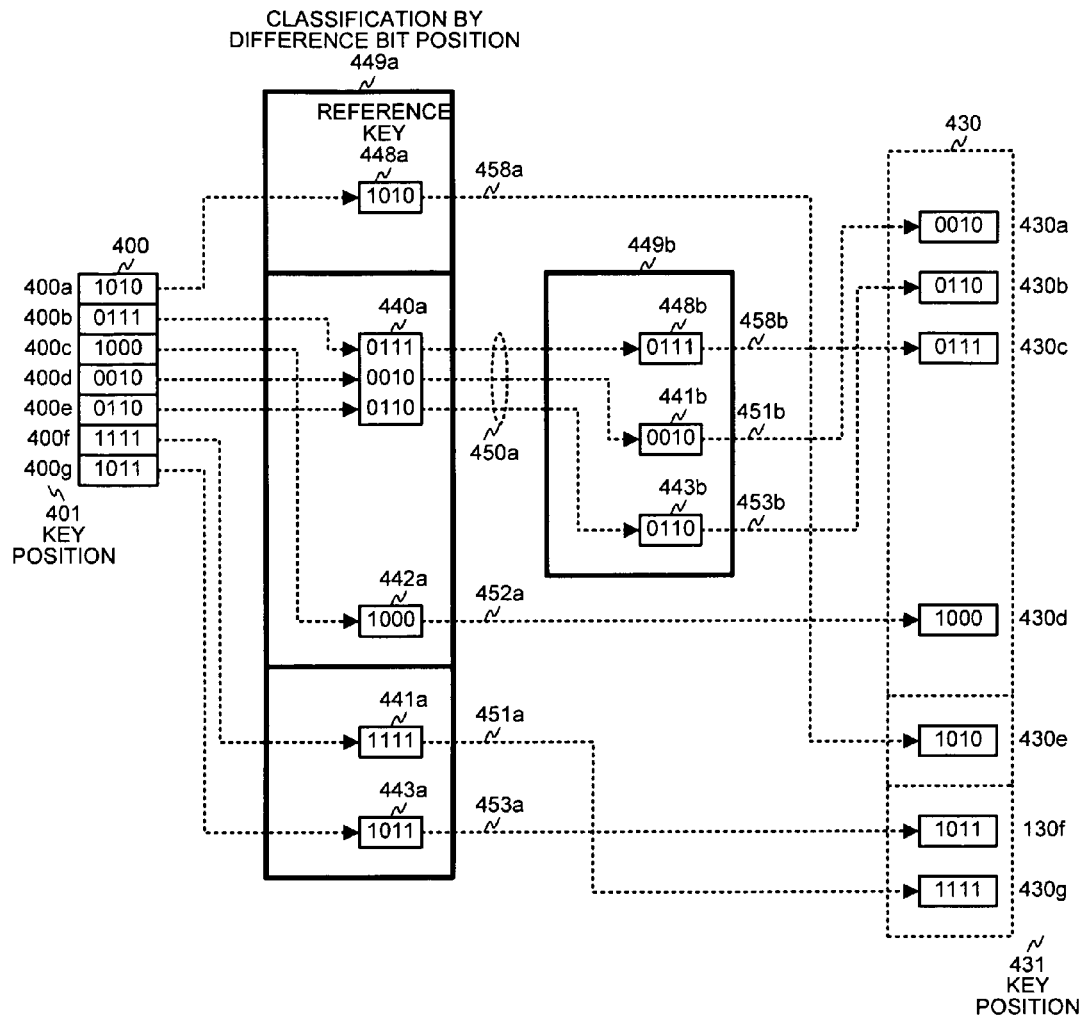
FIG. 13A is a drawing describing the concepts of sort processing using a difference bit position in a third embodiment of this invention.

Next, the third embodiment of this invention is described by an example showing, as keys-to-be-sorted, keys included in the key string 400 shown in FIG. 13A. The proposed classification method in the first and second embodiment of this invention is one wherein the reference key is taken to be the smallest value or largest value in the keys to be sorted.

In contrast, in the description below of the third embodiment of this invention, any arbitrary key can be selected as the reference key from among the keys to be sorted. For example the key stored in the first position in the storage area holding the keys to be sorted can be made the reference key.

FIG. 13A is a drawing describing the concepts of sort processing using a difference bit position in the third embodiment of this invention. The keys being included in the key string 400 that are the object of the sort and the sorted key string 430 are different as those example of the first and second embodiment shown in FIG. 2A and FIG. 10A. In the example shown in FIG. 13A, key "1010" is in the storage area 400a in key position 401, which is the position of a key included in key string 400. Also, "0111", "1000", "0010", "0110", "1111", and "1011" are in key positions 400b, 400c, 400d, 400e, 400f, and 400g respectively.

The key "1010" positioned as the top key 400a in key string 400 is selected as the reference key 448a.

Each key configuring key string 400 is classified, through the classification-by-difference-bit-position 449a, into the reference key 448a, the groups with keys smaller than the reference key, that is, the key group 440a, whose difference position with the reference key is "0", and the key group 442a, whose difference position with the reference key is "2", and the groups with keys larger than the reference key, that is, the key group 441a, whose difference position with the reference key is "1", and the key group 443a, whose difference position with the reference key is "3".

In the example in FIG. 13A, the reference key 448a is "1010". Keys "0111", "0010", and "0110" are included in key group 440a and only key "1000" is included in key group 442a. Also, only key "1111" is included in key group 441a, and only key "1011" is included in key group 443a.

The reference key 448a is stored in key position 430e in sorted key string 430, as shown by the dotted-line arrow 458a in the drawing. Also, because there is only 1 key in key group 442a it is stored in key position 430d in sorted key string 430, as shown by the dotted-line arrow 452a in the drawing. In the same way, because there is only 1 key each in key groups 441a and 443a, they are stored in key position 430g and key position 430f, respectively, in sorted key string 430, as shown by the dotted-line arrows 451a and 453a in the drawing.

Details of how keys are stored in sorted key string 430 are described later.

Because a plurality of keys are included in key group 440a, whose difference bit position with respect to the reference key 448a is "0", as shown by the group 450a of dotted-line arrows in the drawing of FIG. 13A, key group 440a is classified, through the classification-by-difference-bit-position 449b, into largest value key 448b and key group 441b, whose difference bit position with respect to the largest value key 448b is "1", and key group 443b, whose difference bit position with respect to the largest value key 448b is "3". In the example in the drawing, the largest value key 448b is "0111". Only key "0010" is included in key group 441b and only key "0110" is included in key group 443b.

The largest value key 448b is stored in key position 430c in sorted key string 430, as shown by the dotted-line arrow 458b in the drawing. Because there is only 1 key included in key group 443b, which is the group whose difference bit position with regard to the largest value key 448b is 3, it is stored in key position 430b in sorted key string 430, as shown by the dotted-line arrow 453b in the drawing. Also, because there is only 1 key included in key group 441b, which is the group whose difference bit position with regard to the largest value key 448b is 1, subclassification is terminated, and, as shown by the dotted-line arrow 451b in the drawing, that key is stored in key position 430a in sorted key string 430.

By means of the above processing, the keys in key string 400 are stored in ascending order in the key positions 430a to 430g in sorted key string 430, and sorting is completed. And because classification is repeated based on a difference bit position in sort processing in accordance with the third embodiment keys are always classified in each classification processing.

The key positions 430a to 430g in sorted key string 430 need not be contiguous addresses in the storage area. The key positions 430a to 430d, 430e, and 430f to 430g can be addresses, respectively, in three separate storage areas. Also, for example, the key positions 430a to 430d can be storage area addresses assigned in a direction from large to small. If the reference key and its key position 430e, the direction of the key positions 430a and 430d and addresses of keys smaller than the reference key, and the direction of the key positions 430f to 430g and addresses of keys larger than the reference key are known, it is easy to extract the keys from key table 430 in ascending order or descending order. Of course, the key position 430a to 430g can also be allocated in the sequence of addresses in a contiguous storage area.

Next, a description is provided of a data configuration and a function block configuration for implementing sort processing using difference bit positions in the third embodiment of this invention, whose concepts were described referencing FIG. 13A. It is clear that sort processing using difference bit positions in the third embodiment of this invention can be enabled if function blocks are prepared for executing the processing of classifications by difference bit position 449a and 449b shown in the example in FIG. 13A with respect to every grouping of keys to be sorted. But that is a waste of resources and not a realistic implementation method. For that reason, the third embodiment of this invention has made the innovations described hereinbelow.

Figure 13B:
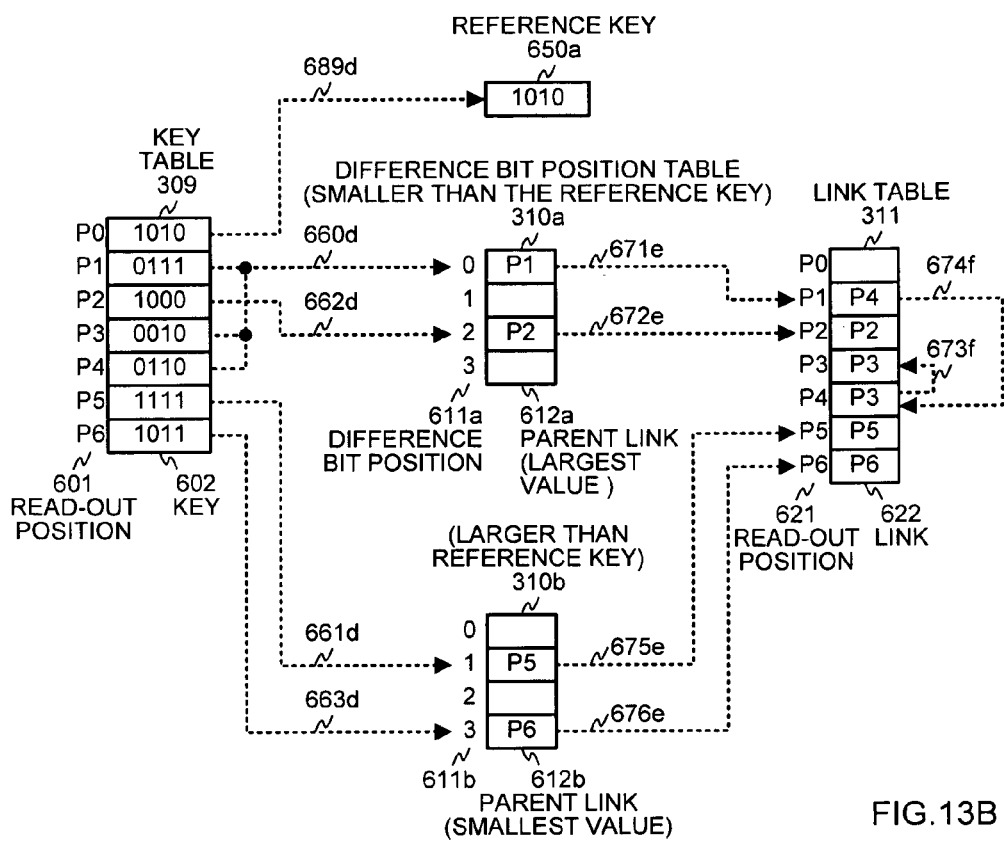
FIG. 13B is a drawing describing an example of a data configuration used in sort processing using a difference bit position in the third embodiment of this invention.

FIG. 13B describes an example of a data configuration used in sort processing using a difference bit position in the third embodiment of this invention. As shown in FIG. 13B, key table 309, difference bit position table 310a, difference bit position table 310b, link table 311, and reference key 650a, which is the storage area for storing the reference key, are used.

Key table 309 is a table wherein the keys to be sorted 602 are read-in and set when there is a sort request. In the example shown in FIG. 13B, the 7 keys included in key string 400 shown in FIG. 13A are read into the key table 309 as the keys to be sorted 602. The top read-out position 601 in key table 309 is P0, and P1, P2, P3, P4, P5, P6 follow below it. Although the key set in read-out position P0 is taken to be the reference key, another key set in a different read-out position can also be taken as the reference key. As shown by the dotted-line arrow 689d, the reference key is set in reference key 650a.

The difference bit position table 310a is a table that holds, in the example in FIG. 13B, as parent link 612a, the read-out position 601 of the largest key of the keys which are smaller than the reference key and which have the same difference bit position with respect to the reference key for every difference bit position 611a. As shown by the dotted-line arrow 660d in the example shown in FIG. 13B, read-out position P1 for the largest key "0111" of the keys "0111", "0010", and "0110" with the same difference bit position of "0" with respect to the reference key "1010" is stored in the position in difference bit position table 310a whose difference bit position 611a is "0". Also, because key "1000" is the only key whose difference bit position with respect to the reference key "1010" is 2, the read-out position P2 for key "1000" is stored in the position in difference bit position table 310a whose difference bit position 611a is 2, as shown by the dotted-line arrow 662d.

The difference bit position table 310b holds the readout position 601 of the smallest key, of the keys larger than the reference key and with the same difference bit position with respect to the reference key, as its parent link 612b, for each difference bit position 611b. In the example shown in FIG. 13B, as shown by the dotted-line arrow 661d, because key "1111" is the only key whose difference bit position is "1" with respect to the reference key "1010", the readout position P5 for key "1111" is stored in the position whose difference bit position 611b is "1" in the difference bit position table 310b. Also, as shown by the dotted-line arrow 663d, because key "1011" is the only key whose difference bit position is "3" with respect to the reference key "1010", the readout position P6 for key, "1011" is stored in the position whose difference bit position 611b is "3" in the difference bit position table 310b.

Link table 311 is a table for accessing keys with the same difference bit position with respect to the reference key. As shown in the drawing, a link 622 is stored showing the read-out position of keys with the same difference bit position for the read-out position 621 of the keys.

As shown by the dotted-line arrow 671e from difference bit position table 310a to link table 311, for the read-out position P1 (parent link) for the largest value key of the keys with the same difference bit position "0", that read-out position P1 is taken to be the read-out position 621 in link table 311 (hereinbelow, this is called read-out position P1 in link table 311), and in that read-out position is stored the read-out position P4 in key table 309 for the key "0110" with the same difference bit position "0" as the largest key "0111" of the keys with difference bit position "0" with respect to the reference key "1010".

Then, as shown by the dotted-line arrow 674f in the drawing, key table 309 read-out position P3 for the key "0010" with the same difference bit position "0" is stored in link table 311 read-out position P4. Also, as shown by the dotted-line arrow 673f in the drawing, key table 309 read-out position P3 is stored in the same-valued read-out position P3 in link table 311. Storing the same value at the same position indicates that there are no more keys with the same difference bit position "0".

Also, for the read-out position P2 (parent link) for the largest value key of the keys with the same difference bit position 2, key table 309 read-out position P2, which has the same value as the readout position P2 in link table 311, is stored in read-out position P2 in link table 311, as shown by the dotted-line arrow 672e from difference bit position table 310a to link table 311. This indicates that the key "1000" in read-out position P2 in key table 309 is the largest key of the keys with difference bit position 2 with respect to the reference key "1010" and that it is the only one of those keys.

On the other hand, for the readout position P5 (parent link) for the smallest value key among the keys with the same difference bit position "1" with respect to the reference key, as shown by the dotted-line arrow 675e from the difference bit position table 310b to the link table 311, the readout position P5 in key table 309, which has the same value as the readout position P5 in link table 311, is stored in readout position P5 in link table 311. This indicates that the key "1111" in read-out position P5 in key table 309 is the smallest key of the keys with difference bit position "1" with respect to the reference key "1010" and that it is the only one of those keys.

In the same way, just as for readout position P6 for the smallest value key among the keys with the same difference bit position "3" with respect to the reference key, as shown by the dotted-line arrow 676e from the difference bit position table 310b to link table 311, the readout position P6 in key table 309, which has the same value as the readout position P6 in link table 311, is stored in readout position P6 in link table 311. This shows that the key "1011" at readout position P6 in key table 309 is the smallest key of the keys for which the difference bit position is "3" with respect of the reference key "1010" and that it is the only one of those keys.

The status of difference bit position tables 310a and 310b and link table 311 shown in the above noted FIG. 13B is that obtained by executing the classification-by-difference-bit-position 449a shown FIG. 13A.

As is clear from the above description, the above noted key table 309 is one implementation example of a keys-to-be-sorted storage means in the third embodiment of this invention, related to claim 25. Also, one implementation example of a key-to-be-classified difference bit position storage means is configured by difference bit position tables 310a and 310b and a link table 311 and the read-out position 601 in the key table 309 corresponds to identification information for the key.

Figure 13C:
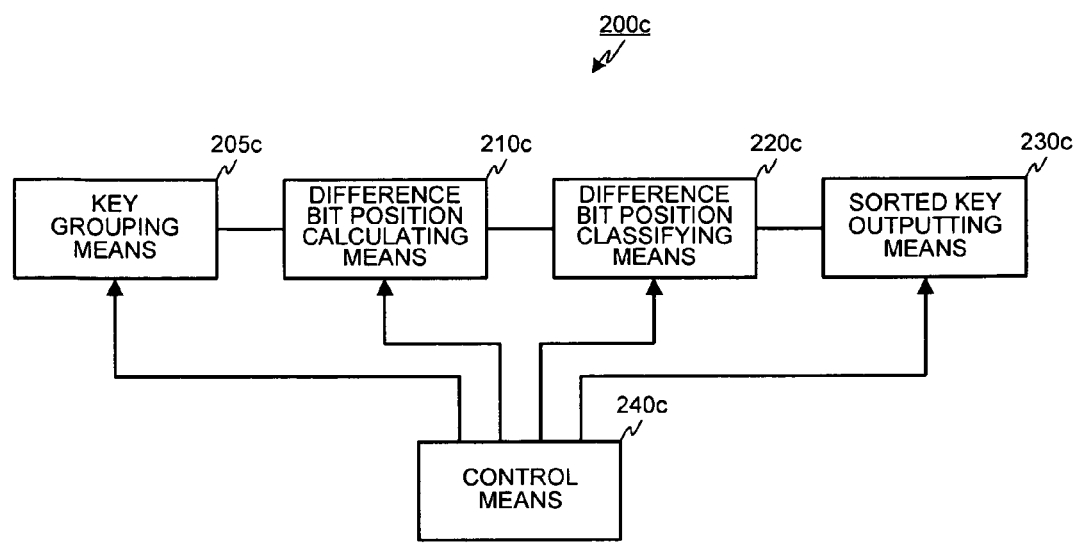
FIG. 13C is a drawing describing an example of function blocks configuring a bit string data sort apparatus in the third embodiment of this invention.

FIG. 13C is a drawing describing an example of function blocks configuring a bit string data sort apparatus in the third embodiment of this invention.

As shown in the drawing, bit string data sort apparatus 200c includes a key grouping means 205c, a difference bit position calculating means 210c, a difference bit position classifying means 220c, a sorted key outputting means 230c, and a control means 240c. Hereinbelow an overview of the operation of each means is described referencing the example shown in FIG. 13B.

The key grouping means 205c does a magnitude comparison between all the keys to be sorted stored in key table 309 and the reference key and splits the keys into a group smaller than the reference key and a group larger than the reference key. The difference bit position calculating means 210c computes the difference bit position, from among the keys 602 stored in key table 309, for the keys that are subject to classification-by-difference-bit-position and the key that becomes the reference for computing the difference bit position. The key that becomes the first reference for computing the difference bit position is the reference key.

The difference bit position classifying means 220c classifies keys by their difference bit position by generating the difference bit position table 310a and the link table 311 based on the first computation results of the difference bit position calculating means 210c for the group of keys smaller than the reference key, and generating the difference bit position table 310b and the link table 311 based on the first computation results of the difference bit position calculating means 210c for the group of keys larger than the reference key. As a result of this first classification, the group of keys smaller than the reference key, using the read-out position 601 in key table 309 as key identification information, is classified into the group (P1, P4, P3) with the difference bit position of "0" and the group (P2) with the difference bit position of "2". Also, the group of keys larger than the reference key is classified into the group (P5) with the difference bit position of "1" and the group (P6) with the difference bit position of "3".

The control means 240c divides the keys stored in key table 309 into the group of keys smaller than the reference key and the group larger, using key grouping means 205c. Then all of the keys smaller than the reference key the keys and all of the keys larger than the reference key both stored in key table 309 and split into 2 groups are subjected to the first classification processing. In this case, the reference key, which is the reference for computing the difference bit position, is the key "1010" stored in read-out position P0. The sorted key outputting means 230 outputs this reference key "1010" to the sorted key table 313.

The control means 240c controls the processing for groups that, after classification, include a plurality of keys, such that difference bit position computation by difference bit position calculating means 210c and classification processing by difference bit position classifying means 220c is further repeated.

Figure 14:
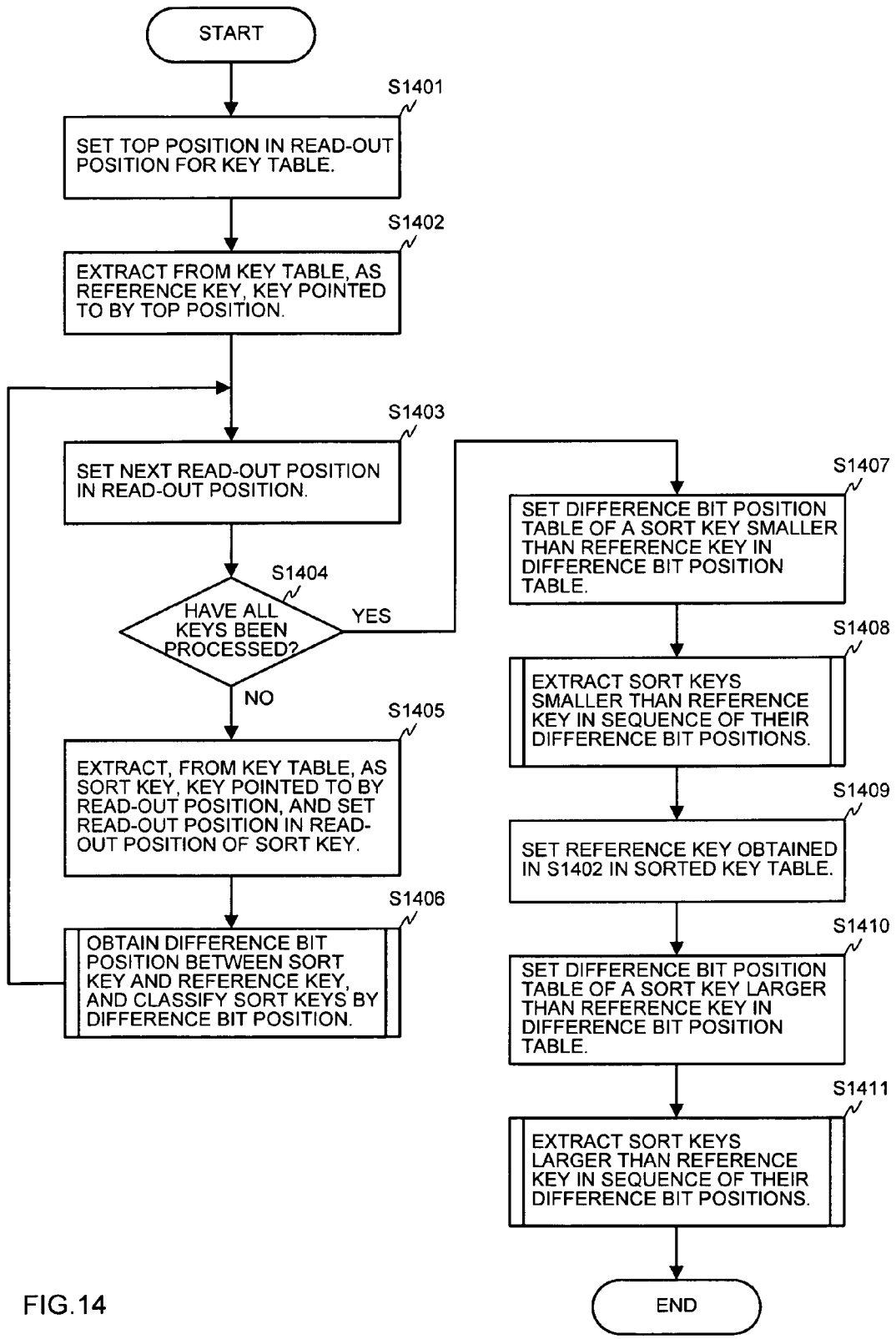
FIG. 14 is a drawing describing an example of the overall processing flow in the sort processing in the third embodiment of this invention.

Next, details of sort processing in the third embodiment of this invention are described referencing FIG. 14. Also, the examples shown in FIG. 13A or FIG. 13B are used as appropriate in the description.

FIG. 14 is a drawing describing an example of the overall processing flow in the sort processing in the third embodiment of this invention. It is presumed that the keys to be sorted are stored in the key table. In other words, the keys included in key string 100 shown in FIG. 13A are taken to be those stored in key table 309 shown in FIG. 13B.

First, in step S1401, the top position for the key table is set in the key table read-out position (hereinbelow this may be simply called the read-out position). What is called the "key table read-out position" is one of "the temporary storage areas applied to various processings for holding the various values obtained in the midst of processing to be used in later processing" as noted above. In the description hereinbelow, the description may omit the expression that the "key table read-out position" is an unillustrated temporary storage area as in the wording "set the top position for the key table in the key table read-out position".

The setting operation noted above sets P0 in the key table read-out position in the example shown in FIG. 13B.

Next, in step S1402, the key pointed to by the top position is extracted from the key table as the reference key. Here, the expression "extract as the reference key" means to set it in the reference key, which is a temporary storage area. Such a temporary storage area is almost never illustrated. Hereinbelow, there are cases wherein the same kind of expression is used.

Proceeding to step S1403, the next read-out position is set in the read-out position. Next, in step S1404, a determination is made whether all the keys have been processed, in other words, whether the initial stage of classification processing for all the keys is finished.

If all the keys have not been processed, processing proceeds to step S1405, wherein the key pointed to by the read-out position is extracted from the key table as the sort key and its read-out position is set in the sort key read-out position. Then in step S1406, the difference bit position between the sort key and the reference key is obtained, and the sort key is classified by means of the difference bit position and a return is made to step S1403.

The processing of step S1406 sets information in the difference bit position table and the link table as part of the initial stage of classification processing. Details of that processing are described later referencing FIG. 15, FIG. 16A and FIG. 16B, and FIG. 17A and FIG. 17B.

Conversely, when, at step S1404, the determination is that all the keys have been processed, a branch is made to step S1407.

At step S1407, the difference bit position table for sort keys smaller than the reference key is set in the difference bit position table, and, proceeding to step S1408, sort keys smaller than the reference key are extracted in the sequence of their difference bit position.

Here, what is meant in step S1407 by "set the difference bit position table for the sort keys smaller than the reference key in the difference bit position table" is that in the next step, step S1408, the difference bit position table for sort keys smaller than the reference key is made to be the difference bit position table that is the object of processing, and in the example shown in FIG. 13B, the processing is made to use the difference bit position table 310a. For example, it can be executed by making the address of the difference bit position table to be the address of the difference bit position table for sort keys smaller than the reference key. The meaning of the above noted "set the difference bit position table for the sort keys smaller than the reference key in the difference bit position table" has the same meaning even in other steps hereinbelow, and also, even in the case of "set the difference bit position table for the sort keys larger than the reference key in the difference bit position table", in the same way, the difference bit position table for sort keys larger than the reference key is made to be the difference bit position table that is the object of processing in the following step.

Also, what is meant in step S1408 by "extract the sort keys in the sequence of the difference bit positions" is that the sort keys are extracted in ascending order or descending order of difference bit positions with respect to the reference key and for each group of a plurality of sort keys with the same difference bit position the process of extracting the sort keys in ascending order or descending order of difference bit positions with respect to a reference key from within that group is repeated until all the keys are partitioned by difference bit position and extracted.

Details of the processing in step S1408 are described later referencing FIG. 18 and FIG. 19.

Following on step S1408, in step S1409, the reference key obtained at step S1402 is set in the sorted key table.

Continuing, at step S1410, the difference bit position table for sort keys larger than the reference key is set in the difference bit position table, and proceeding to step S1411, the sort keys larger than the reference key are extracted in the sequence of the difference bit positions, and processing is terminated.

Details of the processing in step S1411 are explained later referencing FIG. 20 and FIG. 21.

Next, details of the processing of step S1406, step S1408, and step S1411 shown in FIG. 14 is described.

Figure 15:
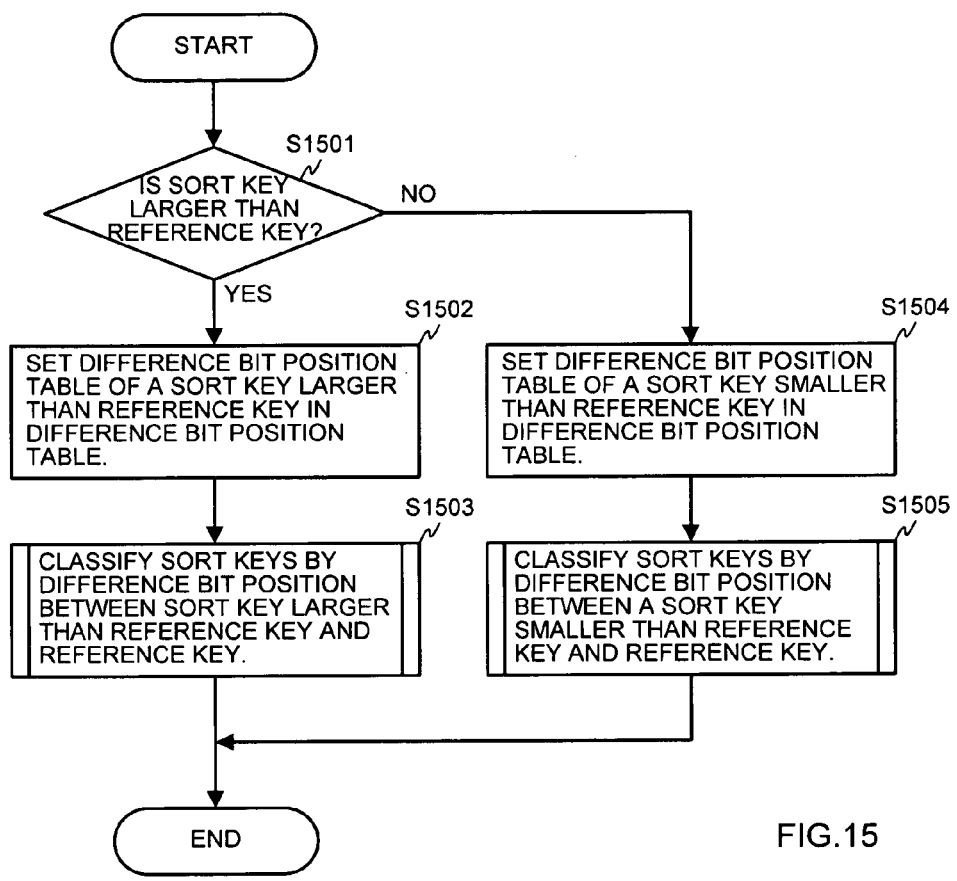
FIG. 15 is a drawing describing an example of the processing flow to classify by the difference bit position the group of keys smaller than the reference key and the group of keys larger than the reference key, respectively, in the third embodiment of this invention.

FIG. 15 is a drawing that describes details of the processing in step S1406 shown in FIG. 14 and it describes an example of the processing flow to classify by the difference bit position the group of keys smaller than the reference key and the group of keys larger than the reference key, respectively, in the third embodiment of this invention.

First, in step S1501, a determination is made whether the sort key is larger than the reference key. The sort key is the key extracted from the key table at step S1405 shown in FIG. 14.

If the sort key is larger than the reference key, processing proceeds to step S1502, and if the sort key is smaller than the reference key, processing proceeds to step S1504. The processing in step S1501 divides the sort keys into a group of keys smaller than the reference key and a group of keys larger than the reference key. Then classification processing is done on the sort keys in each group.

At step S1502, the difference bit position table for sort keys larger than the reference key is set in the difference bit position table. Then proceeding to step S1503, the sort keys are classified by the difference bit position between the sort keys larger than the reference key and the reference key, and processing is terminated. Details of the processing in step S1503 are explained later referencing FIG. 16A and FIG. 16B.

Conversely, if processing proceeds to step S1504, the difference bit position table for sort keys smaller than the reference key is set in the difference bit position table. Then proceeding to step S1505, the sort keys are classified by the difference bit position between the sort keys smaller than the reference key and the reference key, and processing is terminated. Details of the processing in step S1505 are explained later referencing FIG. 17A and FIG. 17B.

Figure 16A:
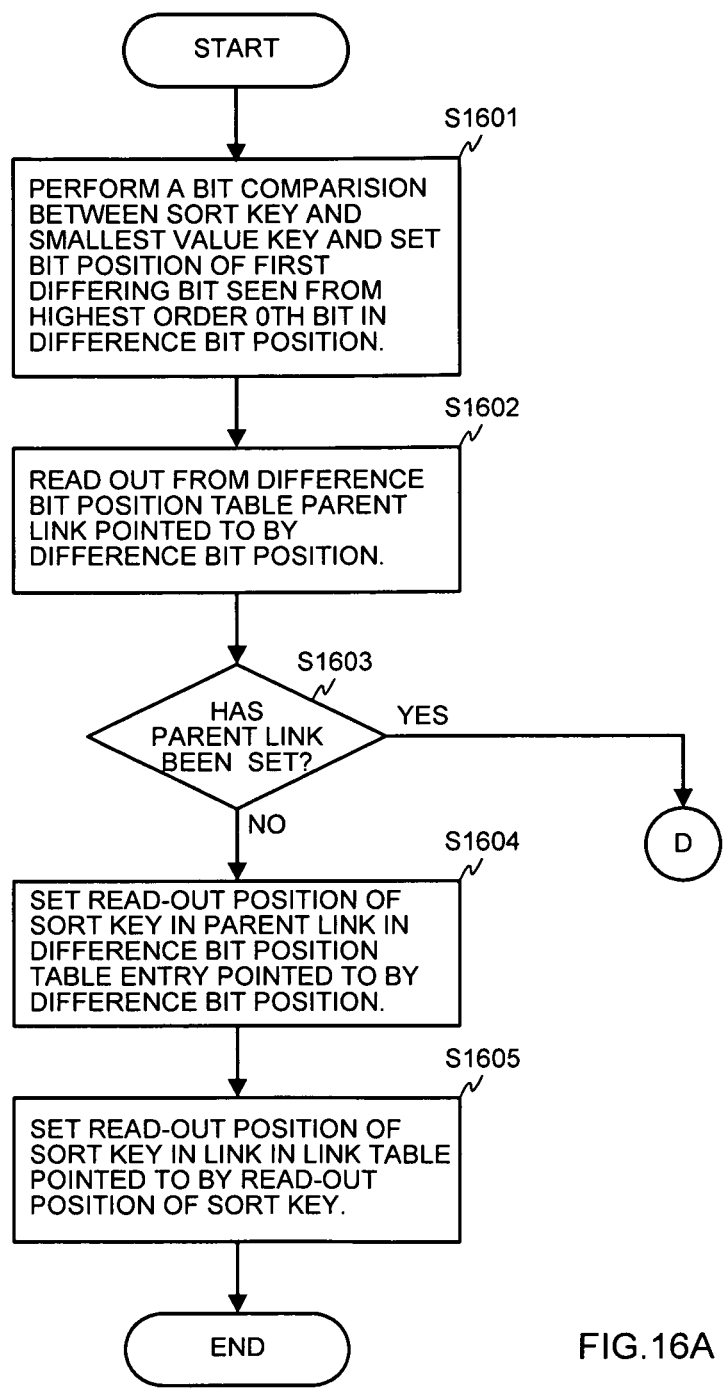
FIG. 16A is a drawing describing an example of the processing flow in the prior stage of classification processing of the group of sort keys larger than the reference key in the third embodiment of this invention.
Figure 16B:
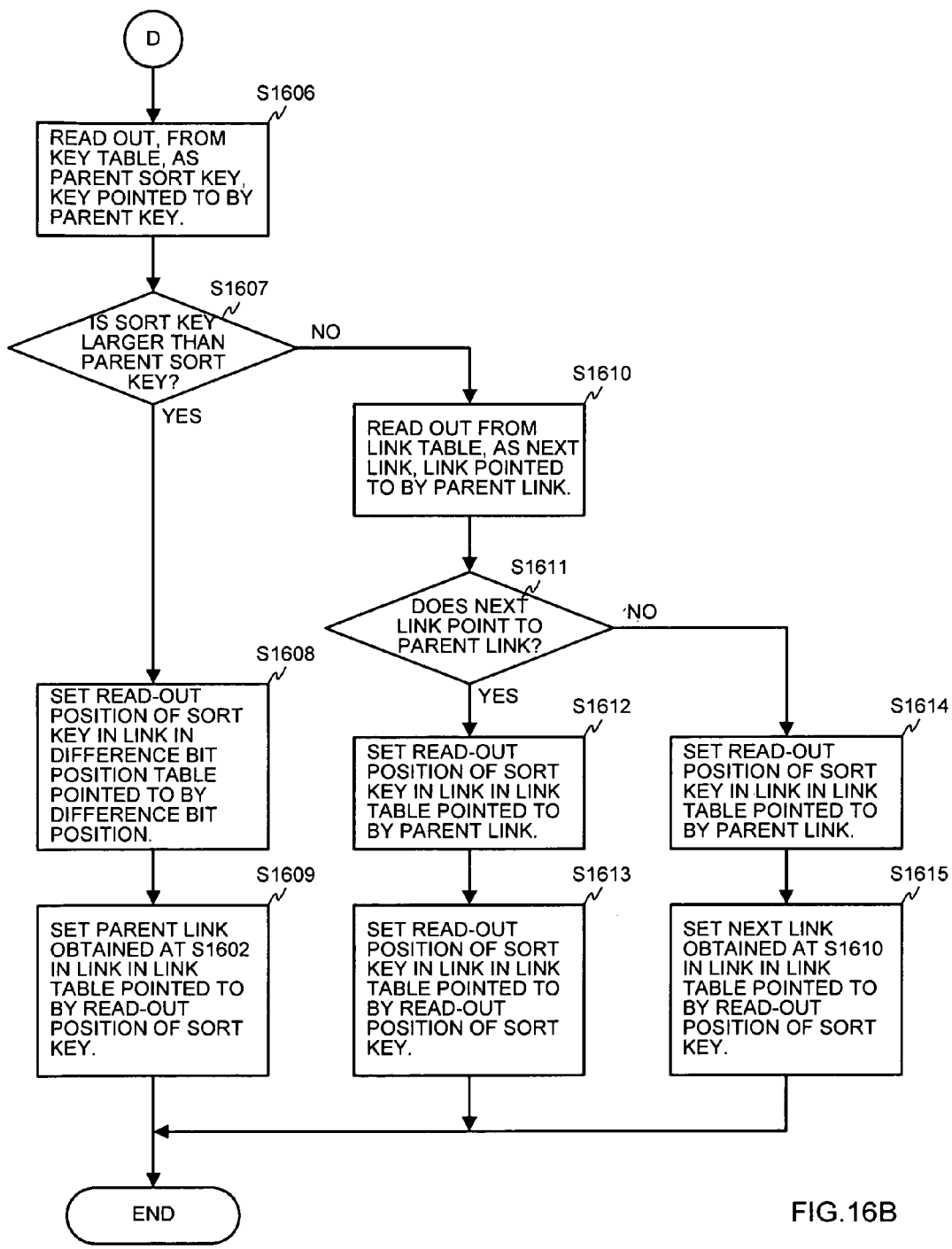
FIG. 16B is a drawing describing an example of the processing flow in the latter stage of classification processing of the group of sort keys larger than the reference key in the third embodiment of this invention.

Next, classification processing of the group of sort keys larger than the reference key in the third embodiment of this invention is described referencing FIG. 16A and FIG. 16B. FIG. 16A and FIG. 16B depict an example of the detailed processing flow in the processing of step S1503 shown in FIG. 15 and step S2103 of FIG. 21, described later.

FIG. 16A is a drawing describing an example of the processing flow in the prior stage of classification processing of the group of sort keys larger than the reference key in the third embodiment of this invention.

As shown in FIG. 16A, at step S1601, a bit string comparison is done between the key set in the sort key and the key set in the reference key, and the bit position of the first non-matching bit seen from the highest level 0th bit is set in the difference bit position. The sort key has been set at step S1405 shown in FIG. 14A or at step S2101 shown in FIG. 21 described below, and it is the key subject to the classification processing shown in FIG. 16A and FIG. 16B.

Next, at step S1602, the parent link pointed to by the difference bit position set at step S1601 is read out from the difference bit position table, and at step S1603 a determination is made whether the parent link has been set. If the parent link has not been set, processing proceeds to step S1604, wherein the sort key read-out position is set in the parent link in the difference bit position table entry pointed to by the difference bit position, and in step S1605 the sort key read-out position is set in the link in the link table entry pointed to by the sort key read-out position and processing is terminated.

Although, as noted above, the read-out position of the largest key among the keys with the same difference bit position is stored in the difference bit position table as the parent link, the processing of the above noted step S1604 takes the first sort key as a provisional largest value key and sets its sort key read-out position in the parent link pointed to by the difference bit position in the difference bit position table. Once the parent link has been set, in other words, when the determination at step S1603 is that the parent link has been set, processing proceeds to the latter stage processing shown in FIG. 16B; and the largest value key is updated by a magnitude comparison between the sort key and the largest value key, and finally, the read-out position of the largest key among the keys with the same difference bit position is set in the difference bit position table as the parent link.

FIG. 16B is a drawing describing an example of the processing flow in the latter stage of classification processing of the group of sort keys larger than the reference key in the third embodiment of this invention.

As shown in FIG. 16B, at step S1606, the key pointed to by the parent link is read out from the key table as the parent sort key, and at step S1607, a determination is made whether the sort key is larger than the parent sort key.

When the determination at step S1607 is that the sort key is larger than the parent sort key, processing proceeds to step S1608, wherein the sort key read-out position is set in the parent link pointed to by the difference bit position in the difference bit position table, and at step S1609, the parent link obtained at step S1602 is set in the link in the link table pointed to by the sort key read-out position, and processing is terminated.

The processing in the above noted step S1608 is the processing to update a parent link with the read-out position of a larger key in order to set the read-out position of the largest key among the keys in the parent link pointed to by the difference bit position in the difference bit position table. Then the processing in step S1609 is the processing to maintain information for traversing the read-out positions in the link table of keys with the same difference bit position, by setting the parent link set in the difference bit position table into the link in the link table entry pointed to by the new sort key read-out position set in the difference bit position table.

Conversely, when the determination at step S1607 is that the sort key is not larger than the parent sort key, processing proceeds to step S1610, wherein the next link pointed to by the parent link is read out from the link table as the next link, and at step S1611, a determination is made whether the next link coincides with the parent link.

When the determination at step S1611 is that the next link coincides with the parent link, in step S1612, the sort key read-out position is set in the link in the link table pointed to by the parent link. Then, in step S1613, the sort key read-out position is set in the link in the link table entry pointed to by the sort key read-out position, and processing is terminated.

Conversely, when the determination at step S1611 is that the next link does not coincide with the parent link, processing proceeds to step S1614, wherein the sort key read-out position is set in the link in the link table entry pointed to by the parent link. Then in step S1615, the next link obtained at step S1610 is set in the link in the link table pointed to by the sort key read-out position, and processing is terminated.

The determination in step S1611 noted above is the same as a determination whether there is only 1 key classified into a group of keys with the same difference bit position. If there is only 1 key classified into that group, its read-out position is stored in the link in the link table entry pointed to by the read-out position of that key. Hence, it is updated by the sort key read-out position and the sort key read-out position is set in the link in the link table entry pointed to by the sort key read-out position, and the sort key indicates that key is the last key to be classified at that point in time. When there are 2 or more keys classified into a group, the sort key read-out position is inserted into the link relationship expressed by the link table, between the parent link and the next link, by the processing of steps S1614 and S1615

Figure 17A:
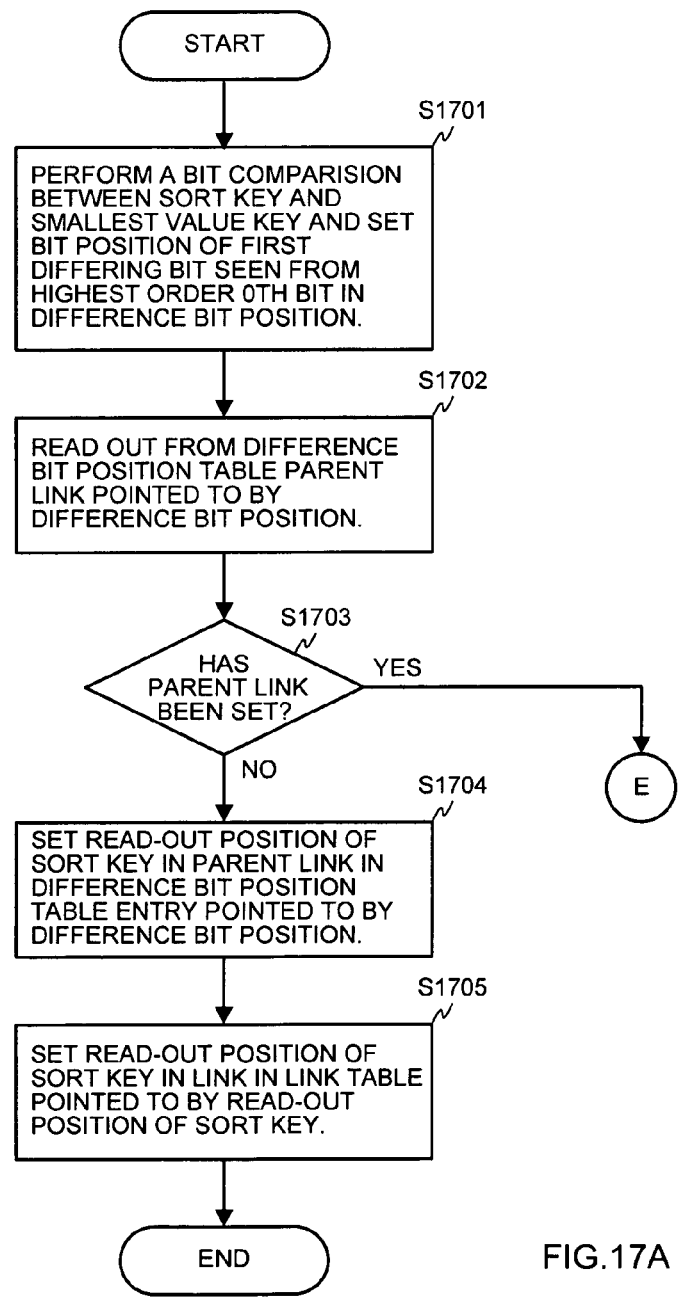
FIG. 17A is a drawing describing an example of the processing flow in the prior stage of classification processing of the group of sort keys smaller than the reference key in the third embodiment of this invention.
Figure 17B:
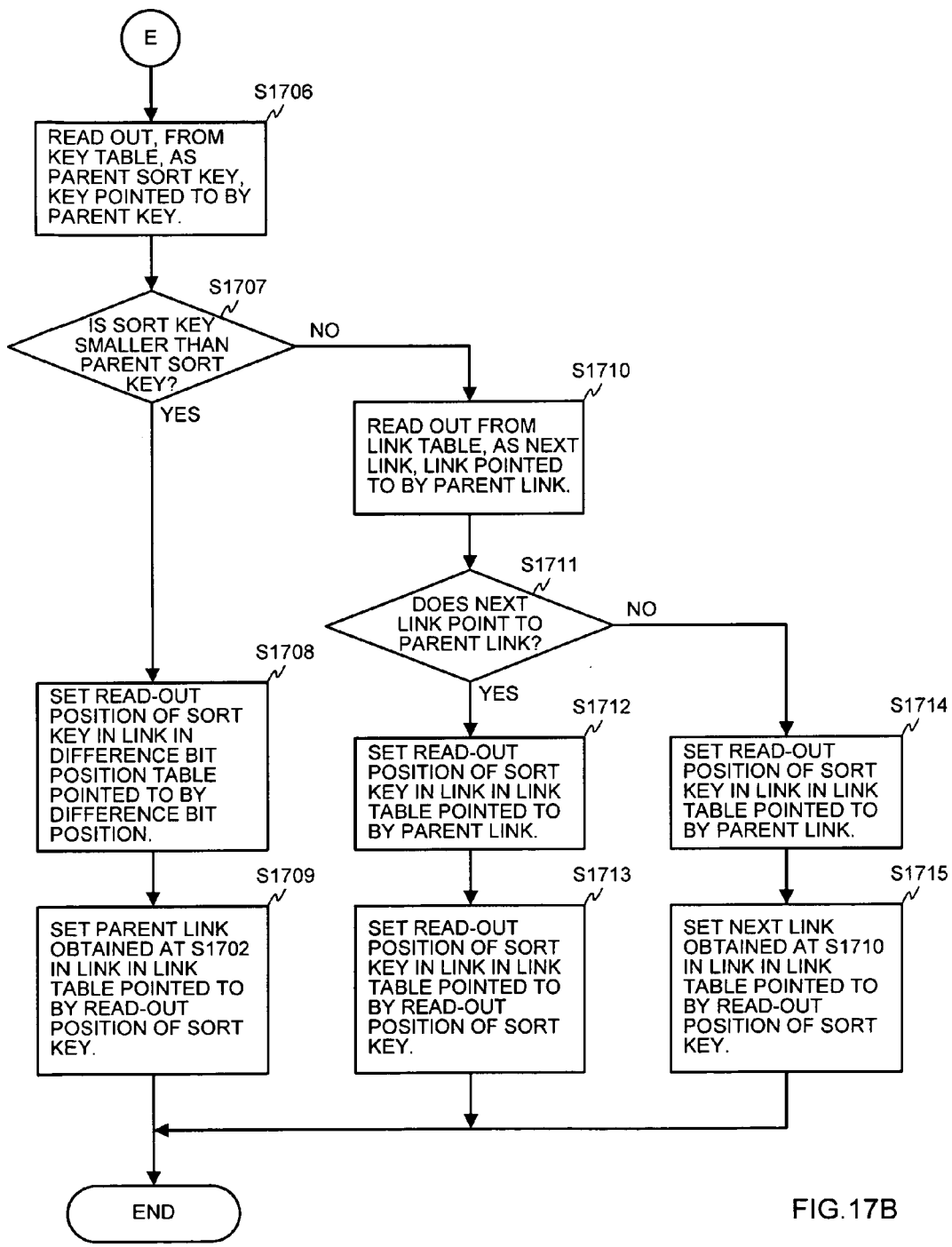
FIG. 17B is a drawing describing an example of the processing flow in the latter stage of classification processing of the group of sort keys smaller than the reference key in the third embodiment of this invention.

Next, classification processing of the group of sort keys smaller than the reference key in the third embodiment of this invention is described referencing FIG. 17A and FIG. 17B. FIG. 17A and FIG. 17B depict an example of the detailed processing flow in the processing of step S1505 shown in FIG. 15 and step S1903 of FIG. 19, described later.

When comparing the description in FIG. 17A and FIG. 17B of the classification of the group of sort keys smaller than the reference key and the description in FIG. 16A and FIG. 16B of the classification of the group of sort keys larger than the reference key, the example of the processing flow in the prior stage shown in FIG. 17A and FIG. 16A is the same. Also, the processing flow in the latter stage shown in FIG. 17B and FIG. 16B also differ only in that at step S1707 in FIG. 17B, wherein the sort key and the parent sort key are compared, for the determination whether the sort key is smaller than the parent sort key, at step S1607 in FIG. 16B the determination is whether the sort key is larger than the parent sort key, and all the other steps are practically the same.

Thus, the description the processing to classify the group of sort keys smaller than the reference key in the third embodiment of this invention, referencing FIG. 17A and FIG. 17B terminates with the above.

Next, details of the processing in step S1408 shown in FIG. 14 are described.

Figure 18:
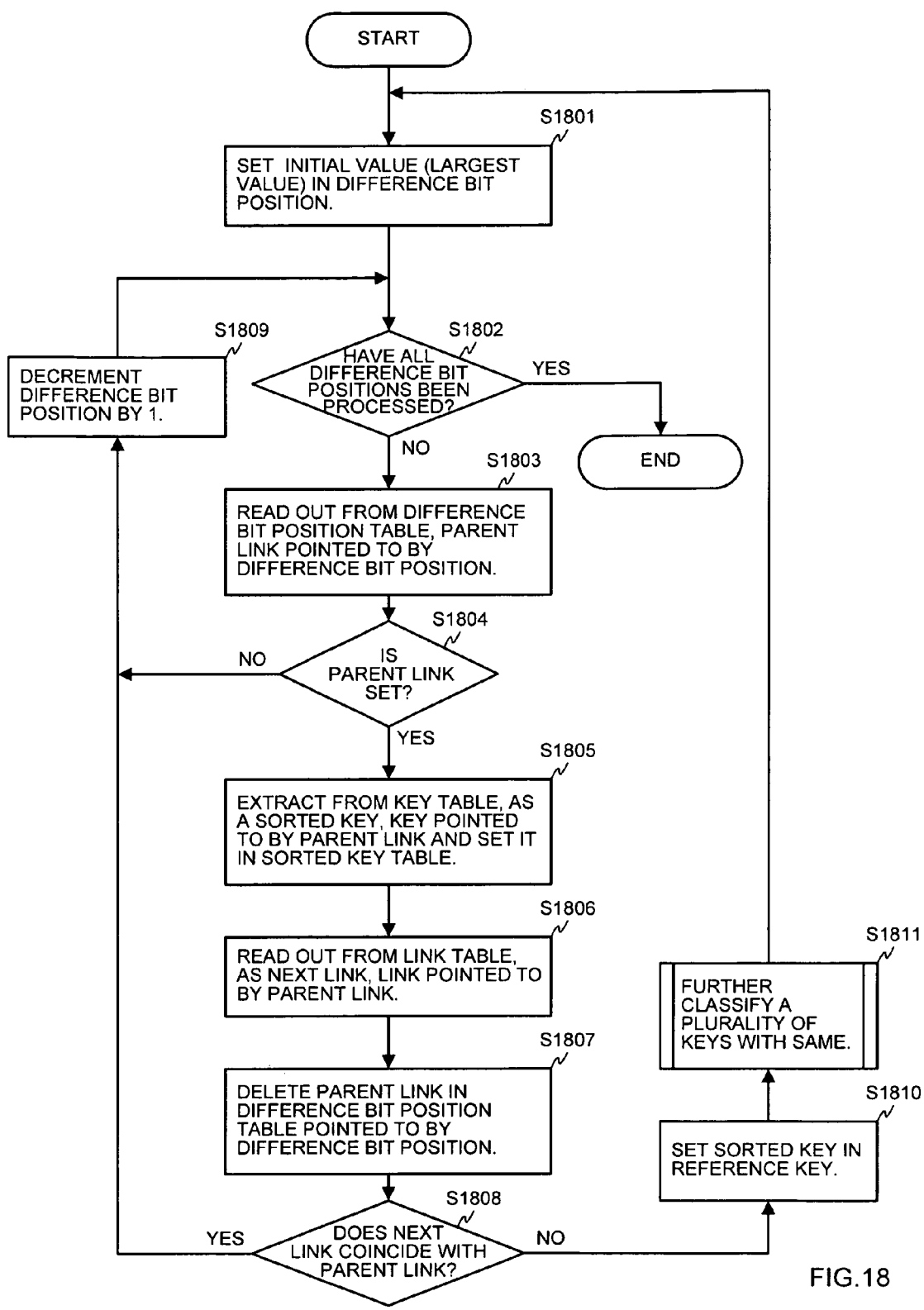
FIG. 18 is a drawing describing an example of the processing flow to extract sort keys smaller than the reference key in the sequence of their difference bit positions in the third embodiment of this invention.

FIG. 18 is a drawing describing an example of the processing flow to extract sort keys smaller than the reference key in the sequence of their difference bit positions in the third embodiment of this invention, and it describes the details of the processing in step S1408 shown in FIG. 14.

As shown in FIG. 18, in step S1801, the difference bit position for the difference bit position table is initialized, in other words, the largest value for the difference bit positions that could possibly be held by the keys to be sorted is set in the difference bit position, which is an unillustrated temporary storage area. In the example shown in FIG. 13A, "3" is set as the largest value for the difference bit positions.

In step S1802, a determination is made whether all the difference bit position entries in the difference bit position table have been processed, and if all have been processed, processing is terminated, and if they have not all been processed, processing proceeds to step S1803.

At step S1803, the parent link is read out from the entry in the difference bit position table pointed to by the difference bit position. If a parent link is stored in the entry pointed to by the difference bit position, the read-out parent link is stored in the parent link, which is a temporary storage area. In other words, in descriptions of preferred embodiments of this invention, expressions such as "read out the parent link" means to read out the parent link and set it in the parent link, which is an unillustrated temporary storage area. The same applies to things other than the parent link.

At the next step, step S1804, a determination is made whether the parent link is set. If the parent link is not set, a branch is made to step S1809, wherein the value of the difference bit position is decremented by "1", and a return is made to step S1802, while, conversely, if the parent link is set, processing proceeds to step S1805. In the example shown in FIG. 13B, no parent link is set in the difference bit position "3", which is the largest value, while parent links P2 and P1 are set in difference bit positions "2" and "0" respectively.

At step S1805, the key pointed by the parent link (key table read-out position) set at step S1803 is read out from the key table as the sorted key, and that read-out sorted key is set in the sorted key table. As was described above, because the key stored in that read-out position in the difference bit position table is the key with the largest value among the keys classified at the same difference bit position, it is set in the sorted key table at step S1805. In the example shown in FIG. 13B, the key "1000" in the key table entry pointed to by parent link P2 is extracted as a sorted key and is set in the sorted key table. For the difference bit position "0", the key "0111" in the key table entry pointed to by parent link P1 is extracted as a sorted key and is set in the sorted key table.

Next, at step S1806, the link pointed to by the parent link set at step S1803 is read out from the link table, and at step S1807, the parent link in the difference bit position table entry pointed to by the difference bit position is deleted and processing proceeds to step S1808. The parent link in the difference bit position table entry pointed to by the difference bit position is deleted because the classification processing for the largest value key, whose read-out position at the key table is the parent link, is completed at step S1805, and thus this parent link in the difference bit position table is no longer necessary and the deletion avoids the effect on later processing of this parent link remaining in difference bit position table.

At step S1808, a determination is made whether the next link read out at step S1806 coincides with the parent link set at step S1803.

When the determination at step S1808 is that the next link coincides with the parent link, a return is made to step S1802 via step S1809 described above.

The processing loop of steps S1802 to S1809 noted above extracts the sorted keys in descending order of their difference bit position and stores them in the sorted key table. Because the value of keys with larger difference bit positions are closer to the value of the reference key, extracting sorted keys in descending order of their difference bit position enables the sorted keys to be extracted in descending order.

Therefore, by providing a first sorted key table holding sort keys smaller than the reference key separately besides a second sorted key table holding sort keys larger than the reference key, and by storing the sorted keys in descending order in the direction of the addresses in the first sorted key table from largest to smallest, the sorted keys can be read out from the first sorted key table in ascending order.

Also, by counting the number of sort keys smaller than the reference key and the number of sort keys larger than the reference key depending on the determinations results of step S1501 shown in FIG. 15, for sorted key table, the range holding sort keys smaller than the reference key, the position holding the reference key, and the range holding sort keys larger than the reference key can be determined.

Furthermore, in order to extract the sort keys smaller than the reference key in ascending order, the read-out position for the smallest value key can be set in the parent link in the difference bit position table and the sort keys can be extracted as sorted keys in ascending order of the difference bit position. However, if processing is done in ascending order of difference bit positions, when there is a plurality of keys with the same difference bit position and a subclassification by difference bit position, described later, is done, a separate difference bit position table for subclassifications must be prepared because data in the original difference bit position table may get corrupted.

At the above-noted step S1808, the determination that the next link coincides with the parent link means that the key whose read-out position in the key table is the parent link is the only key with the difference bit position wherein the parent link is stored. In the example shown in FIG. 13B, that is the case wherein read-out position 621 in link table 311 is P2 and link 622 is P2. Also, in the example shown in FIG. 13A, key group 142*a* is configured only with key "1000", and corresponds to the case wherein classification processing is not performed for key group 142*a*. Then, because this case indicates the termination of classification processing for the difference bit position in the difference bit position table wherein the parent link was stored, the difference bit position is decremented by 1, and processing proceeds to the processing of steps S1802 to S1808 on the next difference bit position. In the example shown in FIG. 13A, the processing is done on key group 140*a* at difference bit position "0".

Conversely, when the determination at step S1808 is that the next link and parent link do not coincide, processing proceeds to step S1810, wherein the sorted key is set in the reference key. The sorted key is the one extracted at the above-noted step S1805 and is the one set in the sorted key table, and, in order to make it the reference key for the subclassification of these sorted keys described later, it is set in the reference key, which is an unillustrated temporary storage area. Then, in step S1811, a plurality of keys with same difference bit position (set at step S1801 or step S1809) are further classified (subclassified) by a lower level difference bit position. Details of the processing in step S1811 is described later referencing FIG. 19.

A case wherein the determination at step S1808 is that the next link does not coincide with the parent link is the case in the example shown in FIG. 13B wherein the read-out position 621 in the link table 311 is P1 and link 622 is P4. In the example shown in FIG. 13A, classification-by-difference-bit-position 449*b* is executed on the plurality of keys in key group 440*a*. The processing of step S1811 sets the difference bit position table and link table again, and a return is made to step S1801. Then processing is repeated on the difference bit positions in the newly set difference bit position table wherein a parent link is specified.

The above processing is repeated until the determination in step S1802 is that processing have been finished for all the entries at all the difference bit positions in the difference bit position table, and when that determination is made processing is terminated because the sort of the keys to be sorted is completed.

Figure 19:
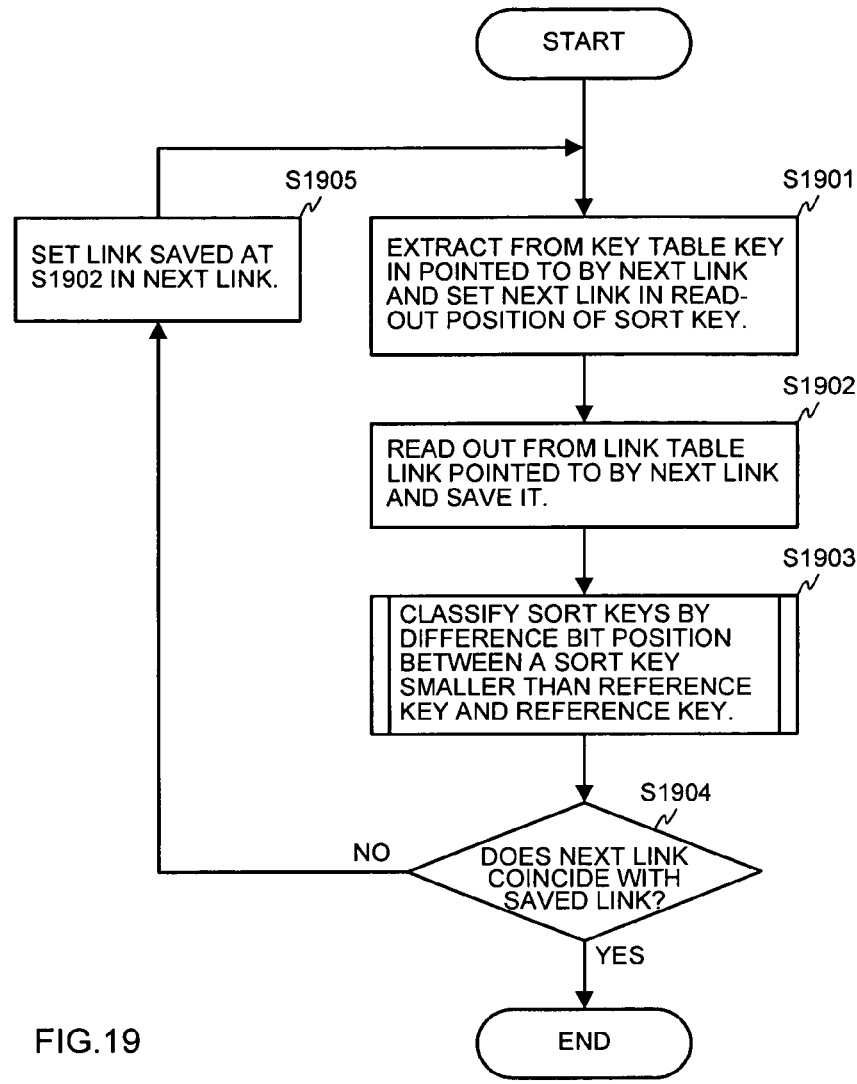
FIG. 19 is a drawing describing an example of the detailed processing flow for subclassifying in the sequence of difference bit positions a plurality of sort keys smaller than the reference key linked to the same difference bit position, in the third embodiment of this invention.

Next, referencing FIG. 19, details of the processing in step S1811 shown in FIG. 18 are described. FIG. 19 is a drawing describing an example of the detailed processing flow for subclassifying in the sequence of difference bit positions a plurality of sort keys smaller than the reference key linked to the same difference bit position, in the third embodiment of this invention.

As shown in FIG. 19, in step S1901, the key pointed to by the next link is extracted from the key table as the sort key and the next link is set in the read-out position for the sort key. Then, in step S1902, the link pointed to by the next link is read out from the key table and is saved in a save area. The next link in step S1901 is the link pointed to by the parent link read out from the link table in step S1806 shown in FIG. 18. If the classification processing were to be that of the keys with difference bit position "0" in the example in FIG. 13B, the parent link would be P1, the next link would be P4, and the link that is pointed to by the next link and saved in the save area would be P3.

The reason that the link pointed to by the next link is saved in step S1902 is to ensure sound processing in the next steps, step S1903 and thereafter for processing using the link pointed to by the next link, by saving that link in advance, because in the next step, step S1903, classification processing is done based on the difference bit position between the sort key extracted at step S1901 and the reference key set at step S1811 shown in FIG. 18, and as a result of that processing the value of the link in the link table pointed to by the next link is rewritten.

At step S1903, the difference bit position is obtained between the sort key and the reference key and the sort keys are classified by that difference bit position, which was described in detail referencing FIG. 17A and FIG. 17B.

Then in step S1904, a determination is made whether the next link coincides with the saved link. If the saved link coincides with the next link, processing is terminated because there are no more keys to be classified at the same difference bit position.

Conversely, when the determination in step S1904 is that the next link does not coincide with the saved link, the saved link is set in the next link in step S1905, and a return is made to step S1901, and classification processing continues with key subject of classification whose key table read-out position is made to be the newly set next link.

The above noted processing loop of steps S1901 to S1905 is repeated until the saved link coincides with the next link, in other words, until all keys subject to classification have been processed, and when all keys subject to classification have been processed processing is terminated.

Next, details of the processing in step S1411 shown in FIG. 14 are described.

Figure 20:
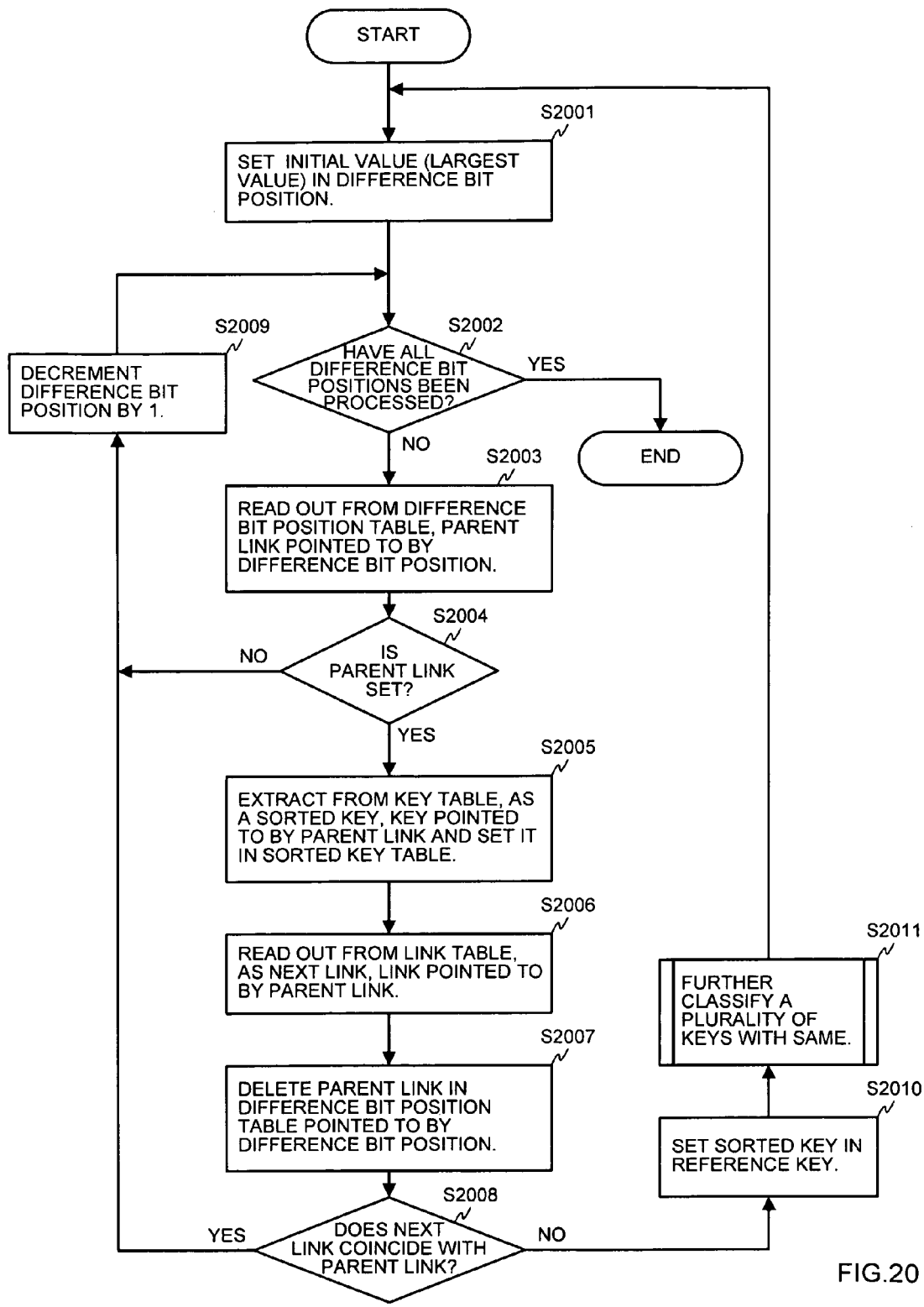
FIG. 20 is a drawing describing an example of the processing flow to extract sort keys larger than the reference key in the sequence of their difference bit positions in the third embodiment of this invention.

FIG. 20 is a drawing describing an example of the processing flow to extract sort keys larger than the reference key in the sequence of their difference bit positions in the third embodiment of this invention and is a drawing describing the details of step 411 shown in FIG. 14.

Figure 21:
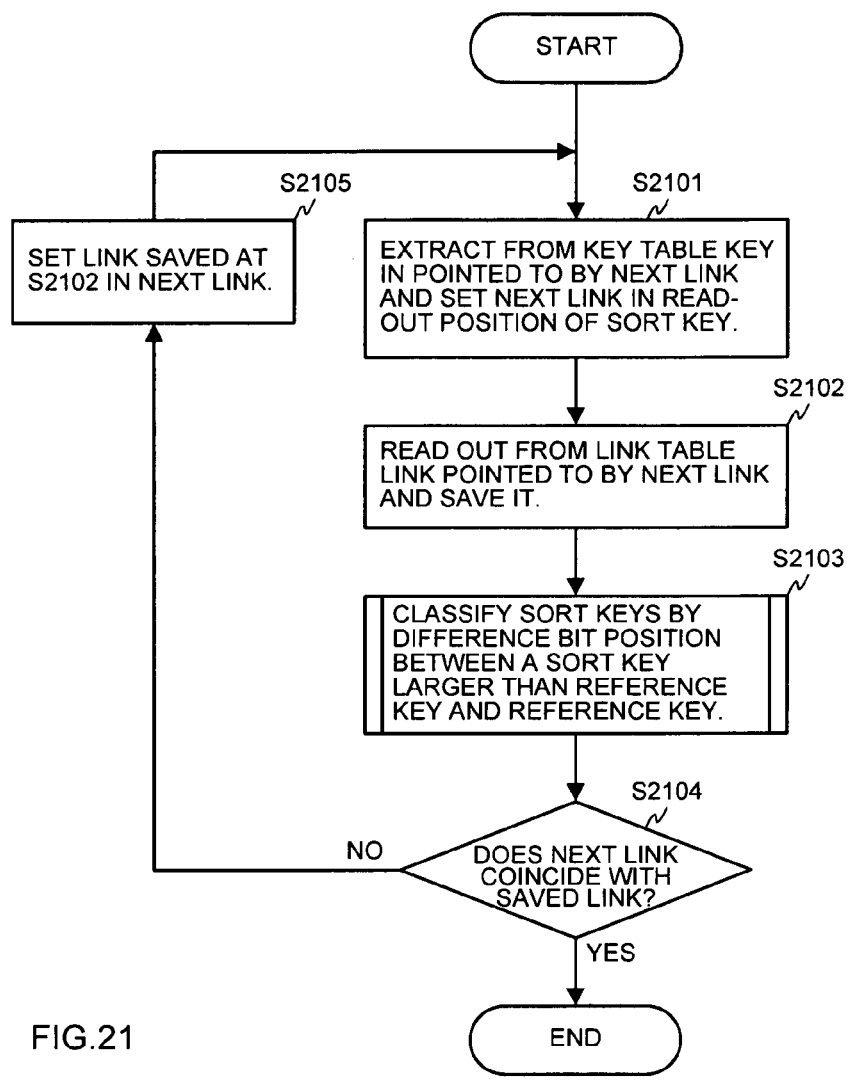
FIG. 21 is a drawing describing an example of the processing flow to subclassify, in the sequence of their difference bit positions, a plurality of sort keys larger than the reference key linked to a difference bit position, in the third embodiment of this invention.

When comparing with the example of the processing flow to extract sort keys smaller than the reference key in the sequence of their difference bit positions shown in FIG. 18, the example of the processing flow to extract sort keys larger than the reference key in the sequence of their difference bit positions shown in FIG. 20 is the same as that shown in FIG. 18 except for the fact that the details of the processing shown in step S2011 to further classify a plurality of keys with the same difference bit position are shown in FIG. 21 instead of FIG. 19. Thus any further description of the example of processing flow shown in FIG. 20 is omitted.

FIG. 21 is a drawing showing details of the processing step S2011 shown in FIG. 20, and it is a drawing describing an example of the detailed processing flow for further classifying a plurality of sort keys larger than the reference key with the same difference bit position in the third embodiment of this invention.

When the examples of the detailed processing flow to further classify the plurality of keys with the same difference bit position shown in FIG. 19 and FIG. 21 are compared, regarding the further classifying of a plurality of keys with the same difference bit position, they are the same except for the fact that the processing in step S1903 shown in FIG. 19 is that wherein sort keys are classified by the difference bit position between the sort keys smaller than the reference key and the reference key, while the processing in step S2103 shown in FIG. 21 is that wherein sort keys are classified by the difference bit position between the sort keys larger than the reference key and the reference key.

Hence, details of the processing in step S1903 shown in FIG. 19 are shown in FIG. 17A and FIG. 17B while details of the processing in step S2103 shown in FIG. 21 are shown in FIG. 16A and FIG. 16B. Thus any further description of the example of processing flow shown in FIG. 21 is omitted.

Figure 22A:
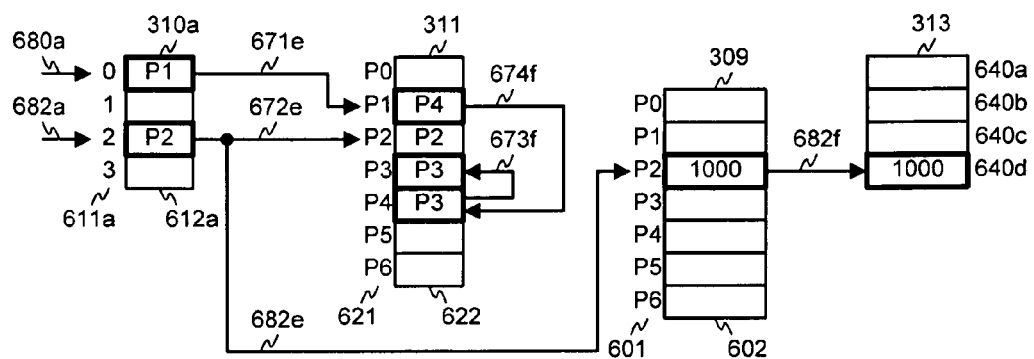
FIG. 22A-FIG. 22C are drawings describing the data flow for extracting keys in descending order in the third embodiment of this invention.
Figure 22B:
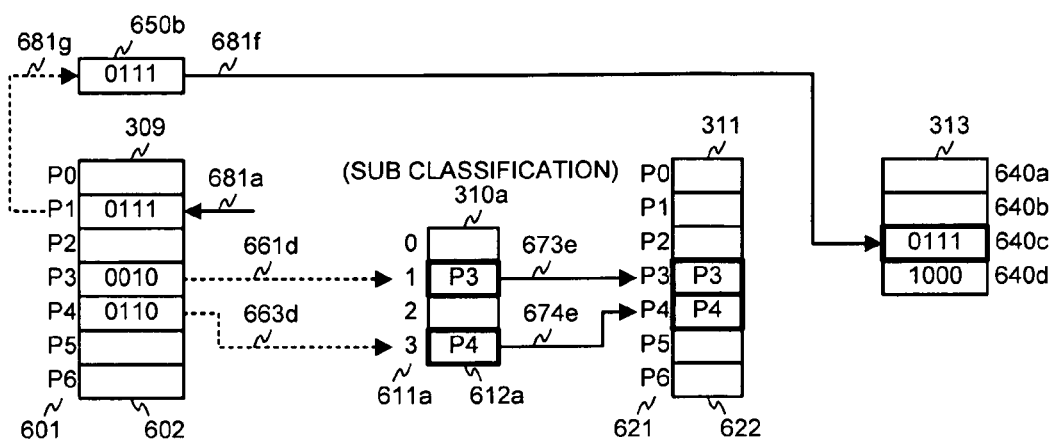
Figure 22C:
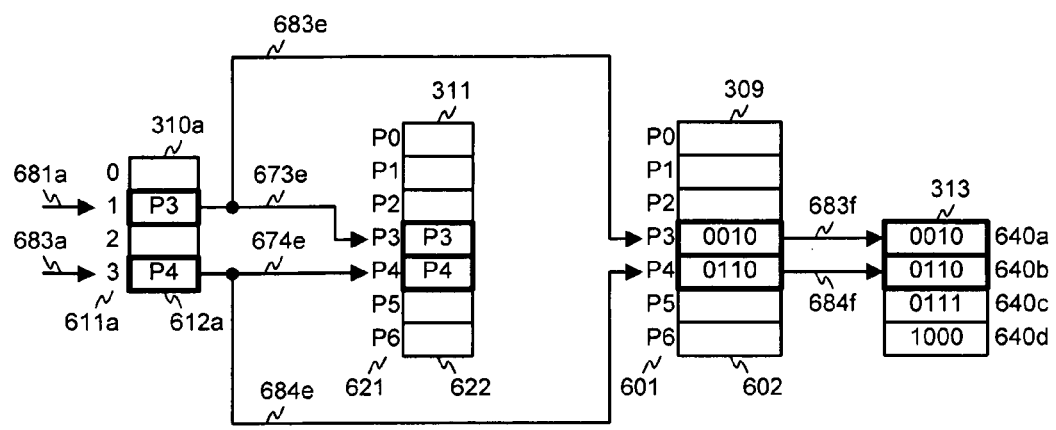

FIG. 22A-FIG. 22C are drawings describing the data flow for extracting keys in descending order in the third embodiment of this invention. FIG. 22A-FIG. 22C show the data flow for extracting the keys in descending order from the group of keys smaller than the reference key, after classification of the keys into groups of keys larger than and smaller than the reference key, for the same keys shown in the example in FIG. 13A and FIG. 13B.

FIG. 22A shows the status wherein the initial values shown in FIG. 13B are set in the difference bit position table 310a and the link table 311, and the first sorted key "1000" is extracted, and is stored in the sorted key table 313.

The difference bit position table 310a, just as is shown in the processing flow example shown in FIG. 18, is accessed in descending order of difference bit positions.

First the parent link P2, shown by the arrow 682a and stored in the entry for which the difference bit position 611a is 2, is read out, and, as shown by the arrow 672e, the P2, which is the link 622, is read out, as the next link, from the entry for which the readout position 621 in link table 311 is P2. Then, because a determination is made that the P2 that is both the parent link and the next link is the same thing, the key "1000" is read out, as a sorted key, from the readout position P2 in key table 309 shown by arrow 682e and it is stored in entry 640d in sorted key table 313.

Next, the parent link P1 stored in the entry for which the difference bit position 611a is "0", shown by the arrow 680a, is read out, and as shown by the arrow 671e, P4, which is the link 622, is read out, as the next link, from the entry for which the readout position 621 in link table 311 is P1, and a determination is made that the parent link P1 does not coincide with the next link P4.

FIG. 22B shows the status wherein, in the subclassification of the group of keys whose difference bit position with respect to the reference key "1010" is "0", the reference key "0111" is extracted and stored in sorted key table 313, and the difference bit position table and the link table are set again by the reference key in the subclassification.

The key "0111", pointed to by the parent link P1 stored in the entry for which the difference bit position 611a in difference bit position table 310a shown in FIG. 22A is "0", is extracted from the readout position P1 in key table 309 shown by arrow 681a to sorted key 650b as shown by the dotted-line arrow 681g, and as shown by arrow 681f, it is stored in entry 640c in sorted key table 313.

The keys at readout position P3 and P4 are read out from key table 309 based on the link relationships in link table 311 shown by arrows 674f and 673f in FIG. 22A and the difference bit position is recomputed with sorted key 650b as the reference key, and difference bit position table 310a and link table 311 are set again.

Because the difference bit position of key "0010" stored in readout position P3 in key table 309 is 1, as shown by the dotted-line arrow 661d, P3 is set in the entry for which the difference bit position 611a in difference bit position table 310a is "1". In the same way, because the difference bit position of key "0110" stored in readout position P4 in key table 309 is "3", as shown by the dotted-line arrow 663d, P4 is set in the entry for which the difference bit position 611a in difference bit position table 310a is "3".

Also because there is only 1 key whose difference bit position is "1" and only 1 key whose difference bit position is "3", respectively, as shown by arrows 673e and 674e, P3 and P4 are set in the link 622 of the entries for which the readout positions 621 in link table 311 are P3 and P4 respectively.

FIG. 22C shows the status wherein the keys stored in the entries whose readout positions 601 in key table 309 are P3 and P4 are stored in sorted key table 313, and the sort of the group of keys smaller than the reference key is completed.

First, the parent link P4 stored in the entry for which the difference bit position 611a is "3", shown by arrow 683a, is read out, and as shown by the arrow 674e, P4, which is link 622, is read out from the entry for which the readout position 621 in link table 311 is P4 as the next link. Then because a determination is made that the P4 that is both the parent link and the next link is the same thing, key "0110" is extracted from readout position P4 in key table 309, shown by arrow 684f, as a sorted key, and it is stored in entry 640b in sorted key table 313 as shown by arrow 684f.

Next, the parent link P3 stored in the entry for which the difference bit position 611a is "1", shown by arrow 681a, is read out, and as shown by the arrow 673e, P3, which is link 622, is read out from the entry for which the readout position 621 in link table 311 is P3 as the next link. Then because a determination is made that the P3 that is both the parent link and the next link is the same thing, key "0010" is extracted from readout position P3 in key table 309, shown by arrow 683e, as a sorted key, and it is stored in entry 640a in sorted key table 313. as shown by arrow 683f. Then because no parent link is set in the entry for which the difference bit position 611a is "0", the sort of the group of keys smaller than the reference key is completed.

The above describes details of modes for implementing the first embodiment, the second embodiment and the third embodiment of this invention but the modes for implementing this invention are not limited to those embodiments and various modifications are possible.

It is clear that a bit string data sort apparatus of the first embodiment of this invention that implements the storage means storing data with the data configuration shown in the example in FIG. 2B and the processing shown in FIG. 4A and FIG. 4B can be implemented on a computer in a computer program to be executed by a computer.

Also, it is clear that a bit string data sort apparatus of the second embodiment of this invention that implements the storage means storing data with the data configuration shown in the example in FIG. 10B and the processing shown in FIG. 11A and FIG. 11B can be implemented on a computer in a computer program to be executed by a computer and that a bit string data sort apparatus of the third embodiment of this invention that implements the storage means storing data with the data configuration shown in the example in FIG. 13B and the processing shown in FIG. 14 can be implemented on a computer in a computer program to be executed by a computer.

Therefore, the above-noted programs, and the computer-readable storage mediums into which the programs are stored are encompassed by the embodiments of the present invention.

As for the second embodiment, for example, it is clear that, in the sort processing shown in FIG. 12B, although by reading out the key pointed to by the link extracted from the key table at step S1241 and setting, in the data to be sorted, the link and the lower n bits for the difference bit position as sort keys, the size of the sort key is made smaller, the same sort results are obtained even if the key itself is set in the data to be sorted and the sort keys are sorted using the lower n bits for the difference bit position in the key.

Also it is clear that without including the links in the data to be sorted, the high bit values difference bit position up through the difference bit position can be set aside and after sorting the n bits lower than the difference bit position can be appended to the value set aside and the key can be recovered. Although the processing becomes complicated, it is possible to switch between including the link and not including the link depending on the relationship between the number of bits need for a link and the size of the difference bit position.

If the size of the difference bit position is large, the data size of the data to be sorted can be compressed by excluding from the sort the bits from the highest order bit to the difference bit.

Using the new bit string data sort methods proposed by this invention and described in detail hereinabove enables a faster bit string data sort.

What is claimed is:

1. A bit string data sort apparatus for sort processing of keys to be sorted, which keys are expressed as bit strings, comprising:
   a keys-to-be-sorted storage means that stores the keys to be sorted;
   a difference bit position calculating means that obtains a difference bit position, which is a position of a first differing bit found by a bit string comparison between a key stored in the keys-to-be-sorted storage means, which key is an object of a classification in classification processing that constitutes the sort processing, and a reference key taken from among keys subject to the classification;
   a key-to-be-classified difference bit position storage means that, for each difference bit position obtained by the difference bit position calculating means, stores identification information for keys with that difference bit position;
   a difference bit position classifying means that, for each difference bit position obtained by the difference bit position calculating means, by writing the identification information for the keys with that difference bit position into the key-to-be-classified difference bit position storage means, classifies the keys subject to the classification into groups of keys so that keys in each of the groups have same difference bit position;
   a sorted key outputting means that outputs a key as a sorted key if there is only one key with the same difference bit position classified by the difference bit position classifying means and, if there is a plurality of keys with the same difference bit position, outputs from among the plurality of keys a key to be the reference key in a next classification processing as the sorted key; and
   a control means that controls the difference bit position calculating means, the difference bit position classifying means, and the sorted key outputting means so that
   the difference bit position calculating means obtains the difference bit position by taking all of the keys to be sorted as the object of the classification in an initial processing, and thereafter repeatedly obtains the difference bit position by taking a group of keys consisting of a plurality of keys, which group is classified by the difference bit position classifying means as having the same difference bit position, as the object of a further classification, and
   the difference bit position classifying means repeatedly classifies the keys subject to the classification into groups of keys so that keys in each of the groups have same difference bit position for each difference bit position obtained by the difference bit position calculating means, and
   the sorted key outputting means outputs the key as the sorted key when the difference bit position classifying means, for each difference bit position, classifies keys into a group with the same difference bit position.

2. A bit string data sort apparatus according to claim 1, wherein
   a smallest value key with a smallest value among keys subject to the classification, or a largest value key with a largest value among the keys subject to the classification, is taken to be the reference key among the keys subject to The classification.

3. A bit string data sort apparatus according to claim 2, wherein
   the identification information for the keys is a read-out position, which is an address of the key in the keys-to-be-sorted storage means, and
   the key-to-be-classified difference bit position storage means is configured by a difference bit position table and a link table,
   the difference bit position table holding, for each difference bit position of the keys subject to the classification with respect to the reference key among the keys subject to the classification, a parent link that is the read-out position of a smallest key or largest key among keys with the same difference bit position with respect to the smallest value key or the largest value key, and
   the link table holding, for each read-out position, a link that is a read-out position of a key with same difference bit position of a key with each such read-out position.

4. A bit string data sort apparatus according to claim 3, wherein
   a link whose read-out position in the link table is the read-out position in the keys-to-be-sorted storage means for a key with the same difference bit position is held in the link table so as to enable to reference the read-out positions in the keys-to-be-sorted storage means for all the keys with the same difference bit position, by traversing successively the links held at those read-out positions, and the read-out position of a last key among the keys with the same difference bit position is held as the link at the read-out position of the last key.

5. A bit string data sort apparatus according to claim 4, wherein
   the control means controls the difference bit position classifying means so that the difference bit position classifying means repeatedly classifies, in descending order or ascending order of the difference bit positions in the difference bit position table, a group of keys with the same difference bit position with respect to a key whose read-out position is the parent link held at the difference bit position in the difference bit position table.

6. A bit string data sort method for sort processing of keys to be sorted, which keys are expressed as bit strings, comprising:
   a keys-to-be-sorted storage step that stores the keys to be sorted in a keys-to-be-sorted storage means;
   a difference bit position calculating step that obtains a difference bit position, which is a position of a first differing bit found by a bit string comparison between a key stored in the keys-to-be-sorted storage means, which key is an object of a classification in classification processing that constitutes the sort processing, and a reference key taken from among keys subject to the classification;
   a difference bit position classifying step that, for each difference bit position obtained by the difference bit position calculating step, by writing identification information for the keys with that difference bit position into a key-to-be-classified difference bit position storage means, classifies the keys subject to the classification into groups of keys so that keys in each of the groups have same difference bit position;

a sorted key outputting step that outputs a key as a sorted key if there is only one key with the same difference bit position classified by the difference bit position classifying step and if there is a plurality of keys with the same difference bit position, outputs from among the plurality of keys as the sorted key the reference key in a next classification processing; and a control step that controls the difference bit position calculating step, the difference bit position classifying step, and the sorted key outputting step so that the difference bit position calculating step obtains the difference bit position by taking all of the keys to be sorted as the object of the classification in an initial processing, and thereafter repeatedly obtains the difference bit position by taking a group of keys consisting of a plurality of keys, which group is classified at the difference bit position classifying step as having the same difference bit position, as the object of a further classification, and the difference bit position classifying step repeatedly classifies the keys subject to the classification into groups of keys so that keys in each of the groups have same difference bit position for each difference bit position obtained at the difference bit position calculating step, and the sorted key outputting step outputs the key as the sorted key when the difference bit position classifying step, for each difference bit position, classifies keys into a group with the same difference bit position.

7. A bit string data sort method according to claim 6, wherein a smallest value key with a smallest value among keys subject to the classification, or a largest value key with a largest value among the keys subject to the classification, is taken to be the reference key among the keys subject to the classification.

8. A bit string data sort method according to claim 7, wherein the identification information for the keys is a read-out position, which is an address of the key in the keys-to-be-sorted storage means, and the key-to-be-classified difference bit position storage means is configured by a difference bit position table and a link table, the difference bit position table holding, for each difference bit position of the keys subject to the classification with respect to the reference key among the keys subject to the classification, a parent link that is the read-out position of a smallest key or largest key among keys with the same difference bit position with respect to the smallest value key or the largest value key, and the link table holding, for each read-out position, a link that is a read-out position of a key with same difference bit position of a key with each such read-out position.

9. A bit string data sort method according to claim 8, wherein a link whose read-out position in the link table is the read-out position in the keys-to-be-sorted storage means for a key with the same difference bit position is held in the link table so as to enable to reference the read-out positions in the keys-to-be-sorted storage means for all the keys with the same difference bit position, by traversing successively the links held at those read-out positions, and the read-out position of a last key among the keys with the same difference bit position is held as the link at the read-out position of the last key.

10. A bit string data sort method according to claim 9, wherein the control step controls the difference bit position classifying step so that the difference bit position classifying step repeatedly classifies, in descending order or ascending order of the difference bit positions in the difference bit position table, a group of keys with the same difference bit position with respect to a key whose read-out position is the parent link held at the difference bit position in the difference bit position table.

11. A program for executing on a computer the bit string data sort method according to claim 6.

12. A computer readable storage medium storing a program for executing on a computer the bit string data sort method according to claim 6.

13. A bit string data sort apparatus for sort processing of keys to be sorted, which keys are expressed as bit strings, comprising:

a keys-to-be-sorted storage means that stores the keys to be sorted;

a difference bit position calculating means that obtains a difference bit position, which is a position of a first differing bit found by a bit string comparison between a key stored in the keys-to-be-sorted storage means, which key is an object of a classification in classification processing that constitutes the sort processing, and a reference key taken from among keys subject to the classification;

a key-to-be-classified difference bit position storage means that, for each difference bit position obtained by the difference bit position calculating means, stores identification information for the keys with that difference bit position;

a difference bit position classifying means that, for each difference bit position obtained by the difference bit position calculating means, by writing the identification information for the keys with that difference bit position into the key-to-be-classified difference bit position storage means, classifies the keys subject to the classification into groups of keys so that keys in each of the groups have same difference bit position;

a lower n bit sorting means that sorts keys in each group of keys with the same difference bit position classified by the difference bit position classifying means, by using n bits in each key that are positioned lower than the same difference bit position, in the sequence of difference bit positions; and a sorted key outputting means that outputs, as sorted keys, the reference key and the keys sorted by the lower n bit sorting means for each difference bit position in difference bit position sequence.

14. A bit string data sort apparatus according to claim 13, wherein a smallest value key with a smallest value among keys subject to the classification, or a largest value key with a largest value among the keys subject to the classification, is taken to be the reference key among the keys subject to the classification.

15. A bit string data sort apparatus according to claim 14, wherein the identification information for the keys is a read-out position, which is an address of the key in the keys-to-be-sorted storage means, and the key-to-be-classified difference bit position storage means is configured by a difference bit position table and a link table, the difference bit position table holding, for each difference bit position of the keys subject to the classification with respect to the reference key among the keys subject to the classification, a parent link that is a read-out position of an arbitrary key among keys with the same difference bit position with respect to the smallest value key or the largest value key, and the link table holding, for each read-out position, a link that is a read-out position of a key with same difference bit position of a key with each such read-out position.

16. A bit string data sort apparatus according to claim 15, wherein a link whose read-out position in the link table is the read-out position in the keys-to-be-sorted storage means for a key with the same difference bit position is held in the link table so as to enable to reference the read-out positions in the keys-to-be-sorted storage means for all the keys with the same difference bit position, by traversing successively the links held at those read-out positions, and the read-out position of a last key among the keys with the same difference bit position is held as the link at the read-out position of the last key.

17. A bit string data sort apparatus according to claim 16, wherein the lower n bit sorting means, in the sequence of difference bit positions, sorts data to be sorted being configured by a group comprising a parent link held at a difference bit position in the difference bit position table and a bit string being composed of bits positioned at bit positions lower than the difference bit position in a key at a position pointed to by the parent link in the keys-to-be-sorted storage means, which bit string is made as a sort key for the data to be sorted and being configured by groups each of which group comprises a link corresponding to a key of all the keys with the same difference bit position with that of the key at the position pointed to by the parent link in the keys-to-be-sorted storage means and a bit string being composed of bits positioned at bit positions lower than the difference bit position in a key at a position pointed to by the link in the keys-to-be-sorted storage means, which bit string is made as the sort key for the data to be sorted, and the sorted key outputting means, in the sequence of difference bit positions, reads out from the keys-to-be-sorted storage means, keys pointed to by the links for data to be sorted that are sorted in the lower n bit sorting means and outputs the keys as sorted keys.

18. A bit string data sort method for sort processing of keys to be sorted, which keys are expressed as bit strings, comprising:

a keys-to-be-sorted storage step that stores the keys to be sorted in a keys-to-be-sorted storage means;

a difference bit position calculating step that obtains a difference bit position, which is a position of a first differing bit found by a bit string comparison between a key stored in the keys-to-be-sorted storage means, which key is an object of a classification in classification processing that constitutes the sort processing, and a reference key taken from among keys subject to the classification;

a difference bit position classifying step that, for each difference bit position obtained by the difference bit position calculating step, by writing identification information for the keys with that difference bit position into a key-to-be-classified difference bit position storage means, classifies the keys subject to the classification into groups of keys so that keys in each of the groups have same difference bit position;

a lower n bit sorting step that sorts keys in each group of keys with the same difference bit position classified at the difference bit position classifying step, by using n bits in each key that are positioned lower than the same difference bit position, in the sequence of difference bit positions; and a sorted key outputting step that outputs, as sorted keys, the reference key and the keys sorted at the lower n bit sorting step for each difference bit position in difference bit position sequence.

19. A bit string data sort method according to claim 18, wherein a smallest value key with a smallest value among keys subject to the classification, or a largest value key with a largest value among the keys subject to the classification, is taken to be the reference key among the keys subject to the classification.

20. A bit string data sort method according to claim 19, wherein the identification information for the keys is a read-out position, which is an address of the key in the keys-to-be-sorted storage means, and the key-to-be-classified difference bit position storage means is configured by a difference bit position table and a link table, the difference bit position table holding, for each difference bit position of the keys subject to the classification with respect to the reference key among the keys subject to the classification, a parent link that is a read-out position of arbitrary key among keys with the same difference bit position with respect to the smallest value key or the largest value key, and the link table holding, for each read-out position, a link that is a read-out position of a key with same difference bit position of a key with each such read-out position.

21. A bit string data sort method according to claim 20, wherein a link whose read-out position in the link table is the read-out position in the keys-to-be-sorted storage means for a key with the same difference bit position is held in the link table so as to enable to reference the read-out positions in the keys-to-be-sorted storage means for all the keys with the same difference bit position, by traversing successively the links held at those read-out positions, and the read-out position of a last key among the keys with the same difference bit position is held as the link at the read-out position of the last key.

22. A bit string data sort method according to claim 21, wherein the lower n bit sorting step, in the sequence of difference bit positions, sorts data to be sorted being configured by a group comprising a parent link held at a difference bit position in the difference bit position table and a bit string being composed of bits positioned at bit positions lower than the difference bit position in a key at a position pointed to by the parent link in the keys-to-be-sorted storage means, which bit string is made as a sort key for the data to be sorted and being configured by groups each of which group comprises a link corresponding to a key of all the keys with the same difference bit position with that of the key at the position pointed to by the parent link in the keys-to-be-sorted storage means and a bit string being composed of bits positioned at bit positions lower than the difference bit position in the key at a position pointed to by the link in the keys-to-be-sorted storage means, which bit string is made as the sort key for the data to be sorted, and the sorted key outputting step, in the sequence of difference bit positions, reads out from the keys-to-be-sorted storage means, keys pointed to by the links for data to be sorted that are sorted at the lower n bit sorting step and outputs the keys as sorted keys.

23. A program for executing on a computer the bit string data sort method according to claim 18.

24. A computer readable storage medium storing a program for executing on a computer the bit string data sort method according to claim 18.

25. A bit string data sort apparatus for sort processing of keys to be sorted, which keys are expressed as bit strings, comprising:
a keys-to-be-sorted storage means that stores the keys to be sorted;
a key grouping means that, by a magnitude comparison between a reference key, which is an arbitrary key among all the keys to be sorted, and the keys other than the reference key stored in the keys-to-be-sorted storage means, splits the keys into a group of keys smaller than the reference key and a group of keys larger than the reference key;
a difference bit position calculating means that obtains a difference bit position, which is a position of a first differing bit found by a bit string comparison between a key stored in the keys-to-be-sorted storage means, which key is an object of a classification in classification processing that constitutes the sort processing, and a reference key taken from among keys subject to the classification;
a key-to-be-classified difference bit position storage means that, for each difference bit position obtained by the difference bit position calculating means, stores identification information for the keys with that difference bit position;
a difference bit position classifying means that, for each difference bit position obtained by the difference bit position calculating means, by writing of identification information for the keys with that difference bit position into the key-to-be-classified difference bit position storage means, classifies the keys subject to the classification with the same difference bit position into groups;
a sorted key outputting means that outputs a key as a sorted key if there is only one key with the same difference bit position classified by the difference bit position classifying means and, if there are a plurality of keys with the same difference bit position, outputs from among the plurality of keys a key to be the reference key in the next classification processing as the sorted key; and
a control means that controls the key grouping means, the difference bit position calculating means, the difference bit position classifying means, and the sorted key outputting means so that, in the initial classification processing,
the key grouping means splits the keys into a group of keys smaller than the reference key and a group of keys larger than the reference key, by means of a magnitude comparison between the reference key and all the key other than the reference key, and
the difference bit position calculating means obtains the difference bit position between the reference key and the keys other than the reference key, and
the difference bit position classifying means, for each difference bit position obtained by the difference bit position calculating means, writes the identification information for the keys with that difference bit position to the keys-to-be-classified difference bit position storage means for both the group of keys smaller than the reference key and the group of keys larger than the reference key, and
in the following classification processing, for each of the groups smaller and larger than the reference key,
the difference bit position calculating means repeatedly obtains a difference bit position by making for keys classified by the difference bit position classifying means as having the same difference bit position group consisting of a plurality of keys to be the object of a further classification, and
the difference bit position classifying means repeatedly classifies groups with the same difference bit position for each difference bit position obtained by the difference bit position calculating means, and
the sorted key outputting means outputs the key as the sorted key when the difference bit position classifying means, for each difference bit position, classifies the keys into a group with the same difference bit position.

26. A bit string data sort apparatus according to claim 25, wherein
the reference key is taken to be a key first read out from the keys-to-be-sorted storage means, and
a largest value key with a largest value among keys to be classified in the group of keys smaller than the reference key is taken to be a reference key, which is a reference of the keys to be classified in the group of keys smaller than the reference key, and
a smallest value key with a smallest value among keys to be classified in the group of keys larger than the reference key is taken to be a reference key, which is a reference of the keys to be classified in the group of keys larger than the reference key.

27. A bit string data sort apparatus according to claim 26, wherein
the identification information for the keys is a read-out position, which is an address of the key in the keys-to-be-sorted storage means, and
the key-to-be-classified difference bit position storage means is configured by a first difference bit position table, a second difference bit position table and a link table,
the first difference bit position table holding, for each difference bit position of the keys subject to the classification, which keys are in the group of keys smaller than the reference key, with respect to the largest value key or the reference key, a parent link that is the read-out position of a largest key among the keys with the same difference bit position with respect to the largest value key or the reference key, and
the second difference bit position table holding, for each difference bit position of the keys subject to the classification, which keys are in the group of keys larger than the reference key, with respect to the smallest value key or the reference key, a parent link that is the read-out position of a smallest key among the keys with the same difference bit position with respect to the smallest value key or the reference key, and
the link table holding, for each read-out position, a link that is a read-out position of a key with same difference bit position of a key with each such read-out position.

28. A bit string data sort apparatus according to claim 27, wherein
a link whose read-out position in the link table is the read-out position in the keys-to-be-sorted storage means for a key with the same difference bit position is held in the link table so as to enable to reference the read-out positions in the keys-to-be-sorted storage means for all the keys with the same difference bit position, by traversing successively the links held at those read-out positions, and the read-out position of a last key among the keys with the same difference bit position is held as the link at the read-out position of the last key.

29. A bit string data sort method for sort processing of keys to be sorted, which keys are expressed as bit strings, comprising:
a keys-to-be-sorted storage step that stores the keys to be sorted in a keys-to-be-sorted storage means;
a key grouping step that, by a magnitude comparison between a reference key, which is any arbitrary key among all the keys to be sorted, and the keys other than the reference key stored in the keys-to-be-sorted storage means, splits the keys into a group of keys smaller than the reference key and a group of keys larger than the reference key;
a difference bit position calculating step that obtains a difference bit position, which is a position of a first differing bit found by a bit string comparison between a key stored in the keys-to-be-sorted storage means, which key is an object of a classification in classification processing that constitutes the sort processing, and a reference key taken from among keys subject to the classification;
a difference bit position classifying step that, for each difference bit position obtained by the difference bit position calculating step, by writing identification information for the keys with that difference bit position into a key-to-be-classified difference bit position storage means, classifies the keys subject to the classification into groups of keys so that keys in each of the groups have same difference bit position;
a sorted key outputting step that outputs a key as a sorted key if there is only one key with the same difference bit position classified by the difference bit position classifying step and if there is a plurality of keys with the same difference bit position, outputs from among the plurality of keys as the sorted key the reference key in a next classification processing; and
a control step that controls the key grouping step, the difference bit position calculating step, the difference bit position classifying step, and the sorted key outputting step so that, in the initial classification processing,
the key grouping step splits the keys into a group of keys smaller than the reference key and a group of keys larger than the reference key, by means of a magnitude comparison between the reference key and all the key other than the reference key, and
the difference bit position calculating step obtains the difference bit position between the reference key and the keys other than the reference key, and
the difference bit position classifying step, for each difference bit position obtained at the difference bit position calculating step, writes the identification information for the keys with that difference bit position to the keys-to-be-classified difference bit position storage means for both the group of keys smaller than the reference key and the group of keys larger than the reference key, and
in following classification processing, for each of the groups smaller and larger than the reference key,
the difference bit position calculating step repeatedly obtains a difference bit position by making for keys classified at the difference bit position classifying step as having the same difference bit position group consisting of a plurality of keys to be the object of a further classification, and
the difference bit position classifying step repeatedly classifies groups with the same difference bit position for each difference bit position obtained at the difference bit position calculating step, and
the sorted key outputting step outputs the key as the sorted key when the difference bit position classifying step, for each difference bit position, classifies the keys into a group with the same difference bit position.

30. A bit string data sort method according to claim 29, wherein
the reference key is taken to be a key first read out from the keys-to-be-sorted storage means, and
a largest value key with a largest value among keys to be classified in the group of keys smaller than the reference key is taken to be a reference key, which is a reference of the keys to be classified in the group of keys smaller than the reference key, and
a smallest value key with a smallest value among keys to be classified in the group of keys larger than the reference key is taken to be a reference key, which is a reference of the keys to be classified in the group of keys larger than the reference key.

31. A bit string data sort method according to claim 30, wherein
the identification information for the keys is a read-out position, which is an address of the key in the keys-to-be-sorted storage means, and
the key-to-be-classified difference bit position storage means is configured by a first difference bit position table, a second difference bit position table and a link table,
the first difference bit position table holding, for each difference bit position of the keys subject to the classification, which keys are in the group of keys smaller than the reference key, with respect to the largest value key or the reference key, a parent link that is the read-out position of a largest key among the keys with the same difference bit position with respect to the largest value key or the reference key, and
the second difference bit position table holding, for each difference bit position of the keys subject to the classification, which keys are in the group of keys larger than the reference key, with respect to the smallest value key or the reference key, a parent link that is the read-out position of a smallest key among the keys with the same difference bit position with respect to the smallest value key or the reference key, and
the link table holding, for each read-out position, a link that is a read-out position of a key with same difference bit position of a key with each such read-out position.

32. A bit string data sort method according to claim 31, wherein
a link whose read-out position in the link table is the read-out position in the keys-to-be-sorted storage means for a key with the same difference bit position is held in the link table so as to enable to reference the read-out positions in the keys-to-be-sorted storage means for all the keys with the same difference bit position, by traversing successively the links held at those read-out positions, and the read-out position of a last key among the keys with the same difference bit position is held as the link at the read-out position of the last key.

33. A program for executing on a computer the bit string data sort method according to claim 29.

34. A computer readable storage medium storing a program for executing on a computer the bit string data sort method according to claim 29.

* * * * *